US011316676B2

(12) United States Patent
Kinjo et al.

(10) Patent No.: US 11,316,676 B2
(45) Date of Patent: Apr. 26, 2022

(54) QUANTUM-PROOF MULTIPARTY KEY EXCHANGE SYSTEM, QUANTUM-PROOF MULTIPARTY TERMINAL DEVICE, QUANTUM-PROOF MULTIPARTY KEY EXCHANGE METHOD, PROGRAM, AND RECORDING MEDIUM

(71) Applicant: NIPPON TELEGRAPH AND TELEPHONE CORPORATION, Chiyoda-ku (JP)

(72) Inventors: Koha Kinjo, Musashino (JP); Yuki Okano, Musashino (JP); Tsunekazu Saito, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/761,979

(22) PCT Filed: Nov. 12, 2018

(86) PCT No.: PCT/JP2018/041804
§ 371 (c)(1),
(2) Date: May 6, 2020

(87) PCT Pub. No.: WO2019/107129
PCT Pub. Date: Jun. 6, 2019

(65) Prior Publication Data
US 2020/0322141 A1 Oct. 8, 2020

(30) Foreign Application Priority Data

Nov. 29, 2017 (JP) .............................. JP2017-229195

(51) Int. Cl.
*H04L 9/08* (2006.01)

(52) U.S. Cl.
CPC ............ *H04L 9/0852* (2013.01); *H04L 9/085* (2013.01); *H04L 9/0822* (2013.01); *H04L 9/0869* (2013.01)

(58) Field of Classification Search
None
See application file for complete search history.

(56) References Cited

U.S. PATENT DOCUMENTS

2020/0274697 A1* 8/2020 Ragan ................. H04L 63/0435

FOREIGN PATENT DOCUMENTS

JP 2016-134826 A 7/2016

OTHER PUBLICATIONS

International Search Report dated Feb. 12, 2019 in PCT/JP2018/041804 filed Nov. 12, 2018, 2 pages.
(Continued)

*Primary Examiner* — William J. Goodchild
(74) *Attorney, Agent, or Firm* — Oblon, McClelland, Maier & Neustadt, L.L.P.

(57) ABSTRACT

In Round1, each terminal device transmits a key encryption key which conforms to post-quantum cryptography to a neighboring terminal device; in Round2, each terminal device generates a key capsule of a key-shared-between-two-parties using the received key encryption key and returns the key capsule to a terminal device which is a source of the key encryption key; in Round3, each terminal device generates information based on the key-shared-between-two-parties and transmits the information to a key distribution management device and the key distribution management device distributes information, which is obtained based on these pieces of information, to the terminal devices. Each terminal device calculates a shared key based on the distributed information.

14 Claims, 18 Drawing Sheets

(56) References Cited

OTHER PUBLICATIONS

Yoneyama et al., "Multi-Cast Key Distribution: Scalable, Dynamic and Provably Secure Construction", International Conference on Provable Security (ProvSec 2016), LNCS10005, Nov. 2016, 28 total pages.

Peikert, "Lattice Cryptography for the Internet", PQCrypto 2014, LNCS 8772, pp. 1-25, 2014.

Wang, "Lattice Ciphertext Policy Attribute-based Encryption in the Standard Model", International Journal of Network Security, vol. 16, No. 6, pp. 444-451, Nov. 2014.

Benhamouda et al., "Efficient Zero-Knowledge Proofs for Commitments from Learning With Errors over Rings", In: ESORICS: European Symposiums on Research in Computer Security, Sep. 21-25, 2015, pp. 1-14.

Kinjo et al., "Dynamic Multi-Cast Key Distribution with KEM", The Institute of Electronics, Information and Communication Engineers, SCIS 2018, Jan. 23, 2018, 9 total pages.

\* cited by examiner

QUANTUM-PROOF MULTIPARTY KEY EXCHANGE SYSTEM, QUANTUM-PROOF MULTIPARTY TERMINAL DEVICE, QUANTUM-PROOF MULTIPARTY KEY EXCHANGE METHOD, PROGRAM, AND RECORDING MEDIUM

TECHNICAL FIELD

The present invention relates to cryptography and, in particular, to a multiparty key exchange technique.

BACKGROUND ART

Multiparty key exchange techniques include group key exchange (GKE), which is a key exchange in a mesh topology, and multi key distribution (MKD), which is a key exchange in a star topology. These key exchanges have problems such as an increase in communication costs proportional to the number of participants and transmission of a shared key to a key distribution management device. These problems were solved by DMKD (Dynamic Multi-Cast Key Distribution: Scalable, Dynamic and Provably Secure Construction) (see, for example, Patent Literature 1 and Non-patent Literature 1). This scheme makes it possible to perform a key exchange in constant Round regardless of the number of participants and conceal a shared key from a key distribution management device.

In recent years, research and development of quantum computers have been rapidly advanced, which may jeopardize the security of encryption. This promotes the study of a cryptosystem that cannot be broken by a quantum computer. Encryption that cannot be broken by a quantum computer is referred to as "quantum-safe" encryption.

PRIOR ART LITERATURE

Patent Literature

Patent Literature 1: Japanese Patent Application Laid Open No. 2016-134826

Non-Patent Literature

Non-patent Literature 1: Kazuki Yoneyama, Reo Yoshida, Yuto Kawahara, Tetsutaro Kobayashi, Hitoshi Fuji, Tomohide Yamamoto, "Multi-Cast Key Distribution: Scalable, Dynamic and Provably Secure Construction," International Conference on Provable Security (ProvSec 2016), LNCS10005, pp. 207-226, November 2016.

SUMMARY OF THE INVENTION

Problems to be Solved by the Invention

Although DMKD allows a multiparty key exchange to be efficiently and securely performed, DMKD is not quantum-safe. For that reason, if a quantum computer having sufficient computational capacity will be put to practical use in the future, the security of DMKD will not be assured. Moreover, since DMKD is based on a Diffie-Hellman (DH) key exchange between two parties which cannot be made quantum-proof easily, it is also not easy to modify DMKD so as to be a quantum-safe scheme.

The present invention has been made in view of these points and an object thereof is to provide a quantum-proof multiparty key exchange technique.

Means to Solve the Problems

A terminal device $U_i$ stores a key capsule decryption key $sk_i$ which conforms to post-quantum cryptography of a public key cryptosystem and outputs a key encryption key $pk_i$ corresponding to the key capsule decryption key $sk_i$. Here, n is an integer greater than or equal to 3 and i=1, ..., n.

The terminal device $U_i$ accepts a key encryption key $pk_{(i \mod n)+1}$ which conforms to post-quantum cryptography, sets a random number $k_i$, obtains, using the key encryption key $pk_{(i \mod n)+1}$, a key-shared-between-two-parties $R_{i,(i \mod n)+1}$ and a key capsule $C_{i,(i \mod n)+1}$ which is cipher text of the key-shared-between-two-parties $R_{i,(i \mod n)+1}$, outputs the key capsule $C_{i,(i \mod n)+1}$, and accepts a key capsule $C_{(i-2 \mod n)+1,i}$. Here, for a positive integer α, −1 mod α=α−1.

A terminal device $U_1$ obtains a key-shared-between-two-parties $R_{n,1}$ by decrypting a key capsule $C_{n,1}$ using a key capsule decryption key $sk_1$, obtains a function value $K_1^{(L)}$ of the key-shared-between-two-parties $R_{n,1}$, obtains a function value $K_1^{(R)}$ of a key-shared-between-two-parties $R_{1,2}$, obtains the XOR $T_1$ of the function value $K_1^{(L)}$ and the function value $K_1^{(R)}$, obtains the XOR T' of a function value of a random number $k_1$ and the function value $K_1^{(L)}$, and outputs the XORs $T_1$ and T'. A terminal device $U_v$ obtains a key-shared-between-two-parties $R_{(v−2 \mod n)+1,v}$ by decrypting a key capsule $C_{(v−2 \mod n)+1,v}$ using a key capsule decryption key $sk_v$, obtains a function value $K_v^{(L)}$ of the key-shared-between-two-parties $R_{(v−2 \mod n)+1,v}$, obtains a function value $K_v^{(R)}$ of a key-shared-between-two-parties $R_{v,(v \mod n)+1}$, obtains the XOR $T_v$ of the function value $K_v^{(L)}$ and the function value $K_v^{(R)}$, and outputs a random number $k_v$ and the XOR $T_v$. Here, v=2, ..., n.

A key distribution management device obtains the XOR k' of a plurality of values including random numbers $k_2, ..., k_n$ and outputs the XOR k', and obtains the XOR $T_v'$ of XORs $T_1, ..., T_{v−1}$ and outputs the XOR $T_v'$.

The terminal device $U_1$ obtains a function value of the XOR of the XOR k' and the random number $k_1$ as a shared key SK. The terminal device $U_v$ obtains the function value $K_1^{(L)}$ by XORing the XOR $T_v'$ with the function value $K_v^{(L)}$, obtains the function value of the random number $k_1$ by XORing the XOR T' with the function value $K_1^{(L)}$, and obtains a function value of the XOR of the XOR k' and the random number $k_1$, which is obtained from the function value of the random number $k_1$, as the shared key SK.

Effects of the Invention

In this way, it is possible to implement a quantum-proof multiparty key exchange.

DETAILED DESCRIPTION OF THE EMBODIMENTS

Hereinafter, embodiments of the present invention will be described with reference to the drawings.

First Embodiment

Figure 1:
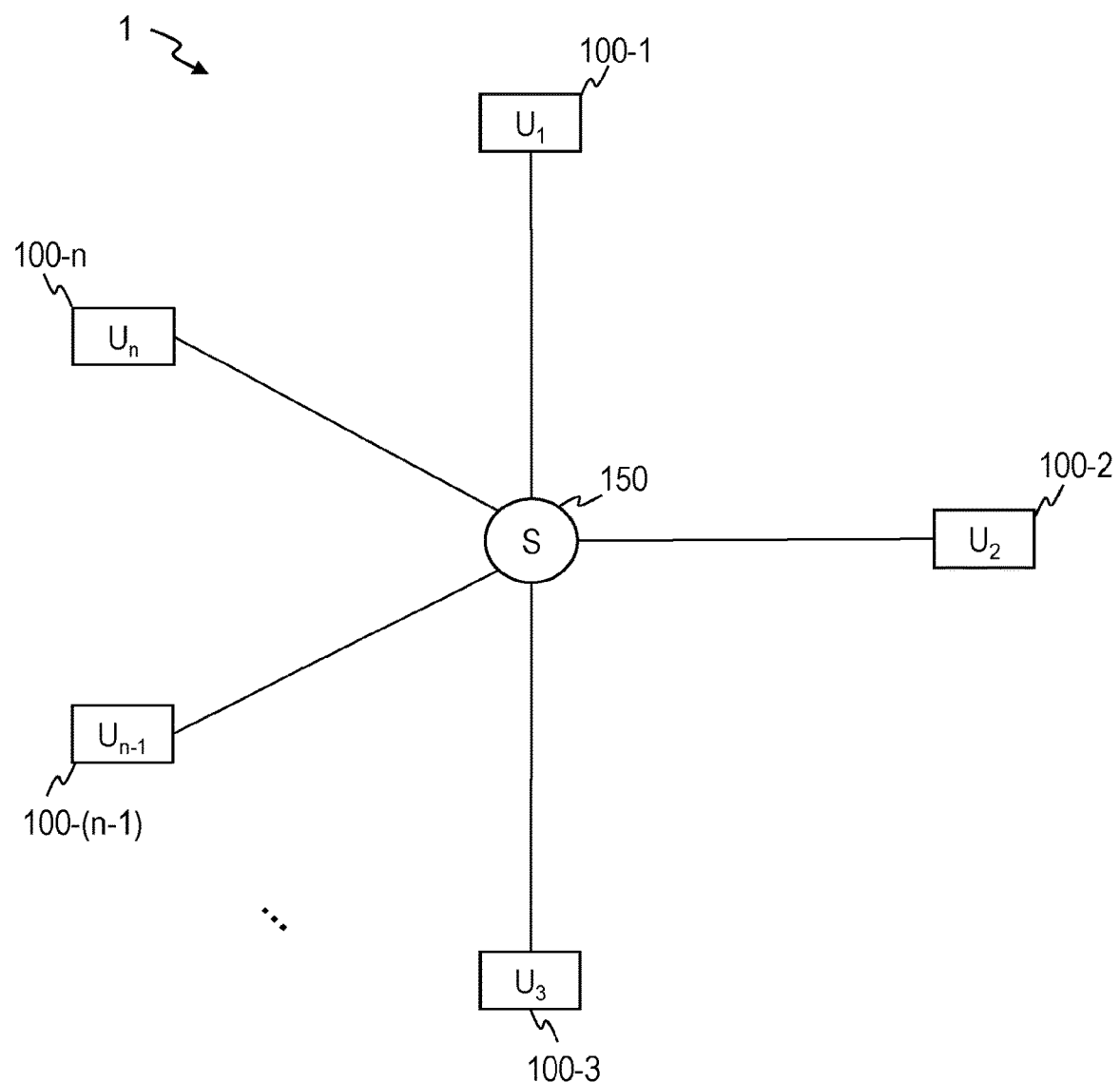
FIG. 1 is a block diagram illustrating the configuration of a key exchange system of a first embodiment.

A first embodiment will be described. In the first embodiment, processing to share a shared key among a plurality of terminal devices will be described.
<Configuration>
As illustrated in FIG. 1, a key exchange system 1 of the present embodiment includes n terminal devices 100-1 to 100-$n$ (terminal devices $U_1, \ldots, U_n$) and a key distribution management device 150. n is an integer greater than or equal to 3. Each terminal device 100-$i$ (terminal device $U_i$) (where i=1, ..., n) is configured so that the terminal device 100-$i$ can communicate with the key distribution management device 150 through the Internet or the like.

Figure 2:
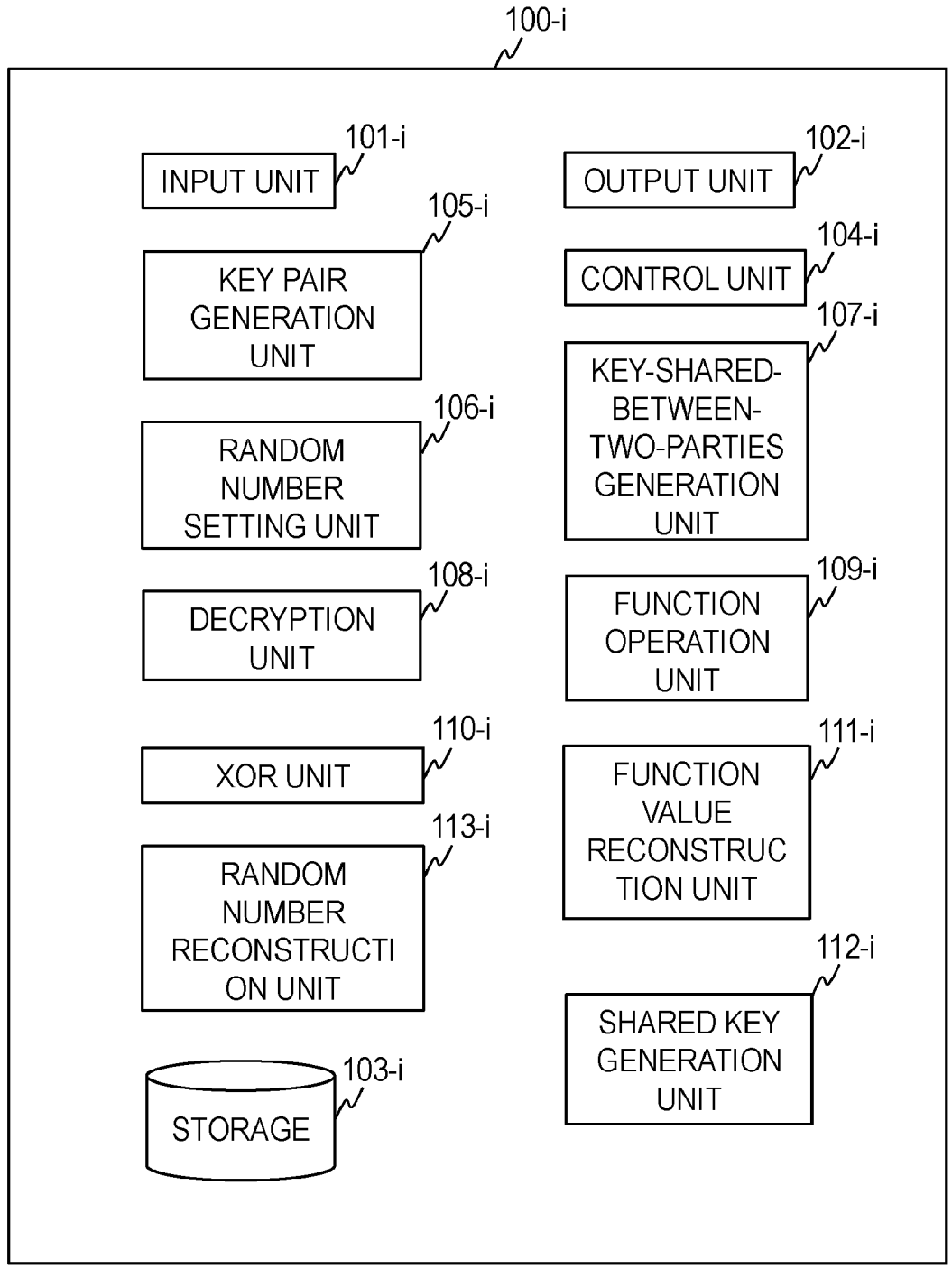
FIG. 2 is a block diagram illustrating the configuration of a terminal device of the embodiment.

As illustrated in FIG. 2, the terminal device 100-$i$ includes an input unit 101-$i$, an output unit 102-$i$, a storage 103-$i$, a control unit 104-$i$, a key pair generation unit 105-$i$, a random number setting unit 106-$i$, a key-shared-between-two-parties generation unit 107-$i$, a decryption unit 108-$i$, a function operation unit 109-$i$, an XOR unit 110-$i$, a function value reconstruction unit 111-$i$, a random number reconstruction unit 113-$i$, and a shared key generation unit 112-$i$. The terminal device 100-$i$ executes each processing under the control of the control unit 104-$i$. The data obtained by the processing is stored in the storage 103-$i$, and is read from the storage 103-$i$ when necessary and used for other processing.

Figure 3:
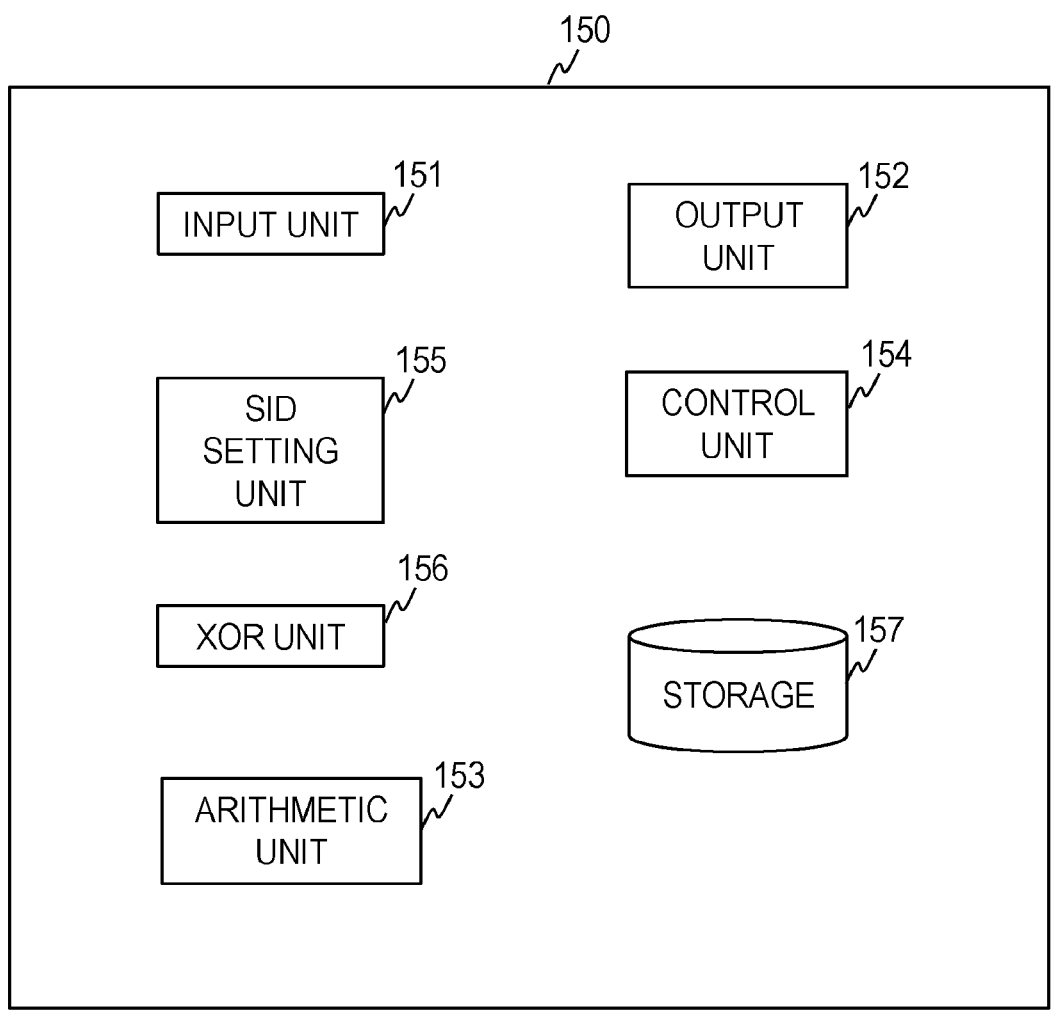
FIG. 3 is a block diagram illustrating the configuration of a key distribution management device of the embodiment.

As illustrated in FIG. 3, the key distribution management device 150 includes an input unit 151, an output unit 152, an arithmetic unit 153, a control unit 154, an SID setting unit 155, an XOR unit 156, and a storage 157. The key distribution management device 150 executes each processing under the control of the control unit 154. The data obtained by the processing is stored in the storage 157, and is read from the storage 157 when necessary and used for other processing.
<Processing>
Next, key exchange processing of the present embodiment will be described. The key exchange processing of the present embodiment includes Round1, Round2, Round3, and shared key generation.

Figure 4:
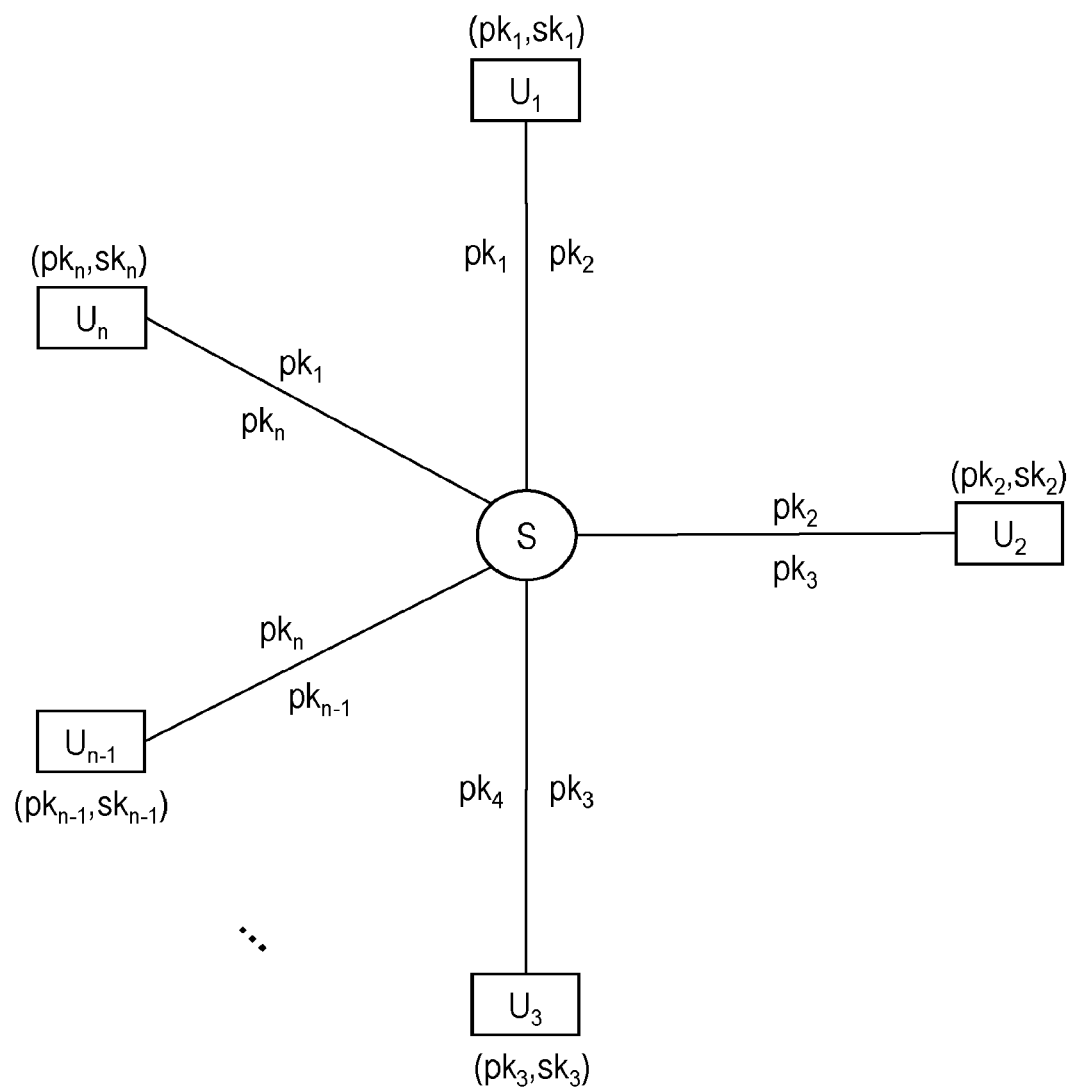
FIG. 4 is a diagram for explaining a key exchange method (Round1) of the embodiment.

<<Round1 (FIG. 4)>>

The key pair generation unit 105-$i$ (where i=1, ..., n) of the terminal device 100-$i$ (FIG. 2) generates a key pair ($pk_i$, $sk_i$) consisting of a key capsule decryption key $sk_i$, which conforms to post-quantum cryptography of a public key cryptosystem, and a key encryption key $pk_i$ corresponding to the key capsule decryption key $sk_i$. For example, the key pair generation unit 105-$i$ generates a random number $r_i$, generates a key pair ($pk_i$, $sk_i$) by applying the random number $r_i$ to a key generation algorithm of a key capsulation algorithm, and outputs the key pair ($pk_i$, $sk_i$). The random number may be a pseudo random number or a true random number (the same applies hereinafter). Examples of post-quantum cryptography of the public key cryptosystem include lattice-based cryptography and code-based cryptography. As the key capsulation algorithm, the following key capsulation algorithm, for example, can be used.

Reference Literature 1: Chris Peikert, Lattice Cryptography for the Internet, PQCrypto 2014, LNCS 8772, pp. 197-219, 2014.

The generated key capsule decryption key $sk_i$ and key encryption key $pk_i$ are stored in the storage 103-$i$ of each terminal device 100-$i$. Moreover, the key encryption key $pk_i$ is output from the output unit 102-$i$ and transmitted to the key distribution management device 150.

The key encryption key $pk_i$ is input to (accepted by) the input unit 151 of the key distribution management device 150 (FIG. 3). As soon as the key encryption key $pk_i$ is input to the input unit 151, the control unit 154 sends the key encryption key $pk_i$ to the output unit 152 and the output unit 152 transmits the key encryption key $pk_i$ to a terminal device 100-((i−2 mod n)+1). Here, for a positive integer α, −1 mod α=α−1 is satisfied.

Figure 5:
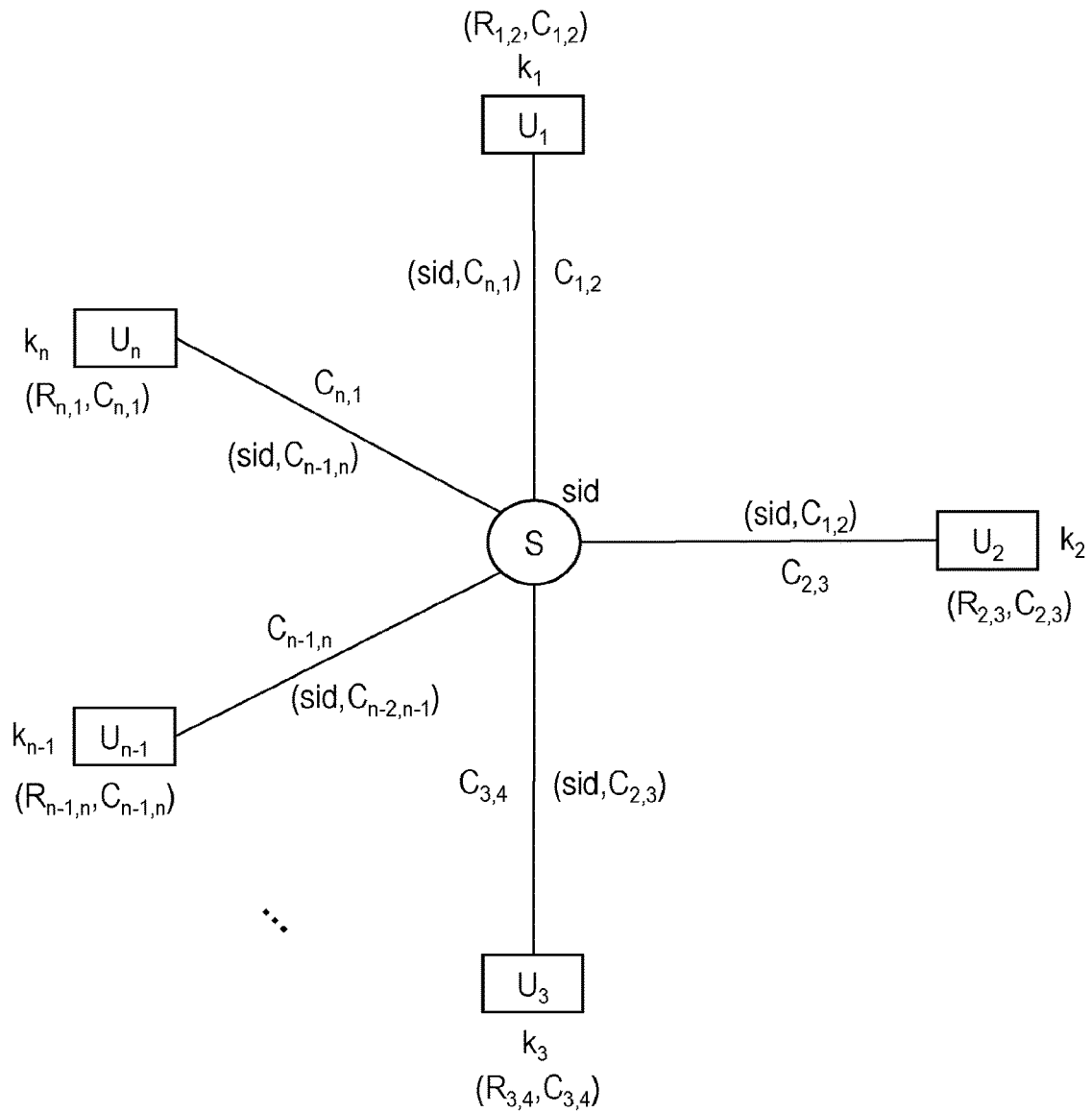
FIG. 5 is a diagram for explaining the key exchange method (Round2) of the embodiment.

<<Round2 (FIG. 5)>>

The input unit 101-$i$ of the terminal device 100-$i$ (FIG. 2) receives (accepts) a key encryption key $pk_{(i \bmod n)+1}$ and stores the key encryption key $pk_{(i \bmod n)+1}$ in the storage 103-$i$.

The random number setting unit 106-$i$ of the terminal device 100-$i$ sets a random number $k_i$ and outputs the random number $k_i$. The random number k is stored in the storage 103-$i$.

The key-shared-between-two-parties generation unit 107-$i$ of the terminal device 100-$i$ obtains, using the key encryption key $pk_{(i \bmod n)+1}$, a key-shared-between-two-parties $R_{i,\ (i \bmod n)+1}$ and a key capsule $C_{i,\ (i \bmod n)+1}$, which is cipher text of the key-shared-between-two-parties $R_{i,\ (i \bmod n)+1}$, and outputs the key-shared-between-two-parties $R_{i,\ (i \bmod n)+1}$ and the key capsule $C_{i,\ (i \bmod n)+1}$. For example, the key-shared-between-two-parties generation unit 107-$i$ generates the key-shared-between-two-parties $R_{i,\ (i \bmod n)+1}$ and the key capsule $C_{i,\ (i \bmod n)+1}$ by the method described in Reference Literature 1 and outputs the key-shared-between-two-parties $R_{i,\ (i \bmod n)+1}$ and the key capsule $C_{i,\ (i \bmod n)+1}$. The key-shared-between-two-parties $R_{i,\ (i\ mod\ n)+1}$ is stored in the storage 103-$i$. The key capsule $C_{i,\ (i\ mod\ n)+1}$ is output from the output unit 102-$i$ and transmitted to the key distribution management device 150.

The input unit 151 of the key distribution management device 150 (FIG. 3) receives the key capsule $C_{i,\ (i\ mod\ n)+1}$ transmitted from each terminal device 100-$i$ (where $i=1,\ldots,n$). The STD setting unit 155 generates sid (a session ID) and chooses the terminal device 100-1 as a representative terminal device. The arithmetic unit 153 generates (sid, $C_{i,\ (i\ mod\ n)+1}$). (sid, $C_{i,\ (i\ mod\ n)+1}$) is output from the output unit 152 and transmitted to a terminal device 100-((i mod n)+1). That is, the output unit 152 transmits (sid, $C_{(i-2\ mod\ n)+1,\ i}$) to the terminal device 100-$i$. Moreover, the output unit 152 transmits, to the terminal device 100-1, information (notification about being chosen as a representative) indicating that the terminal device 100-1 has been chosen as a representative terminal device.

Figure 6:
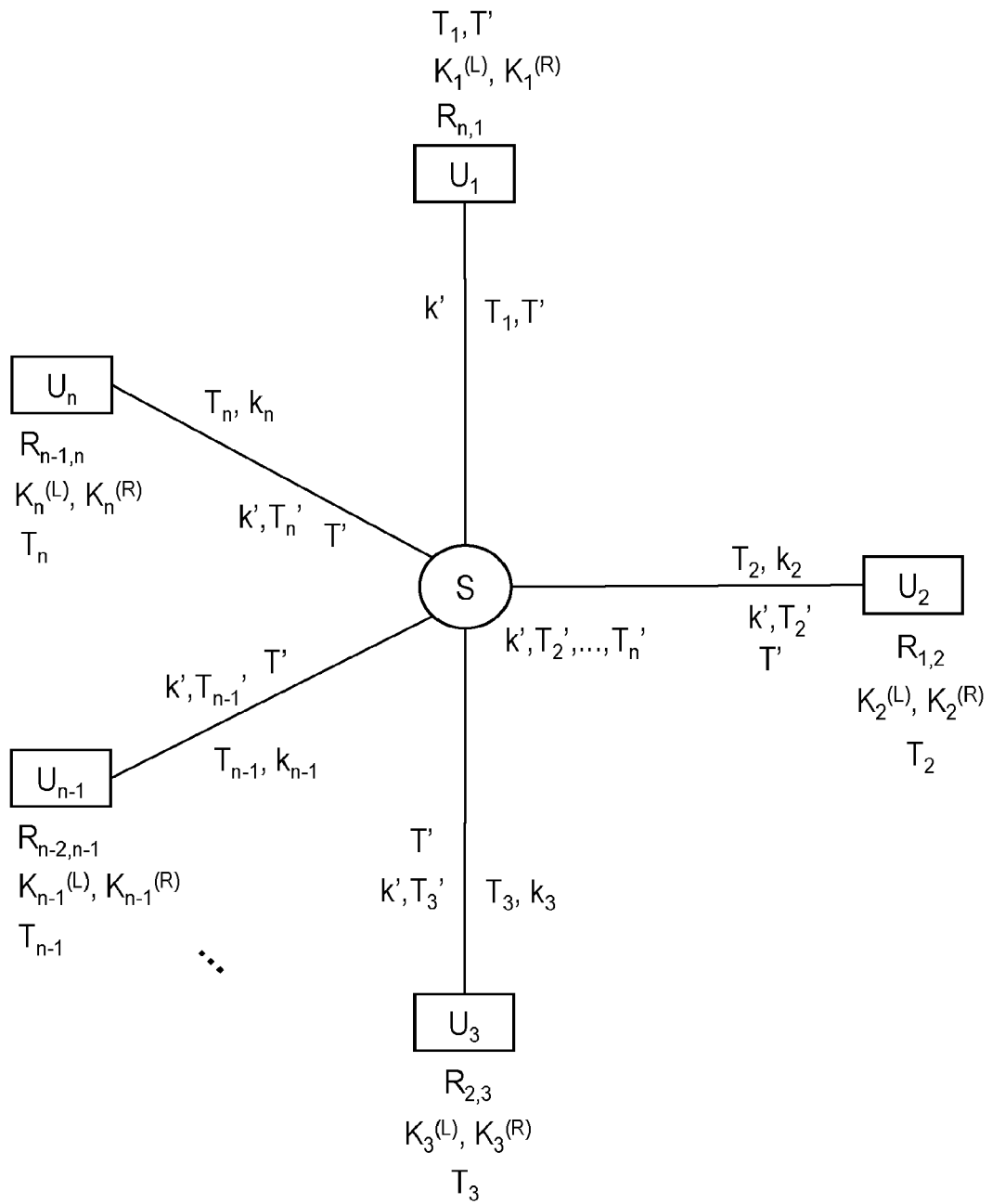
FIG. 6 is a diagram for explaining the key exchange method (Round3) of the embodiment.

<<Round3 (FIG. 6)>>

The terminal device 100-1 (terminal device $U_1$) and a terminal device 100-$v$ (terminal device $U_v$), which is not the terminal device 100-1 (terminal device $U_1$), perform different processing in Round3 of the present embodiment. Here, $v=2,\ldots,n$.

Terminal device 100-1 (terminal device $U_1$):

(sid, $C_{n,\ 1}$) and the notification about being chosen as a representative are input to (accepted by) the input unit 101-1 of the terminal device 100-1. When the notification about being chosen as a representative is received, the control unit 104-1 performs the following control.

The decryption unit 108-1 obtains a key-shared-between-two-parties $R_{n,\ 1}$ by decrypting the key capsule $C_{n,\ 1}$ using a key capsule decryption key $sk_1$ read from the storage 103-1 and outputs the key-shared-between-two-parties $R_{n,\ 1}$. For instance, the decryption unit 108-1 obtains the key-shared-between-two-parties $R_{n,\ 1}$ by the method described in Reference Literature 1 and outputs the key-shared-between-two-parties $R_{n,\ 1}$. The key-shared-between-two-parties $R_{n,\ 1}$ is stored in the storage 103-1.

Next, the function operation unit 109-1 obtains a function value $K_1^{(L)}$ of the key-shared-between-two-parties $R_{n,\ 1}$ and outputs the function value $K_1^{(L)}$. The function value $K_1^{(L)}$ may be a value that depends only on the key-shared-between-two-parties $R_{n,\ 1}$ or a value that depends on the key-shared-between-two-parties $R_{n,\ 1}$ and another piece of additional information. A "value that depends only on $\alpha_3$" may be $\alpha_3$ itself or a value corresponding to $\alpha_3$. Here, $K_1^{(L)}=K_n^{(R)}$ has to be satisfied for $K_n^{(R)}$, which will be described later. For example, the function operation unit 109-1 obtains the function value $K_1^{(L)}=F(sid,\ R_{n,\ 1})$ that depends on the key-shared-between-two-parties $R_{n,\ 1}$ and sid and outputs the function value $K_1^{(L)}$. An example of $F(\alpha_1,\alpha_2)$ is a function value of a bit concatenation value $\alpha_1|\alpha_2$ of $\alpha_1$ and $\alpha_2$. An example of F is a one-way function. An example of the one-way function is a hash function (for instance, a cryptographic hash function). The function value $K_1^{(L)}$ is stored in the storage 103-1.

Moreover, the function operation unit 109-1 reads a key-shared-between-two-parties $R_{1,\ 2}$ from the storage 103-1, and obtains a function value $K_1^{(R)}$ of the key-shared-between-two-parties $R_{1,\ 2}$ and outputs the function value $K_1^{(R)}$. The function value $K_1^{(R)}$ may be a value that depends only on the key-shared-between-two-parties $R_{1,\ 2}$ or a value that depends on the key-shared-between-two-parties $R_{1,\ 2}$ and another piece of additional information. Here, $K_1^{(R)}=K_2^{(L)}$ has to be satisfied for $K_2^{(L)}$, which will be described later. For instance, the function operation unit 109-1 obtains the function value $$K_1^{(R)}=F(sid,R_{1,\ 2})$$

that depends on the key-shared-between-two-parties $R_{1,\ 2}$ and sid and outputs the function value $K_1^{(R)}$. The function value $K_1^{(R)}$ is stored in the storage 103-1.

The function value $K_1^{(L)}$ and the function value $K_1^{(R)}$ are input to the XOR unit 110-1. The XOR unit 110-1 obtains the XOR $$T_1=K_1^{(L)}(+)K_1^{(R)}$$

of the function value $K_1^{(L)}$ and the function value $K_1^{(R)}$ and outputs the XOR $T_1$. $\alpha_1(+)\alpha_2$ represents the XOR of $\alpha_1$ and $\alpha_2$. When at least one of $\alpha_1$ and $\alpha_2$ is not a bit string, the XOR of $\alpha_1$ and $\alpha_2$ represents the XOR of $\alpha_1$ and $\alpha_2$ expressed by a bit string.

A random number $k_1$ read from the storage 103-1 is further input to the XOR unit 110-1. The XOR unit 110-1 obtains the XOR $$T'=B(k_1)(+)K_1^{(L)}$$

of a function value $B(k_1)$ of the random number $k_1$ and the function value $K_1^{(L)}$ and outputs the XOR T'. The function value $B(k_1)$ may be a value that depends only on the random number $k_1$ or a value that depends on the random number $k_1$ and another piece of additional information. Here, the random number $k_1$ has to be easily extractable from the function value $B(k_1)$. An example of the function value $B(k_1)$ is bit concatenation $k_1|\beta$ of the random number $k_1$ and another piece of additional information $\beta$.

The XORs $T_1$ and T' are output from the output unit 102-1 and transmitted to the key distribution management device 150.

Terminal device 100-$v$ (Terminal device $U_v$):

(sid, $C_{(v-2\ mod\ n)+1,\ v}$) is input to (accepted by) the input unit 101-$v$ of the terminal device 100-$v$ (where $v=2,\ldots,n$). When the notification about being chosen as a representative is not received, the control unit 104-$v$ performs the following control.

The decryption unit 108-$v$ obtains a key-shared-between-two-parties $R_{(v-2\ mod\ n)+1,\ v}$ by decrypting the key capsule $C_{(v-2\ mod\ n)+1,\ v}$ using a key capsule decryption key $sk_v$ read from the storage 103-$v$ and outputs the key-shared-between-two-parties $R_{(v-2\ mod\ n)+1,\ v}$. For example, the decryption unit 108-$v$ obtains the key-shared-between-two-parties $R_{(v-2\ mod\ n)+1,\ v}$ by the method described in Reference Literature 1 and outputs the key-shared-between-two-parties $R_{(v-2\ mod\ n)+1,\ v}$. The key-shared-between-two-parties $R_{(v-2\ mod\ n)+1,\ v}$ is stored in the storage 103-$v$.

The function operation unit 109-$v$ obtains a function value $K_v^{(L)}$ of the key-shared-between-two-parties $R_{(v-2\ mod\ n)+1,\ v}$ and outputs the function value $K_v^{(L)}$. The function value $K_v^{(L)}$ may be a value that depends only on the key-shared-between-two-parties $R_{(v-2\ mod\ n)+1,\ v}$ or a value that depends on the key-shared-between-two-parties $R_{(v-2\ mod\ n)+1,\ v}$ and another piece of additional information. Here, $K_v^{(L)}=K_{(v-2\ mod\ n)+1}^{(R)}$ has to be satisfied for $K_{(v-2\ mod\ n)+1}^{(R)}$, which will be described later. For instance, the function operation unit 109-$v$ obtains the function value $$K_v^{(L)}=F(sid,R_{(v-2\ mod\ n)+1,\ v})$$

that depends on the key-shared-between-two-parties $R_{(v-2\ mod\ n)+1,\ v}$ and sid and outputs the function value $K_v^{(L)}$. The function value $K_v^{(L)}$ is stored in the storage 103-$v$.

The function operation unit 109-$v$ reads a key-shared-between-two-parties $R_{v,\ (v\ mod\ n)+1}$ from the storage 103-$v$, and obtains a function value $K_v^{(R)}$ of the key-shared-between-two-parties $R_{v,\ (v\ mod\ n)+1}$ and outputs the function value $K_v^{(R)}$. The function value $K_v^{(R)}$ may be a value that depends only on the key-shared-between-two-parties $R_{v,\ (v\ mod\ n)+1}$ or a value that depends on the key-shared-between-two-parties $R_{v,\ (v\ mod\ n)+1}$ and another piece of additional information. Here, $K_v^{(R)}=K_{(v\ mod\ n)+1}^{(L)}$ has to be satisfied. For instance, the function operation unit 109-$v$ obtains the function value $$K_v^{(R)}=F(sid,R_{v,\ (v\ mod\ n)+1})$$

that depends on the key-shared-between-two-parties $R_{v,\ (v\ mod\ n)+1}$ and sid and outputs the function value $K_v^{(R)}$. The function value $K_v^{(R)}$ is stored in the storage 103-$v$.

The function value $K_v^{(L)}$ and the function value $K_v^{(R)}$ are input to the XOR unit 110-$v$. The XOR unit 110-$v$ obtains the XOR $$T_v=K_v^{(L)}(+)K_v^{(R)}$$

of the function value $K_v^{(L)}$ and the function value $K_v^{(R)}$ and outputs the XOR $T_v$.

A random number $k_v$ and the XOR $T_v$ are output from the output unit 102-$v$ and transmitted to the key distribution management device 150.

The XORs $T_1, \ldots, T_n$, and T' and random numbers $k_2, \ldots, k_n$ are input to the input unit 151 of the key distribution management device 150 (FIG. 3) and stored in the storage 157. The XOR unit 156 obtains the XOR k' of a plurality of values including the random numbers $k_2, \ldots, k_n$ read from the storage 157 and outputs the XOR k'. The XOR k' of a plurality of values including the random numbers $k_2, \ldots, k_n$ may be the XOR of the random numbers $k_2, \ldots, k_n$ or the XOR of the random numbers $k_2, \ldots, k_n$ and another additional value. For example, the arithmetic unit 153 generates a random number $k_s$, and the XOR unit 156 obtains the XOR $$k'=k_2(+)\ldots(+)k_n(+)k_s$$

of the random numbers $k_2, \ldots, k_n$ and $k_s$ and outputs the XOR k'.

Moreover, the XOR unit 156 reads XORs $T_1, \ldots, T_{v-1}$ from the storage 157 for $v=2, \ldots, n$, obtains the XOR $$T_v'=T_1(+)\ldots(+)T_{v-1}$$

of the XORs $T_1, \ldots, T_{v-1}$, and outputs the XOR $T_v'$.

The output unit 152 transmits the XOR k' to the terminal device 100-1 and transmits the XORs T', k', and $T_v'$ to the terminal device 100-$v$ (where $v=2, \ldots, n$).

Figure 7:
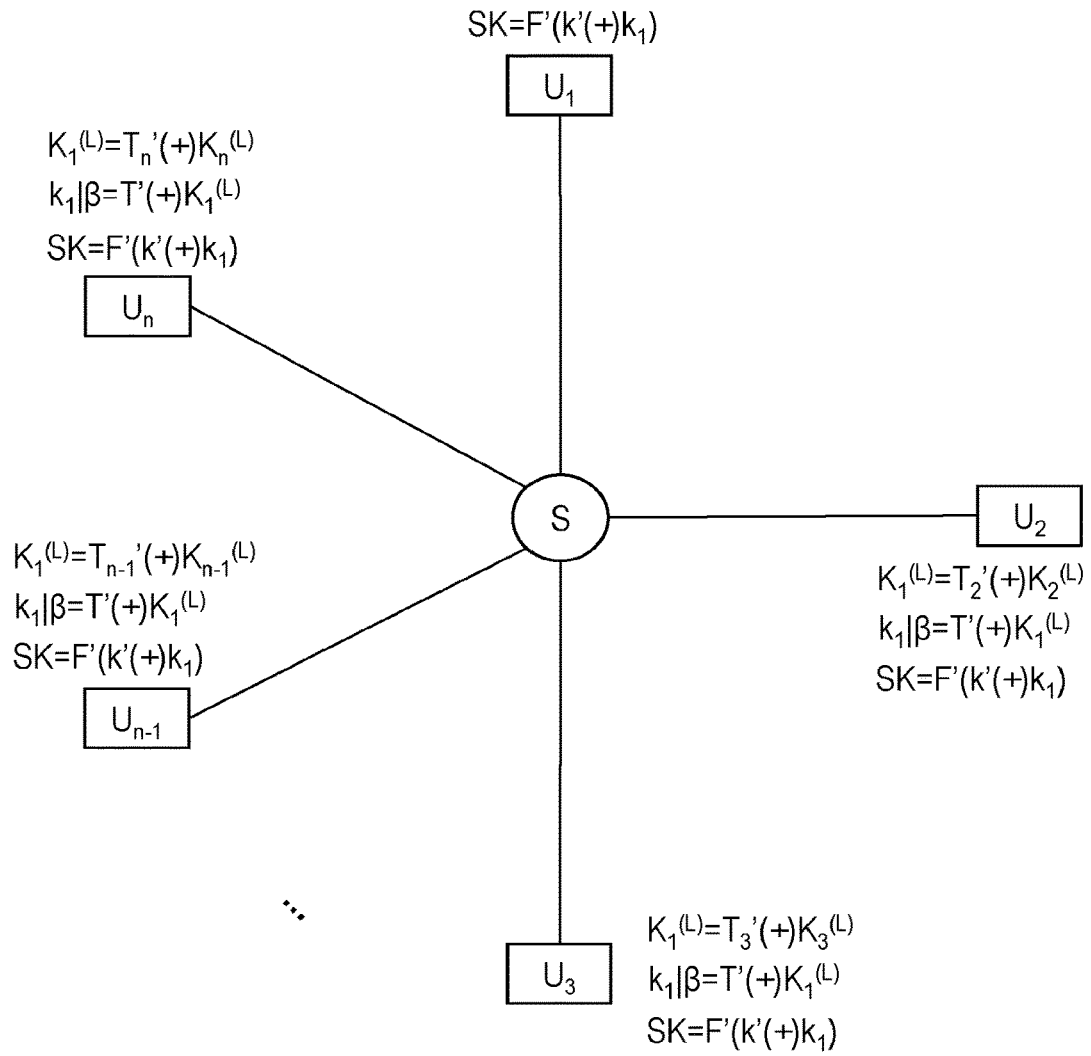
FIG. 7 is a diagram for explaining the key exchange method (shared key generation) of the embodiment.

<<Shared Key Generation (FIG. 7)>>

The terminal device 100-1 (terminal device $U_1$) and the terminal device 100-$v$ (terminal device $U_v$), which is not the terminal device 100-1 (terminal device $U_1$), perform different processing in shared key generation.

Terminal device 100-1 (terminal device $U_1$):

The XOR k' is input to (accepted by) the input unit 101-1 of the terminal device 100-1. The shared key generation unit 112-1 obtains a function value of the XOR $k'(+)k_1$ of the XOR k' and the random number $k_1$ read from the storage 103-1 as a shared key $$SK=F'(k'(+)k_1)$$

and outputs the shared key SK. An example of F' is a one-way function. The shared key SK may be a value that depends only on $k'(+)k_1$ or a value that depends on $k'(+)k_1$ and another piece of additional information. Examples of the other piece of additional information are sid and a key obtained based on another cryptosystem (for example, attribute-based encryption).

Reference Literature 2 (attribute-based encryption): Yongtao Wang, "Lattice Ciphertext Policy Attribute-based Encryption in the Standard Model," International Journal of Network Security, Vol. 16, No. 6, PP. 444-451, November 2014.

Terminal device 100-$v$ (terminal device $U_v$):

The XORs T', k', and $T_v'$ are input to (accepted by) the input unit 101-$v$ of the terminal device 100-$v$. The function value reconstruction unit 111-$v$ obtains the function value $K_1^{(L)}$ by XORing the XOR $T_v'$ with the function value $K_v^{(L)}$ read from the storage 103-$v$ and outputs the function value $K_1^{(L)}$. The reason why the function value $K_1^{(L)}$ is obtained is as follows.

$$T_v'(+)K_v^{(L)}$$

$$=T_1(+)\ldots(+)T_{v-1}(+)K_v^{(L)}$$

$$=K_1^{(L)}(+)K_1^{(R)}(+)K_2^{(L)}(+)K_2^{(R)}(+)\ldots(+)K_{v-1}^{(L)}(+)K_{v-1}^{(R)}(+)K_v^{(L)}$$

$$=K_1^{(L)}$$

The random number reconstruction unit 113-$v$ obtains the function value $B(k_1)$ of the random number $k_1$ by XORing the XOR T' with the function value $K_1^{(L)}$ and outputs the function value $B(k_1)$. The reason why the function value $B(k_1)$ is obtained is as follows.

$$T(+)K_1^{(L)}$$

$$=B(k_1)(+)K_1^{(L)}(+)K_1^{(L)}$$

$$=B(k_1)$$

The shared key generation unit 112-$v$ extracts the random number $k_1$ from the function value $B(k_1)$ (for example, $B(k_1)=k_1|\beta$), and obtains a function value of the XOR $k'(+)k_1$ of the XOR k' and the random number $k_1$ obtained from the function value $B(k_1)$ as the shared key $$SK=F'(k'(+)k_1)$$

and outputs the shared key SK.

In the storage 103-$i$ (where $i=1, \ldots, n$) of each terminal device 100-$i$ (terminal device $U_i$), a function value $r=F''(SK)$ updated by using the shared key SK and keys-shared-between-two-parties $H_i^{(L)}=R_{(i-2\ mod\ n)+1,\ i}$ and $H_i^{(R)}=R_{i,\ (i\ mod\ n)+1}$ are stored.

<Features of the Present Embodiment>

In the present embodiment, a key capsule-type key exchange between two parties is adopted, which makes it possible to perform a key exchange between two parties which conforms to post-quantum cryptography of the public key cryptosystem and, by using this key exchange, configure a quantum-safe multiparty key exchange system. That is, in Round1, each terminal device transmits a key encryption key which conforms to post-quantum cryptography to a neighboring terminal device; in Round2, each terminal device generates a key capsule of a key-shared-between-two-parties using the received key encryption key and returns the key capsule to a terminal device which is a source of the key encryption key; in Round3, each terminal device generates information based on the key-shared-between-two-parties and transmits the information to the key distribution management device and the key distribution management device distributes information, which is obtained based on these pieces of information, to the terminal devices. Each terminal device can calculate a shared key based on the distributed information. On the other hand, the key distribution management device cannot know a shared key from the information sent from each terminal device.

The processing to share a key-shared-between-two-parties is quantum-safe, and a multiparty key exchange based thereon is also quantum-safe.

Second Embodiment

A second embodiment will be described. In the second embodiment, after the processing of the first embodiment is performed, a new terminal device 100-($n$+1) (terminal device $U_{n+1}$) is added and a shared key SK is shared among n+1 terminal devices 100-1 to 100-($n$+1) (terminal devices $U_1, \ldots, U_{n+1}$).

<Configuration>

Figure 8:
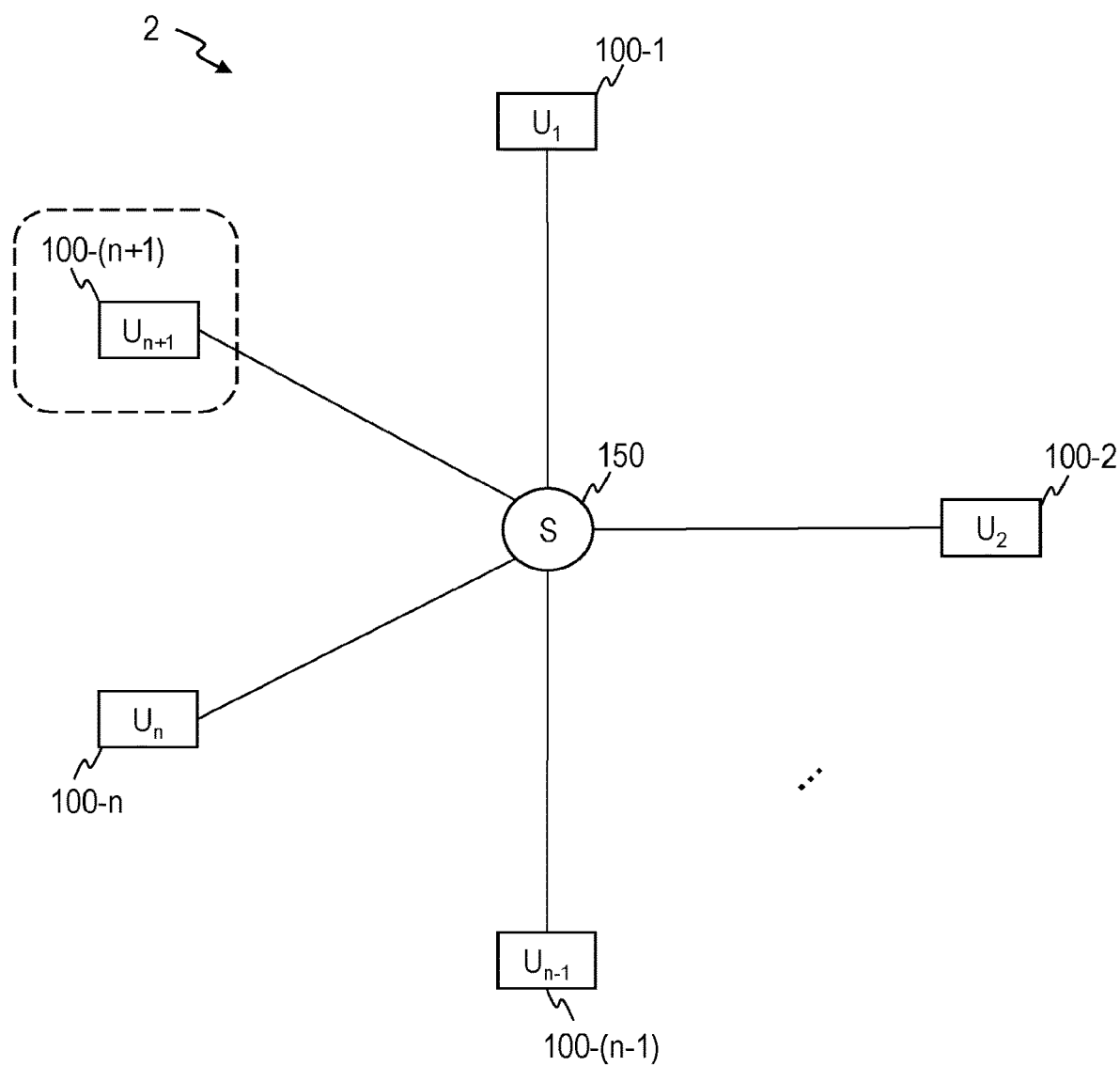
FIG. 8 is a block diagram illustrating the configuration of a key exchange system of a second embodiment.

As illustrated in FIG. 8, a key exchange system 2 of the present embodiment includes n terminal devices 100-1 to 100-$n$ (terminal devices $U_1, \ldots, U_n$), a new terminal device 100-($n$+1) (terminal device $U_{i+1}$) which is added, and a key distribution management device 150. Each terminal device 100-$i$ (terminal device $U_i$) (where i=1, . . . , n) and the terminal device 100-($n$+1) are configured so that the terminal device 100-$i$ and the terminal device 100-($n$+1) can communicate with the key distribution management device 150 through the Internet or the like.

Figure 9:
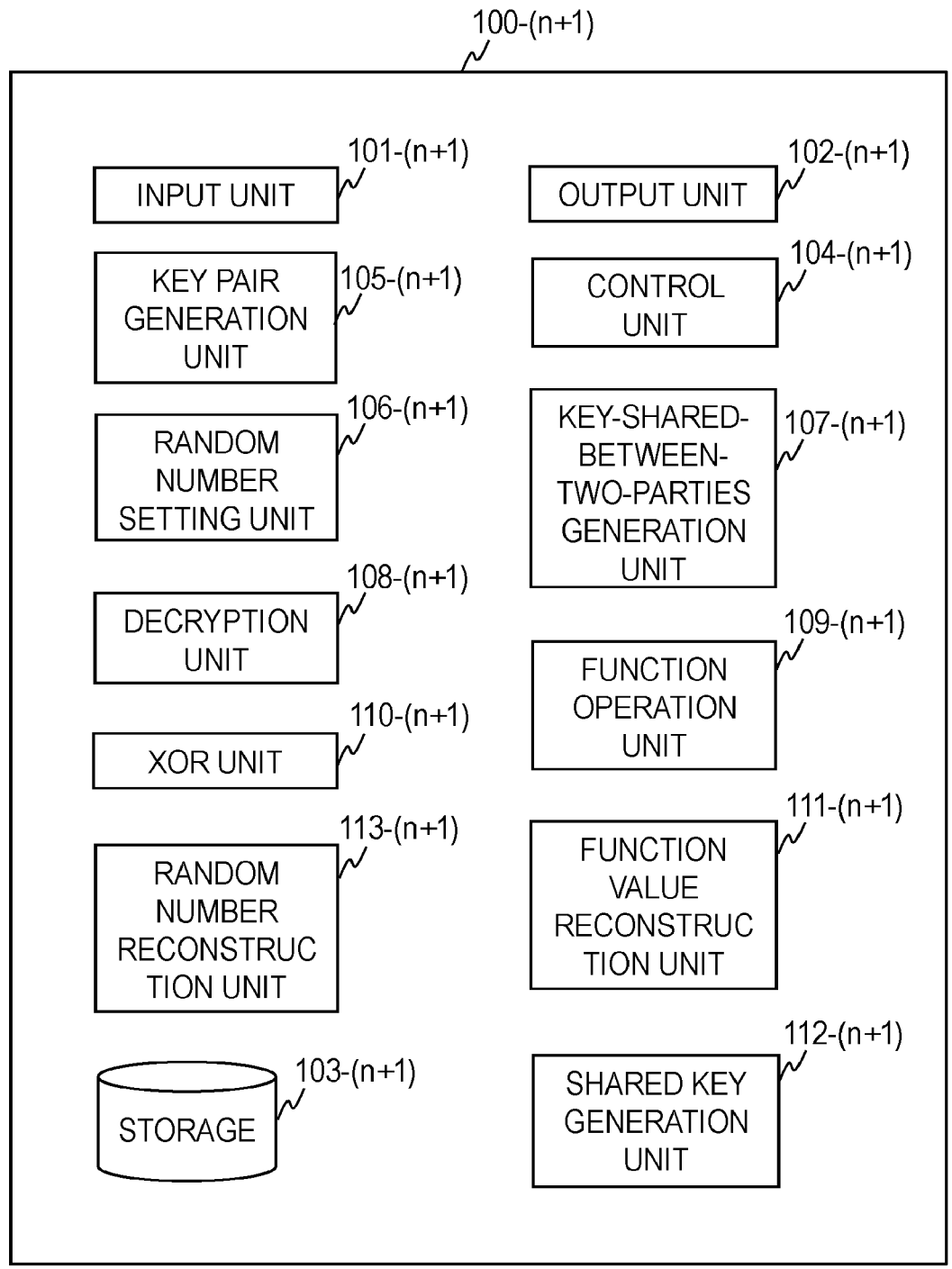
FIG. 9 is a block diagram illustrating the configuration of a terminal device of the embodiment.

As illustrated in FIG. 9, the terminal device 100-($n$+1) includes an input unit 101-($n$+1), an output unit 102-($n$+1), a storage 103-($n$+1), a control unit 104-($n$+1), a key pair generation unit 105-($n$+1), a random number setting unit 106-($n$+1), a key-shared-between-two-parties generation unit 107-($n$+1), a decryption unit 108-($n$+1), a function operation unit 109-($n$+1), an XOR unit 110-($n$+1), a function value reconstruction unit 111-($n$+1), a random number reconstruction unit 113-($n$+1), and a shared key generation unit 112-($n$+1). The terminal device 100-($n$+1) executes each processing under the control of the control unit 104-($n$+1). The data obtained by the processing is stored in the storage 103-($n$+1), and is read from the storage 103-($n$+1) when necessary and used for other processing.

<Processing>

Next, key exchange processing which is performed after the addition of the terminal device 100-($n$+1) will be described. The key exchange processing of the present embodiment includes Round1, Round2, Round3, and shared key generation. It is assumed that the function value r=F'' (SK) of the shared key SK and the keys-shared-between-two-parties $H_i^{(L)}=R_{(i-2 \bmod n)+1, i}$ and $H_i^{(R)}=R_{i, (i \bmod n)+1}$, which were obtained by the processing of the first embodiment, are stored in the storage 103-$i$ (where i=1, . . . , n) of each terminal device 100-$i$ (terminal device $U_i$) (FIG. 2).

Figure 10:
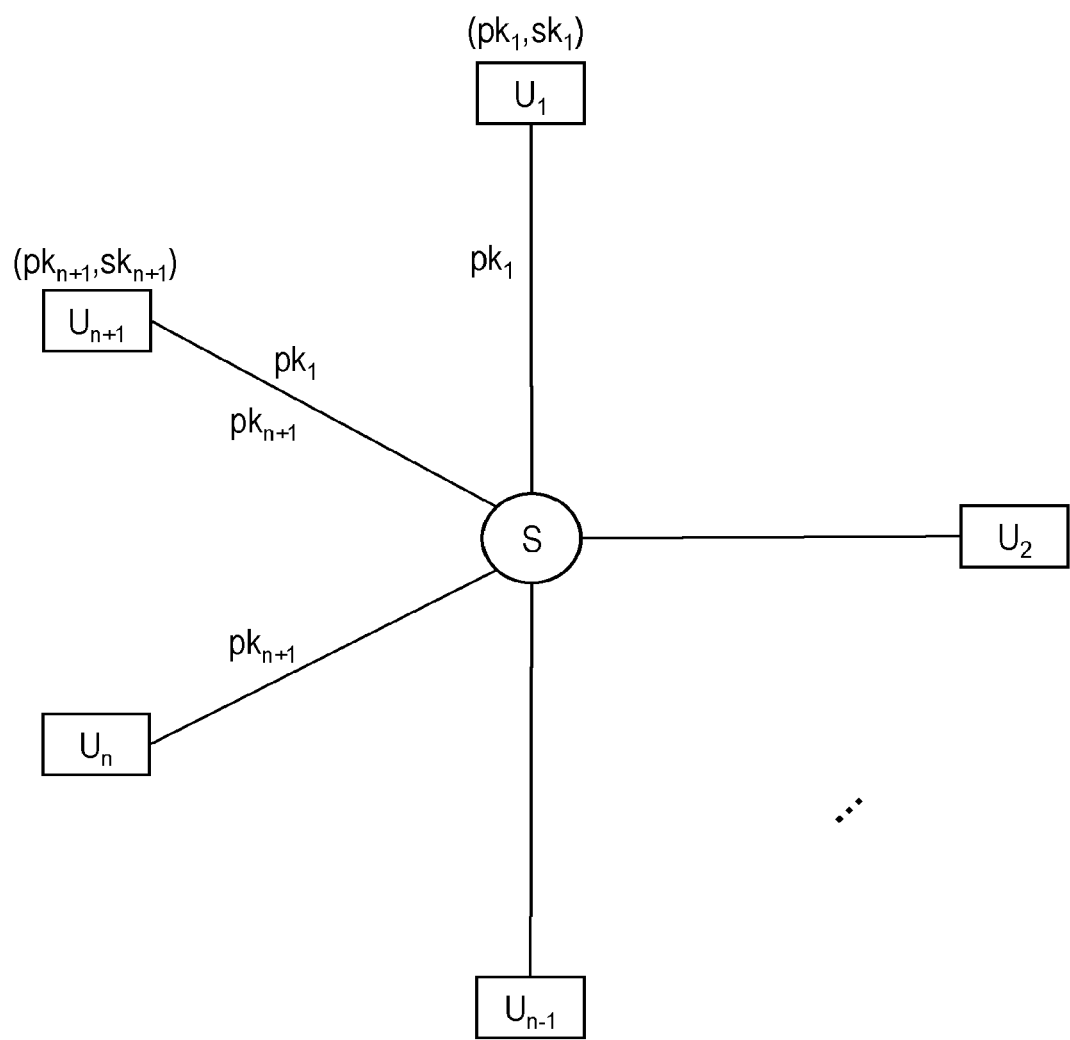
FIG. 10 is a diagram for explaining a key exchange method (Round1) of the embodiment, which is performed after the addition of a terminal device.

<<Round1 (FIG. 10)>>

Terminal device 100-1 (terminal device $U_1$):

The key pair generation unit 105-1 of the terminal device 100-1 (FIG. 2) generates a key pair ($pk_1$, $sk_1$) consisting of a key capsule decryption key $sk_1$, which conforms to post-quantum cryptography of the public key cryptosystem, and a key encryption key $pk_1$ corresponding to the key capsule decryption key $sk_1$. The generated key capsule decryption key $sk_1$ and key encryption key $pk_1$ are stored in the storage 103-1. Moreover, the key encryption key $pk_1$ is output from the output unit 102-1 and transmitted to the key distribution management device 150.

Terminal device 100-($n$+1) (terminal device $U_{n+i}$):

The key pair generation unit 105-($n$+1) of the terminal device 100-($n$+1) (FIG. 9) generates a key pair ($pk_{n+1}$, $sk_{n+1}$) consisting of a key capsule decryption key $sk_{n+1}$, which conforms to post-quantum cryptography of the public key cryptosystem, and a key encryption key $pk_{n+1}$ corresponding to the key capsule decryption key $sk_{n+1}$. The generated key capsule decryption key $sk_{n+1}$ and key encryption key $pk_{n+1}$ are stored in the storage 103-($n$+1). Moreover, the key encryption key $pk_{n+1}$ is output from the output unit 102-($n$+1) and transmitted to the key distribution management device 150.

The key encryption keys $pk_1$ and $pk_{n+1}$ are input to the input unit 151 of the key distribution management device 150 (FIG. 3). As soon as the key encryption key $pk_1$ is input to the input unit 151, the control unit 154 sends the key encryption key $pk_1$ to the output unit 152 and the output unit 152 transmits the key encryption key $pk_1$ to the terminal device 100-($n$+1). As soon as the key encryption key $pk_{n+1}$ is input to the input unit 151, the control unit 154 sends the key encryption key $pk_{n+1}$ to the output unit 152 and the output unit 152 transmits the key encryption key $pk_{n+1}$ to the terminal device 100-$n$.

Figure 11:
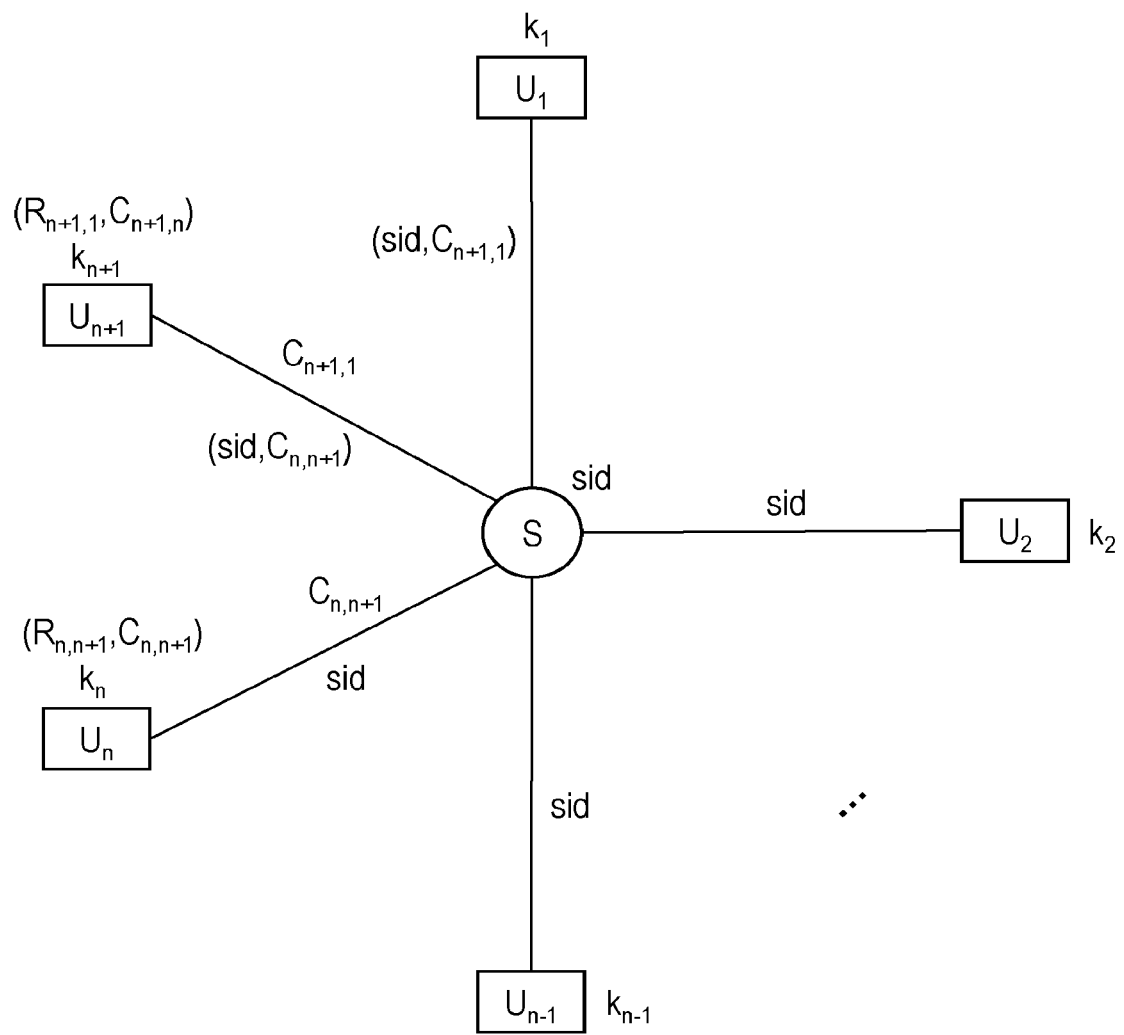
FIG. 11 is a diagram for explaining the key exchange method (Round2) of the embodiment, which is performed after the addition of a terminal device.

<<Round2 (FIG. 11)>>

Terminal device 100-$n$ (terminal device $U_n$):

The input unit 101-$n$ of the terminal device 100-$n$ (FIG. 2) receives the key encryption key $pk_{n+1}$ and stores the key encryption key $pk_{n+1}$ in the storage 103-$n$.

The random number setting unit 106-$n$ of the terminal device 100-$n$ sets a random number $k_n$ and outputs the random number $k_n$. The random number $k_n$ is stored in the storage 103-$n$.

The key-shared-between-two-parties generation unit 107-$n$ obtains, using the key encryption key $pk_{n+1}$, a key-shared-between-two-parties $R_{n,\ n+1}$ and a key capsule $C_{n,\ n+1}$, which is cipher text of the key-shared-between-two-parties $R_{n,\ n+1}$ and outputs the key-shared-between-two-parties $R_{n,\ n+1}$ and the key capsule $C_{n,\ n+1}$ (see, for example, Reference Literature 1 and the like). The key-shared-between-two-parties $R_{n,\ n+1}$ is stored in the storage 103-$n$. The key capsule $C_{n,\ n+1}$ is output from the to output unit 102-$n$ and transmitted to the key distribution management device 150.

Terminal device 100-($n$+1) (terminal device $U_{n+1}$):

The input unit 101-($n$+1) of the terminal device 100-($n$+1) (FIG. 9) receives (accepts) the key encryption key $pk_1$ and stores the key encryption key $pk_1$ in the storage 103-($n$+1).

The random number setting unit 106-($n$+1) of the terminal device 100-($n$+1) sets a random number $k_{n+1}$ and outputs the random number $k_{n+1}$. The random number $k_{n+1}$ is stored in the storage 103-($n$+1).

The key-shared-between-two-parties generation unit 107-($n$+1) obtains, using the key encryption key $pk_1$, a key-shared-between-two-parties $R_{n+1,\ 1}$ and a key capsule $C_{n+1,\ 1}$, which is cipher text of the key-shared-between-two-parties $R_{n+1,\ 1}$, and outputs the key-shared-between-two-parties $R_{n+1,\ 1}$ and the key capsule $C_{n+1,\ 1}$ (see, for example, Reference Literature 1 and the like). The key-shared-between-two-parties $R_{n+1,\ 1}$ is stored in the storage 103-($n$+1). The key capsule $C_{n+1,\ 1}$ is output from the output unit 102-($n$+1) and transmitted to the key distribution management device 150.

Terminal device 100-$\rho$ (terminal device $U_\rho$):

The random number setting unit 106-$\rho$ of the terminal device 100-$\rho$ (where $\rho$=1, . . . , n−1) sets a random number $k_\rho$ and outputs the random number $k_\rho$. The random number $k_\rho$ is stored in the storage 103-$\rho$.

The input unit 151 of the key distribution management device 150 (FIG. 3) receives the key capsule $C_{n,\ n+1}$ transmitted from the terminal device 100-$n$ and the key capsule $C_{n+1,\ 1}$ transmitted from the terminal device 100-($n$+1). The SID setting unit 155 newly generates sid and chooses the terminal device 100-1 as a representative terminal device. The arithmetic unit 153 generates (sid, and (sid, $C_{n,\ n+1}$).

(sid, $C_{n,\,n+1}$) is output from the output unit 152 and transmitted to the terminal device 100-($n$+1). (sid, $C_{n+1,\,1}$) is output from the output unit 152 and transmitted to the terminal device 100-1. The output unit 152 transmits, to the terminal device 100-1, information (notification about being chosen as a representative) indicating that the terminal device 100-1 has been chosen as a representative terminal device. Furthermore, sid is output from the output unit 152 and transmitted to a terminal device 100-$v$ (where $v$= 2, . . . , n).

Figure 12:
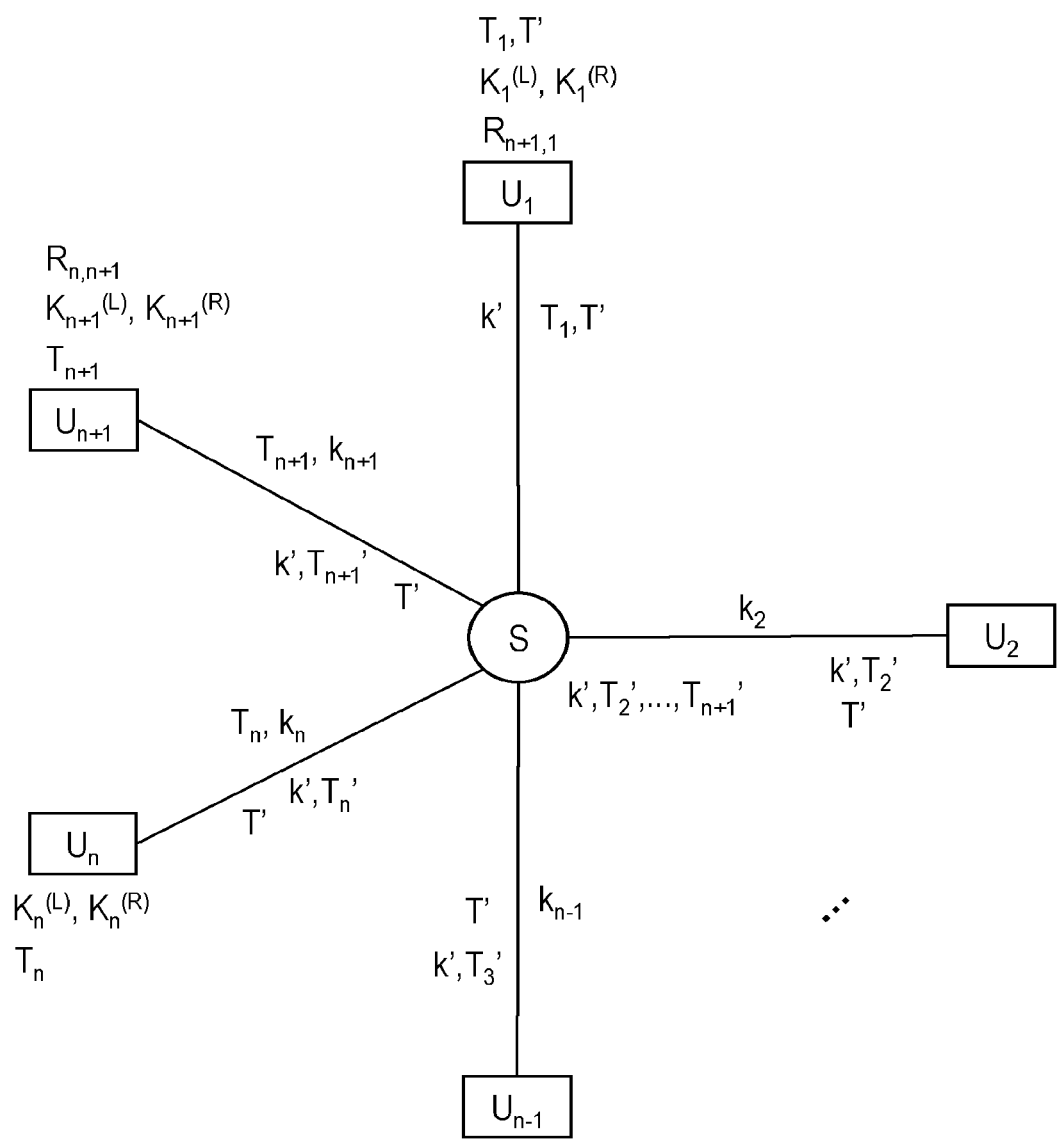
FIG. 12 is a diagram for explaining the key exchange method (Round3) of the embodiment, which is performed after the addition of a terminal device.

<<Round3 (FIG. 12)>>

The terminal device 100-1 (terminal device $U_1$), the terminal device 100-$n$ (terminal device $U_n$), the terminal device 100-($n$+1) (terminal device $U_{n+1}$), and a terminal device 100-$z$ (terminal device $U_z$), which is not the terminal device 100-1 (terminal device $U_1$), the terminal device 100-$n$ (terminal device $U_n$), and the terminal device 100-($n$+1) (terminal device $U_{n+1}$), perform different processing in Round3 of the present embodiment. Here, $z$=2, . . . , n−1.

Terminal device 100-1 (terminal device $U_1$):

(sid, $C_{n+1,\,1}$) and the notification about being chosen as a representative are input to the input unit 101-1 of the terminal device 100-1. When the notification about being chosen as a representative is received, the control unit 104-1 performs the following control.

The decryption unit 108-1 obtains the key-shared-between-two-parties $R_{n+1,\,1}$ by decrypting the key capsule $C_{n+1,\,1}$ using the key capsule decryption key $sk_1$ read from the storage 103-1 and outputs the key-shared-between-two-parties $R_{n+1,\,1}$. The key-shared-between-two-parties $R_{n+1,\,1}$ is stored in the storage 103-1.

Next, the function operation unit 109-1 obtains a function value $K_1^{(L)}$ of the key-shared-between-two-parties $R_{n+1,\,1}$ and outputs the function value $K_1^{(L)}$. The function value $K_1^{(L)}$ may be a value that depends only on the key-shared-between-two-parties $R_{n+1,\,1}$ or a value that depends on the key-shared-between-two-parties $R_{1+1,\,1}$ and another piece of additional information. Here, $K_1^{(L)} = K_{n+1}^{(R)}$ has to be satisfied for $K_{n+1}^{(R)}$, which will be described later. For instance, the function operation unit 109-1 obtains the function value $$K_1^{(L)} = F(sid, R_{n+1,\,1})$$

that depends on the key-shared-between-two-parties $R_{n+1,\,1}$ and sid and outputs the function value $K_1^{(L)}$. The function value $K_1^{(L)}$ is stored in the storage 103-1.

Moreover, the function operation unit 109-1 reads the function value r from the storage 103-1, and obtains a function value $K_1^{(R)}$ of the function value r and outputs the function value $K_1^{(R)}$. The function value $K_1^{(R)}$ may be a value that depends only on the function value r or a value that depends on the function value r and another piece of additional information. Here, $K_1^{(R)} = K_n^{(L)}$ has to be satisfied. For instance, the function operation unit 109-1 obtains the function value $$K_1^{(R)} = F(sid, r)$$

that depends on the function value r and sid and outputs the function value $K_1^{(R)}$. The function value $K_1^{(R)}$ is stored in the storage 103-1.

The function value $K_1^{(L)}$ and the function value $K_1^{(R)}$ are input to the XOR unit 110-1. The XOR unit 110-1 obtains the XOR $$T_1 = K_1^{(L)}(+)K_1^{(R)}$$

of the function value $K_1^{(L)}$ and the function value $K_1^{(R)}$ and outputs the XOR $T_1$.

A random number $k_1$ read from the storage 103-1 is further input to the XOR unit 110-1. The XOR unit 110-1 obtains the XOR $$T' = B(k_1)(+)K_1^{(L)}$$

of a function value $B(k_1)$ of the random number $k_1$ and the function value $K_1^{(L)}$ and outputs the XOR T'. As described earlier, an example of the function value $B(k_1)$ is bit concatenation $k_1|\beta$ of the random number $k_1$ and another piece of additional information $\beta$.

The XORs $T_1$ and T' are output from the output unit 102-1 and transmits to the key distribution management device 150.

Terminal device 100-$n$ (terminal device $U_n$):

The function operation unit 109-$n$ reads the function value r from the storage 103-$n$, and obtains a function value $K_n^{(L)}$ of the function value r and outputs the function value $K_n^{(L)}$. The function value $K_n^{(L)}$ may be a value that depends only on the function value r or a value that depends on the function value r and another piece of additional information. Here, $K_n^{(L)} = K_1^{(R)}$ has to be satisfied. For instance, the function operation unit 109-$n$ obtains the function value $$K_n^{(L)} = F(sid, r)$$

that depends on the function value r and sid and outputs the function value $K_n^{(L)}$. The function value $K_n^{(L)}$ is stored in the storage 103-$n$.

The function operation unit 109-$n$ reads the key-shared-between-two-parties $R_{n,\,n+1}$ from the storage 103-$n$, and obtains a function value $K_n^{(R)}$ of the key-shared-between-two-parties $R_{n,\,n+1}$ and outputs the function value $K_n^{(R)}$. The function value $K_n^{(R)}$ may be a value that depends only on the key-shared-between-two-parties $R_{n,\,n+1}$ or a value that depends on the key-shared-between-two-parties $R_{n,\,n+1}$ and another piece of additional information. Here, $K_n^{(R)} = K_{n+1}^{(L)}$ has to be satisfied. For instance, the function operation unit 109-$n$ obtains the function value $$K_n^{(R)} = F(sid, R_{n,n+1})$$

that depends on the key-shared-between-two-parties $R_{n,\,n+1}$ and sid and outputs the function value $K_n^{(R)}$. The function value $K_n^{(R)}$ is stored in the storage 103-$n$.

The function value $K_n^{(L)}$ and the function value $K_n^{(R)}$ are input to the XOR unit 110-$n$. The XOR unit 110-$n$ obtains the XOR $$T_n = K_n^{(L)}(+)K_n^{(R)}$$

of the function value $K_n^{(L)}$ and the function value $K_n^{(R)}$ and outputs the XOR $T_n$.

The random number $k_n$ read from the storage 103-$n$ and the XOR $T_n$ are output from the output unit 102-$n$ and transmitted to the key distribution management device 150.

Terminal device 100-($n$+1) (terminal device $U_{n+1}$):

(sid, $C_{n,\,n+1}$) is input to the input unit 101-($n$+1) of the terminal device 100-($n$+1).

The decryption unit 108-($n$+1) obtains the key-shared-between-two-parties $R_{n,\,n+1}$ by decrypting the key capsule $C_{n,\,n+1}$ using the key capsule decryption key $sk_{n+1}$ read from the storage 103-($n$+1) and outputs the key-shared-between-two-parties $R_{n,\,n+1}$. The key-shared-between-two-parties $R_{n,\,n+1}$ is stored in the storage 103-($n$+1).

Next, the function operation unit 109-($n$+1) obtains a function value $K_{n+1}^{(L)}$ of the key-shared-between-two-parties $R_{n,\,n+1}$ and outputs the function value $K_{n+1}^{(L)}$. The function value $K_{n+1}^{(L)}$ may be a value that depends only on the key-shared-between-two-parties $R_{n,\,n+1}$ or a value that depends on the key-shared-between-two-parties $R_{n,\,n+1}$ and another piece of additional information. Here, $K_{n+1}^{(L)}=K_n^{(R)}$ has to be satisfied. For instance, the function operation unit 109-($n+1$) obtains the function value $$K_{n+1}^{(L)}=F(sid,R_{n,\,n+1})$$

that depends on the key-shared-between-two-parties $R_{n,\,n+1}$ and sid and outputs the function value $K_{n+1}^{(L)}$. The function value $K_{n+1}^{(L)}$ is stored in the storage 103-($n+1$).

The function operation unit 109-($n+1$) reads the key-shared-between-two-parties $R_{n+1,\,1}$ from the storage 103-($n+1$), and obtains a function value $K_{n+1}^{(R)}$ of the key-shared-between-two-parties $R_{n+1,\,1}$ and outputs the function value $K_{n+1}^{(R)}$. The function value $K_{n+1}^{(R)}$ may be a value that depends only on the key-shared-between-two-parties $R_{n+1,\,1}$ or a value that depends on the key-shared-between-two-parties $R_{n+1,\,1}$ and another piece of additional information. Here, $K_{n+1,\,1}^{(R)}=K_1^{(L)}$ has to be satisfied. For instance, the function operation unit 109-($n+1$) obtains the function value $$K_{n+1}^{(R)}=F(sid,R_{n+1,\,1})$$

that depends on the key-shared-between-two-parties $R_{n+1,\,1}$ and sid and outputs the function value $K_{n+1}^{(R)}$. The function value $K_{n+1}^{(R)}$ is stored in the storage 103-($n+1$).

The function value $K_{n+1}^{(L)}$ and the function value $K_{n+1}^{(R)}$ are input to the XOR unit 110-($n+1$). The XOR unit 110-($n+1$) obtains the XOR $$T_{n+1}=K_{n+1}^{(L)}(+)K_{n+1}^{(R)}$$

of the function value $K_{n+1}^{(L)}$ and the function value $K_{n+1}^{(R)}$ and outputs the XOR $T_{n+1}$.

The random number $k_{n+1}$ read from the storage 103-($n+1$) and the XOR $T_{n+1}$ are output from the output unit 102-($n+1$) and transmitted to the key distribution management device 150.

Terminal device 100-$z$ (terminal device $U_z$) ($z=2, \ldots, n-1$):

A random number $k_z$ read from the storage 103-$z$ is output from the output unit 102-$z$ and transmitted to the key distribution management device 150.

The XORs $T_1$, $T_n$, $T_{n+1}$, and and random numbers $k_2, \ldots, k_{n+1}$ are input to the input unit 151 of the key distribution management device 150 (FIG. 3) and stored in the storage 157. The XOR unit 156 obtains the XOR k' of a plurality of values including the random numbers $k_2, \ldots, k_{n+1}$ read from the storage 157 and outputs the XOR k'. The XOR k' of a plurality of values including the random numbers $k_2, \ldots, k_{n+1}$ may be the XOR of the random numbers $k_2, \ldots, k_{n+1}$ or the XOR of the random numbers $k_2, \ldots, k_{n+1}$ and another additional value. For example, the arithmetic unit 153 generates a random number $k_s$, and the XOR unit 156 obtains the XOR $$k'=k_2(+) \ldots (+)k_{n+1}(+)k_s$$

of the random numbers $k_2$, $k_{n+1}$ and $k_s$ and outputs the XOR k'.

Moreover, the XOR unit 156 reads the XORs $T_1, \ldots, T_{w-1}$ from the storage 157 for $w=2, \ldots, n+1$, and obtains the XOR $$T_w'=T_1(+) \ldots (+)T_{w-1}$$

of the XORs $T_1, \ldots, T_{w-1}$, of which the XORs $T_2, \ldots, T_{n-1}$ are nulls, and outputs the XOR $T_w'$. That is, $T_w'=T_1$ when $2 \le w \le n$ and $T_w'=T_1(+)T_n$ when $w=n+1$.

The output unit 152 transmits the XOR k' to the terminal device 100-1 and transmits the XORs T', k', and $T_w'$ to a terminal device 100-$w$ (where $w=2, \ldots, n+1$).

Figure 13:
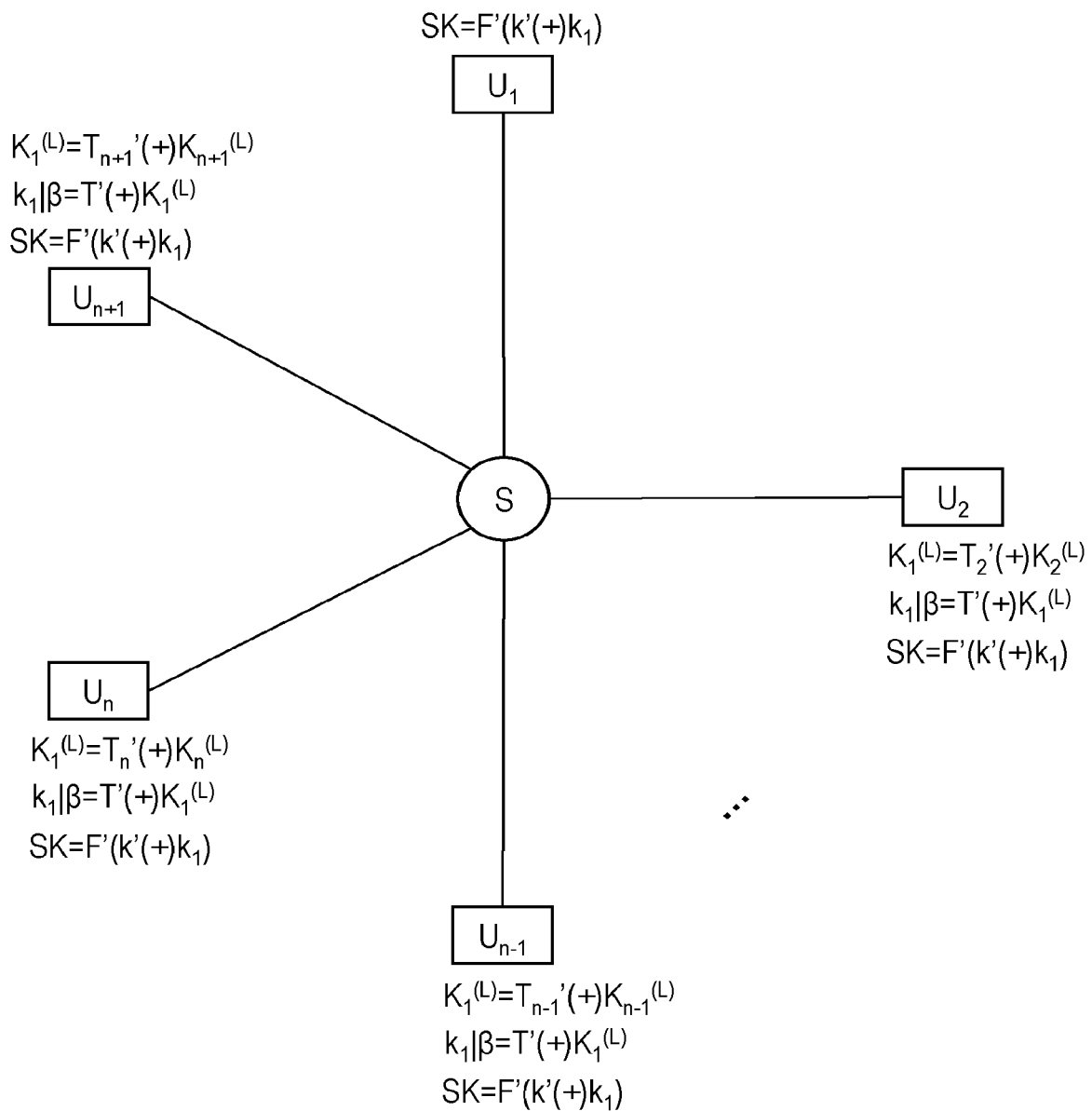
FIG. 13 is a diagram for explaining the key exchange method (shared key generation) of the embodiment, which is performed after the addition of a terminal device.

<<Shared Key Generation (FIG. 13)>>

The terminal device 100-1 (terminal device $U_1$), the terminal device 100-$n$ (terminal device $U_n$), the terminal device 100-($n+1$) (terminal device $U_{n+1}$), and the terminal device 100-$\rho$ (terminal device $U_\rho$), which is not the terminal device 100-1 (terminal device $U_1$), the terminal device 100-$n$ (terminal device $U_n$), and the terminal device 100-($n+1$) (terminal device $U_{n+1}$), perform different processing in shared key generation.

Terminal device 100-1 (terminal device $U_1$):

The XOR k' is input to the input unit 101-1 of the terminal device 100-1. The shared key generation unit 112-1 obtains a function value of the XOR k'(+)$k_1$ of the XOR k' and the random number $k_1$ read from the storage 103-1 as a shared key $$SK=F(k'(+)k_1)$$

and outputs the shared key SK.

Terminal device 100-$n$ (terminal device $U_n$):

The XORs T', k', and $T_n'$ are input to the input unit 101-$n$ of the terminal device 100-$n$. The function value reconstruction unit 111-$n$ obtains the function value $K_1^{(L)}$ by XORing the XOR $T_n'$ with the function value $K_n^{(L)}$ read from the storage 103-$n$ and outputs the function value $K_1^{(L)}$. The reason why the function value $K_1^{(L)}$ is obtained is as follows (the XORs $T_2, \ldots, T_{n-1}$ are nulls and $K_1^{(R)}=K_n^{(L)}$).

$$T_n'(+)K_n^{(L)}$$
$$=T_1(+) \ldots (+)T_{n-1}(+)K_n^{(L)}$$
$$=T_1(+)K_n^{(L)}$$
$$K_1^{(L)}(+)K_1^{(R)}(+)K_n^{(L)}$$
$$=K_1^{(L)}$$

The random number reconstruction unit 113-$n$ obtains the function value $B(k_1)$ of the random number $k_1$ by XORing the XOR T' with the function value $K_1^{(R)}$ and outputs the function value $B(k_1)$. The reason why the function value $B(k_1)$ is obtained has been described earlier.

The shared key generation unit 112-$n$ extracts the random number $k_1$ from the function value $B(k_1)$ (for example, $B(k_1)=k_1|\beta$), and obtains a function value of the XOR k'(+)$k_1$ of the XOR k' and the random number $k_1$ obtained from the function value $B(k_1)$ as the shared key $$SK=F(k'(+)k_1)$$

and outputs the shared key SK.

Terminal device 100-($n+1$) (terminal device $U_{n+1}$):

The XORs T', k', and $T_{n+1}'$ are input to the input unit 101-($n+1$) of the terminal device 100-($n+1$). The function value reconstruction unit 111-($n+1$) obtains the function value $K_1^{(L)}$ by XORing the XOR $T_{n+1}'$ with the function value $K_{n+1}^{(L)}$ read from the storage 103-($n+1$) and outputs the function value $K_1^{(L)}$. It is to be noted that the reason why the function value $K_1^{(L)}$ is obtained is as follows (the XORs $T_2, \ldots, T_{n-1}$ are nulls and $K_1^{(R)}=K_n^{(L)}$ and $K_n^{(R)}=K_{n+1}^{(L)}$).

$$T_{n+1}'(+)K_{n+1}^{(L)}$$
$$=T_1(+) \ldots (+)T_n(+)K_{n+1}^{(L)}$$
$$=T_1(+)T_n(+)K_{n+1}^{(L)}$$
$$=K_1^{(L)}(+)K_1^{(R)}(+)K_n^{(L)}(+)K_n^{(R)}(+)K_{n+1}^{(L)}$$
$$=K_1^{(L)}$$

The random number reconstruction unit 113-(n+1) obtains the function value $B(k_1)$ of the random number $k_1$ by XORing the XOR T' with the function value $K_1^{(L)}$ and outputs the function value $B(k_1)$.

The shared key generation unit 112-(n+1) extracts the random number $k_1$ from the function value $B(k_1)$ (for example, $B(k_1)=k_1|\beta$), and obtains a function value of the XOR $k'(+)k_1$ of the XOR k' and the random number $k_1$ obtained from the function value $B(k_1)$ as the shared key $$SK=F'(k'(+)k_1)$$

and outputs the shared key SK.

Terminal device 100-$\rho$ (terminal device $U_\rho$) ($\rho=1, \ldots, n-1$):

The XORs T', k', and $T_\rho'$ are input to the input unit 101-$\rho$ of the terminal device 100-$\rho$. The function value reconstruction unit 111-$\rho$ obtains the function value $K_1^{(L)}$ by XORing the XOR $T_\rho'$ with the function value $(=K_1^{(R)})$ of the function value r read from the storage 103-$\rho$ and outputs the function value $K_1^{(L)}$.

The random number reconstruction unit 113-$\rho$ obtains the function value $B(k_1)$ of the random number $k_1$ by XORing the XOR T' with the function value $K_1^{(L)}$ and outputs the function value $B(k_1)$.

The shared key generation unit 112-$\rho$ extracts the random number $k_1$ from the function value $B(k_1)$ (for example, $B(k_1)=K_1|\beta$), and obtains a function value of the XOR $k'(+)k_1$ of the XOR k' and the random number $k_1$ obtained from the function value $B(k_1)$ as the shared key $$SK=F'(k'(+)k_1)$$

and outputs the shared key SK.

In the storage 103-$i^{(L)}$ (where i''=1, . . . , n+1) of each terminal device 100-$i''$ (terminal device $U_{i''}$), the function value r=F''(SK) updated by using the new shared key SK and keys-shared-between-two-parties $H_{i''}^{(L)}=R_{(i''-2 \mod n)+1, i''}$ and $H_{i''}^{(R)}=R_{i'', (i'' \mod n)+1}$ are stored.

<Features of the Present Embodiment>

In the present embodiment, the key capsule-type key exchange between two parties is adopted, which makes it possible to perform a key exchange between two parties which conforms to post-quantum cryptography of the public key cryptosystem and, by performing the above-described processing using this key exchange, perform a quantum-safe multiparty key exchange with an added new terminal device.

Third Embodiment

A third embodiment will be described. In the third embodiment, after the processing of the first embodiment is performed, any terminal device 100-$j$ (terminal device $U_j$) (j is an integer greater than or equal to 1 and less than or equal to n) leaves the system and the other n−1 terminal devices 100-1 to 100-($j$−1) and 100-($j$+1) to 100-$n$ (terminal devices $U_1, \ldots, U_{j-1}$ and $U_{j+1}, \ldots, U_n$) share a new shared key SK.

<Configuration>

Figure 14:
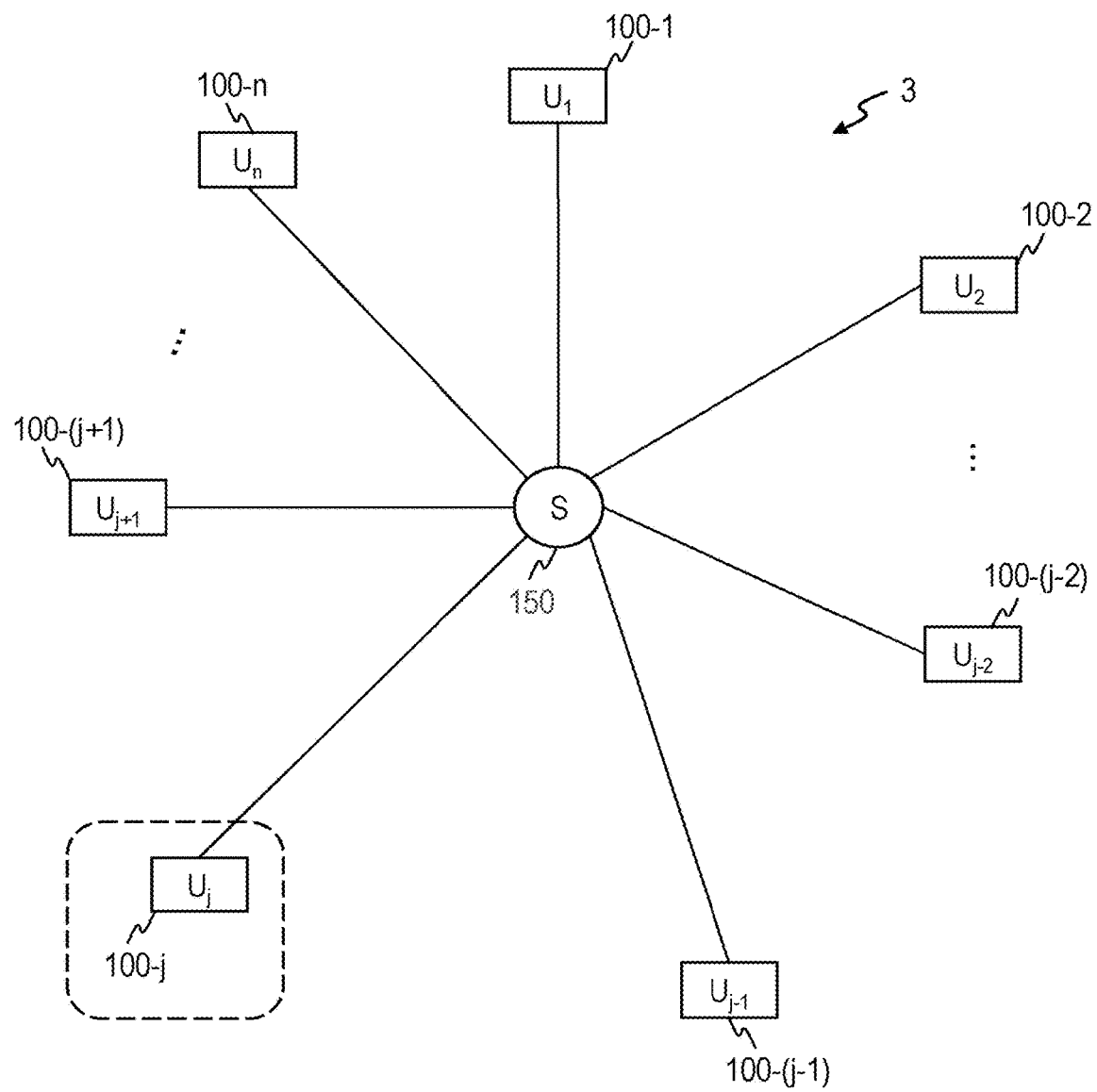
FIG. 14 is a block diagram illustrating the configuration of a key exchange system of a third embodiment.

As illustrated in FIG. 14, a key exchange system 3 of the present embodiment includes n terminal devices 100-1 to 100-$n$ (terminal devices $U_1, \ldots, U_n$) and a key distribution management device 150. Each terminal device 100-$i$ (terminal device $U_i$) (where i=1, . . . , n) is configured so that the terminal device 100-$i$ can communicate with the key distribution management device 150 through the Internet or the like.

<Processing>

Next, key exchange processing which is performed after the terminal device 100-$j$ leaves the key exchange system 3 will be described. The key exchange processing of the present embodiment includes Round1, Round2, Round3, and shared key generation. It is assumed that the keys-shared-between-two-parties $H_i^{(L)}=R_{(i-2 \mod n)+1, i}$ and $H_i^{(R)}=R_{i, (i \mod n)+1}$ obtained by the processing of the first embodiment are stored in the storage 103-$i$ (where i= 1, . . . , n) of each terminal device 100-$i$ (terminal device $U_i$) (FIG. 2).

Figure 15:
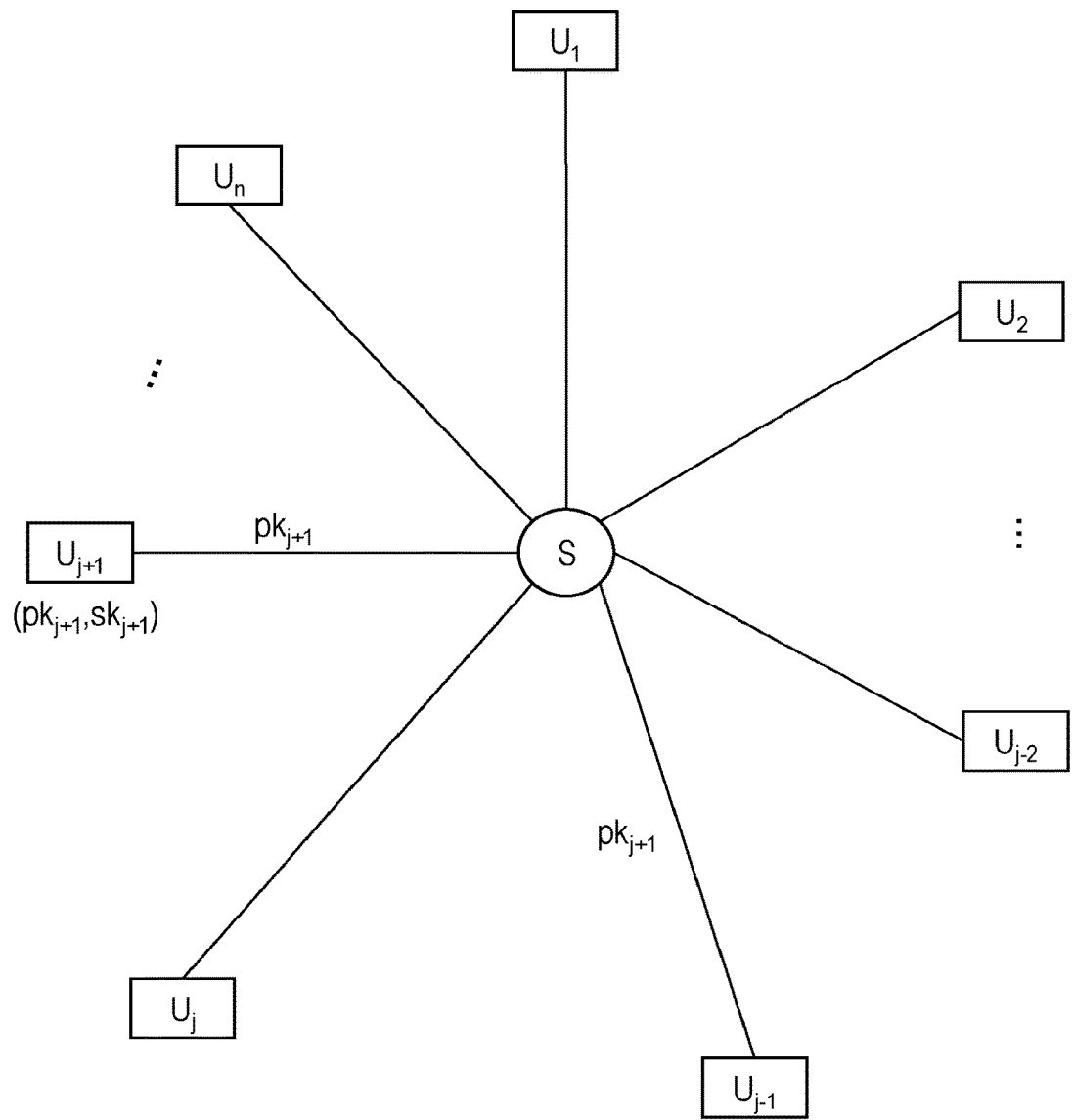
FIG. 15 is a diagram for explaining a key exchange method (Round1) of the embodiment, which is performed after the separation of a terminal device.

<<Round1 (FIG. 15)>>

Terminal device 100-(($j$ mod n)+1) (terminal device $U_{(j \mod n)+1}$):

The key pair generation unit 105-(($j$ mod n)+1) of the terminal device 100-(($j$ mod n)+1) (FIG. 2) generates a key pair ($pk_{(j \mod n)+1}$, $sk_{(j \mod n)+1}$) consisting of a key capsule decryption key $sk_{(j \mod n)+1}$, which conforms to post-quantum cryptography of the public key cryptosystem, and a key encryption key $pk_{(j \mod n)+1}$ corresponding to the key capsule decryption key $sk_{(j \mod n)+1}$. The generated key capsule decryption key $sk_{(j \mod n)+1}$ and key encryption key $pk_{(j \mod n)+1}$ are stored in the storage 103-(($j$ mod n)+1). Moreover, the key encryption key $pk_{(j \mod n)+1}$ is output from the output unit 102-(($j$ mod n)+1) and transmitted to the key distribution management device 150.

The key encryption key $pk_{(j \mod n)+1}$ is input to the input unit 151 of the key distribution management device 150 (FIG. 3). As soon as the key encryption key $pk_{(j \mod n)+1}$ is input to the input unit 151, the control unit 154 sends the key encryption key $pk_{(j \mod n)+1}$ to the output unit 152 and the output unit 152 transmits the key encryption key $pk_{(j \mod n)+1}$ to a terminal device 100-(($j$−2 mod n)+1).

Figure 16:
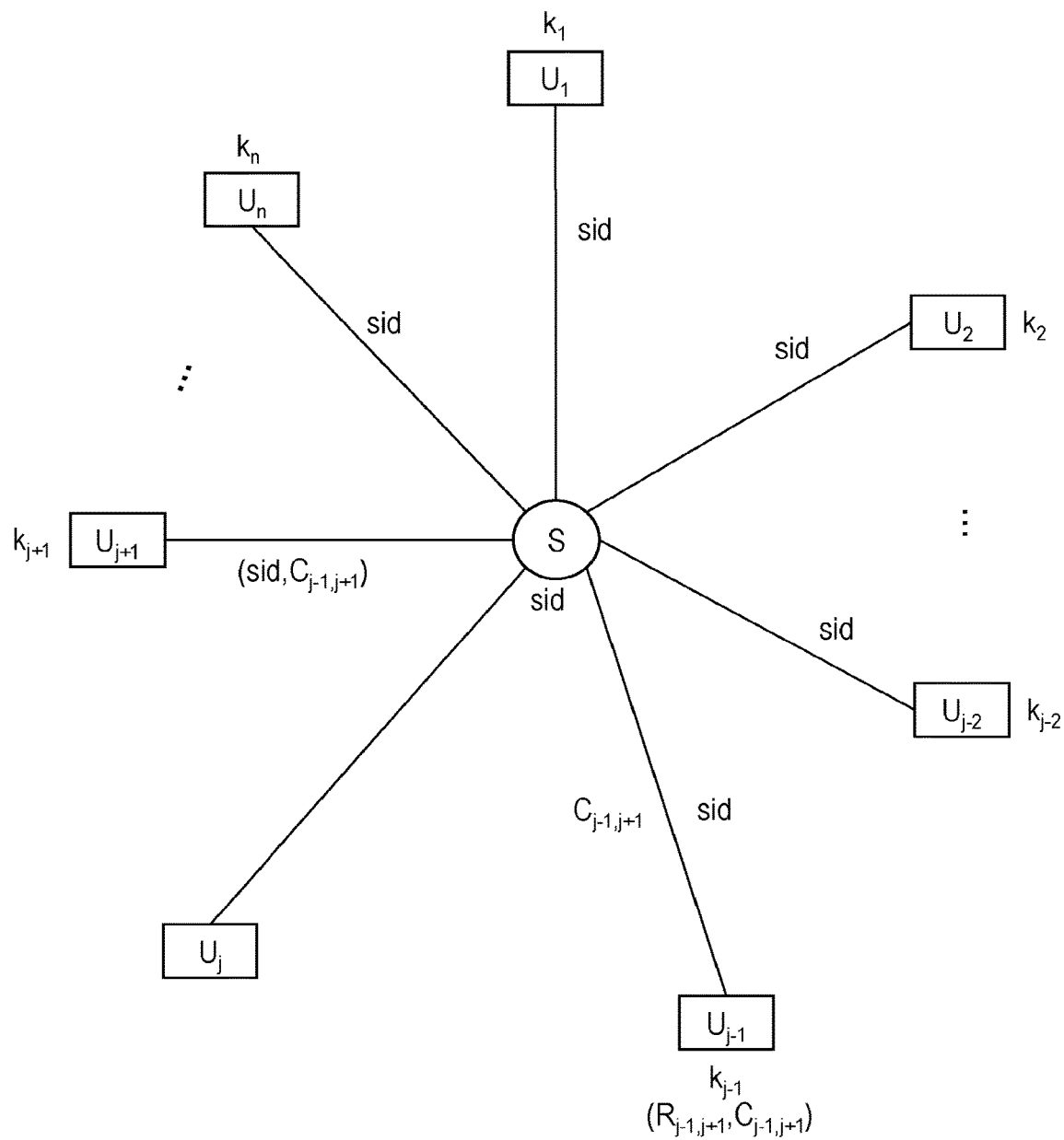
FIG. 16 is a diagram for explaining the key exchange method (Round2) of the embodiment, which is performed after the separation of a terminal device.

<<Round2 (FIG. 16)>>

Terminal device 100-(($j$−2 mod n)+1) (terminal device $U_{(j-2 \mod n)+1}$):

The input unit 101-(($j$−2 mod n)+1) of the terminal device 100-(($j$−2 mod n)+1) (FIG. 2) receives the key encryption key $pk_{(j \mod n)+1}$ and stores the key encryption key $pk_{(j \mod n)+1}$ in the storage 103-(($j$−2 mod n)+1).

The random number setting unit 106-(($j$−2 mod n)+1) of the terminal device 100-(($j$−2 mod n)+1) sets a random number $k_{(j-2 \mod n)+1}$ and outputs the random number $k_{(j-2 \mod n)+1}$. The random number $k_{(j-2 \mod n)+1}$ is stored in the storage 103-(($j$−2 mod n)+1).

The key-shared-between-two-parties generation unit 107-(($j$−2 mod n)+1) obtains, using the key encryption key $pk_{(j \mod n)+1}$, a key-shared-between-two-parties $R_{(j-2 \mod n)+1, (j \mod n)+1}$ and a key capsule $C_{(j-2 \mod n)+1, (j \mod n)+1}$, which is cipher text of the key-shared-between-two-parties $R_{(j-2 \mod n)+1, (j \mod n)+1}$, and outputs the key-shared-between-two-parties $R_{(j-2 \mod n)+1, (j \mod n)+1}$ and the key capsule $C_{(j-2 \mod n)+1, (j \mod n)+1}$. The key-shared-between-two-parties $R_{(j-2 \mod n)+1, (j \mod n)+1}$ is stored in the storage 103-(($j$−2 mod n)+1). The key capsule $C_{(j-2 \mod n)+1, (j \mod n)+1}$ is output from the output unit 102-(($j$−2 mod n)+1) and transmitted to the key distribution management device 150.

Terminal device 100-$y$ (terminal device $U_y$) (y=1, . . . , n, y≠j, and y≠(j−2) mod n+1):

The random number setting unit 106-$y$ of the terminal device 100-$y$ sets a random number $k_y$ and outputs the random number $k_y$. The random number $k_y$ is stored in the storage 103-$y$. Here, y=1, . . . , n, y≠j, and y≠(j−2) mod n+1.

The input unit 151 of the key distribution management device 150 (FIG. 3) receives the key capsule $C_{(j-2 \mod n)+1, (j \mod n)+1}$ transmitted from the terminal device 100-(($j$−2 mod n)+1). The SID setting unit 155 newly generates sid and chooses the terminal device 100-(($j$−2 mod n)+1) as a representative terminal device. The arithmetic unit 153 generates (sid, $C_{(j-2 \mod n)+1, (j \mod n)+1}$). (sid, $C_{(j-2 \mod n)+1, (j \mod n)+1}$) is output from the output unit 152 and transmitted to the terminal device 100-((j−2 mod n)+1). The output unit 152 transmits, to the terminal device 100-((j−2 mod n)+1), information (notification about being chosen as a representative) indicating that the terminal device 100-((j−2 mod n)+1) has been chosen as a representative terminal device. Furthermore, sid is output from the output unit 152 and transmitted to a terminal device 100-φ. Here, φ=1, . . . , n, φ≠j, and x≠(φ mod n)+1.

Figure 17:
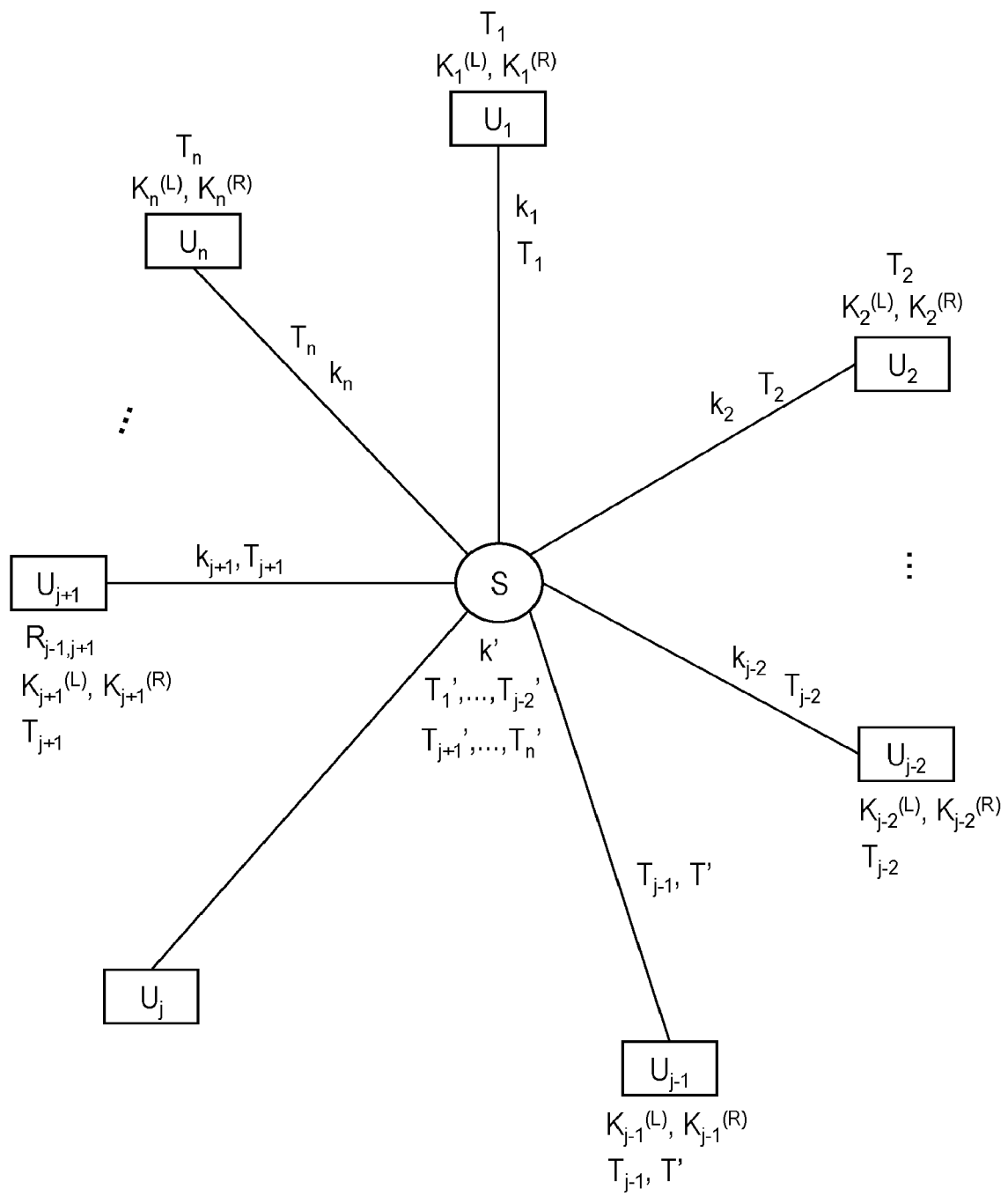
FIG. 17 is a diagram for explaining the key exchange method (Round3) of the embodiment, which is performed after the separation of a terminal device.

<<Round3 (FIG. 17)>>

The terminal device 100-(j−1) (terminal device the terminal device 100-(j+1) (terminal device $U_{j+1}$), and a terminal device 100-x (terminal device $U_x$) perform different processing in Round3 of the present embodiment. Here, x=1, . . . , n, x≠j, x≠(j−2 mod n)+1, and x (j mod n)+1.

Terminal device 100-((j−2 mod n)+1) (terminal device $U_{j-2 \mod n}1$):

The function operation unit 109-((j−2 mod n)+1) reads a key-shared-between-two-parties $H_{(j-2 \mod n)+1}^{(L)} = R_{(j-3 \mod n)+1, (j-2 \mod n)+1}$ from the storage 103-((j−2 mod n)+1), and obtains a function value $K_{(j-2 \mod n)+1}^{(L)}$ of the key-shared-between-two-parties $H_{(j-2 \mod n)+1}^{(L)}$ and outputs the function value $K_{(j-2 \mod n)+1}^{(L)}$. The function value $K_{(j-2 \mod n)+1}^{(L)}$ may be a value that depends only on the key-shared-between-two-parties $H_{(j-2 \mod n)+1}^{(L)}$ or a value that depends on the key-shared-between-two-parties $H_{(j-2 \mod n)+1}^{(L)}$ and another piece of additional information. Here, $K_{(j-2 \mod n)+1}^{(L)} = K_{(j-3 \mod n)+1}^{(R)}$ has to be satisfied. For instance, the function operation unit 109-n obtains the function value $$K_{(j-2 \mod n)+1}^{(L)}$$

$$= F(sid, H_{(j-2 \mod n)+1}^{(L)})$$

$$= F(sid, R_{(j-3 \mod n)+1, (j-2 \mod n)+1})$$

that depends on the key-shared-between-two-parties $H_{(j-2 \mod n)+1}^{(L)} = R_{(j-3 \mod n)+1, (j-2 \mod n)+1}$ and sid and outputs the function value $K_{(j-2 \mod n)+1}^{(L)}$. The function value $K_{(j-2 \mod n)+1}^{(L)}$ is stored in the storage 103-((j−2 mod n)+1).

The function operation unit 109-((j−2 mod n)+1) reads a key-shared-between-two-parties $R_{(j-2 \mod n)+1, (j \mod n)+1}$ from the storage 103-((j−2 mod n)+1), and obtains a function value $K_{(j-2 \mod n)+1}^{(R)}$ of the key-shared-between-two-parties $R_{(j-2 \mod n)+1, (j \mod n)+1}$ and outputs the function value $K_{(j-2 \mod n)+1}^{(R)}$. The function value $K_{(j-2 \mod n)+1}^{(R)}$ may be a value that depends only on the key-shared-between-two-parties $R_{(j-2 \mod n)+1, (j \mod n)+1}$ or a value that depends on the key-shared-between-two-parties $R_{(j-2 \mod n)+1, (j \mod n)+1}$ and another piece of additional information. Here, $K_{(j-2 \mod n)+1}^{(R)} = K_{(j \mod n)+1}^{(L)}$ has to be satisfied. For instance, the function operation unit 109-((j−2 mod n)+1) obtains the function value $$K_{(j-2 \mod n)+1}^{(R)} = F(sid, R_{(j-2 \mod n)+1, (j \mod n)+1})$$

that depends on the key-shared-between-two-parties $R_{(j-2 \mod n)+1, (j \mod n)+1}$ and sid and outputs the function value $K_{(j-2 \mod n)+1}^{(R)}$. The function value $K_{(j-2 \mod n)+1}^{(R)}$ is stored in the storage 103-((j−2 mod n)+1).

The function value $K_{(j-2 \mod n)+1}^{(L)}$ and the function value $K_{(j-2 \mod n)+1}^{(R)}$ are input to the XOR unit 110-((j−2 mod n)+1). The XOR unit 110-((j−2 mod n)+1) obtains the XOR $$T_{(j-2 \mod n)+1} = K_{(j-2 \mod n)+1}^{(L)} (+) K_{(j-2 \mod n)+1}^{(R)}$$

of the function value $K_{(j-2 \mod n)+1}^{(L)}$ and the function value $K_{(j-2 \mod n)+1}^{(R)}$ and outputs the XOR $T_{(j-2 \mod n)+1}$.

The random number $k_{(j-2 \mod n)+1}$ read from the storage 103-((j−2 mod n)+1) is further input to the XOR unit 110-((j−2 mod n)+1). The XOR unit 110-((j−2 mod n)+1) obtains the XOR $$T' = B(k_{(j-2 \mod n)+1})(+)K_{(j-2 \mod n)+1}^{(L)}$$

of a function value $B(k_{(j-2 \mod n)+1})$ of the random number $k_{(j-2 \mod n)+1}$ and the function value $K_{(j-2 \mod n)+1}^{(L)}$ and outputs the XOR T'. An example of the function value $B(k_{(j-2 \mod n)+1})$ is bit concatenation $k_{(j-2 \mod n)+1}|\beta$ of the random number $k_{(j-2 \mod n)+1}$ and another piece of additional information β.

The XOR $T_{(j-2 \mod n)+1}$ and the XOR T' are output from the output unit 102-((j−2 mod n)+1) and transmitted to the key distribution management device 150.

Terminal device 100-((j mod n)+1) (terminal device $U_{(j \mod n)+1}$):

(sid, $C_{(j-2 \mod n)+1, (j \mod n)+1}$) is input to the input unit 101-((j mod n)+1) of the terminal device 100-((j mod n)+1).

The decryption unit 108-((j mod n)+1) obtains the key-shared-between-two-parties $R_{(j-2 \mod n)+1, (j \mod n)+1}$ by decrypting the key capsule $C_{(j-2 \mod n)+1, (j \mod n)+1}$ using the key capsule decryption key $sk_{(j \mod n)+1}$ read from the storage 103-((j mod n)+1) and outputs the key-shared-between-two-parties $R_{(j-2 \mod n)+1, (j \mod n)+1}$. The key-shared-between-two-parties $R_{(j-2 \mod n)+1, (j \mod n)+1}$ is stored in the storage 103-((j mod n)+1).

The function operation unit 109-((j mod n)+1) obtains a function value $K_{(j \mod n)+1}^{(L)}$ of the key-shared-between-two-parties $R_{(j-2 \mod n)+1, (j \mod n)+1}$ and outputs the function value $K_{(j \mod n)+1}^{(L)}$. The function value $K_{(j \mod n)+1}^{(L)}$ may be a value that depends only on the key-shared-between-two-parties $R_{(j-2 \mod n)+1, (j \mod n)+1}$ or a value that depends on the key-shared-between-two-parties $R_{(j-2 \mod n)+1, (j \mod n)+1}$ and another piece of additional information. Here, $K_{(j \mod n)+1}^{(L)} = K_{(j-2 \mod n)+1}^{(R)}$ has to be satisfied. For instance, the function operation unit 109-((j mod n)+1) obtains the function value $$K_{(j \mod n)+1}^{(L)} = F(sid, R_{(j-2 \mod n)+1, (j \mod n)+1})$$

that depends on the key-shared-between-two-parties $R_{(j-2 \mod n)+1, (j \mod n)+1}$ and sid and outputs the function value $K_{(j \mod n)+1}^{(L)}$. The function value $K_{(j \mod n)+1}^{(L)}$ is stored in the storage 103-((j mod n)+1).

The function operation unit 109-((j mod n)+1) reads a key-shared-between-two-parties $H_{(j \mod n)+1}^{(R)} = R_{(j \mod n)+1, (j+1 \mod n)+1}$ from the storage 103-((j mod n)+1), and obtains a function value $K_{(j \mod n)+1}^{(R)}$ of the key-shared-between-two-parties $H_{(j \mod n)+1}^{(R)}$ and outputs the function value $K_{(j \mod n)+1}^{(R)}$. The function value $K_{(j \mod n)+1}^{(R)}$ may be a value that depends only on the key-shared-between-two-parties $H_{(j \mod n)+1}^{(R)}$ or a value that depends on the key-shared-between-two-parties $H_{(j \mod n)+1}^{(R)}$ and another piece of additional information. Here, $K_{(j \mod n)+1}^{(R)} = K_{(j+1 \mod n)+1}^{(L)}$ has to be satisfied. For instance, the function operation unit 109-((j mod n)+1) obtains the function value $$K_{(j \mod n)+1}^{(R)}$$

$$= F(sid, H_{(j \mod n)+1}^{(R)})$$

$$= F(sid, R_{(j \mod n)+1, j+1 \mod n)+1})$$

that depends on the key-shared-between-two-parties $H_{(j \mod n)+1}^{(R)}$ and sid and outputs the function value $K_{(j \mod n)+1}^{(R)}$. The function value $K_{(j \mod n)+1}^{(R)}$ is stored in the storage 103-((j mod n)+1).

The function value $K_{(j \bmod n)+1}^{(L)}$ and the function value $K_{(j \bmod n)+1}^{(R)}$ are input to the XOR unit 110-$((j \bmod n)+1)$. The XOR unit 110-$((j \bmod n)+1)$ obtains the XOR $$T_{(j \bmod n)+1} = K_{(j \bmod n)+1}^{(L)}(+)K_{(j \bmod n)+1}^{(R)}$$

of the function value $K_{(j \bmod n)+1}^{(L)}$ and the function value $K_{(j \bmod n)+1}^{(R)}$ and outputs the XOR $T_{(j \bmod n)+1}$.

A random number $k_{(j \bmod n)+1}$ and the XOR $T_{(j \bmod n)+1}$ are output from the output unit 102-$((j \bmod n)+1)$ and transmitted to the key distribution management device 150.

Terminal device 100-$x$ (terminal device $U_x$) ($x=1, \ldots, n$, $x \neq j$, $x \neq (j-2 \bmod n)+1$, and $x \neq (j \bmod n)+1$):

The function operation unit 109-$x$ reads a key-shared-between-two-parties $H_x^{(L)} = R_{(x-2 \bmod n)+1, x}$ from the storage 103-$x$, and obtains a function value $K_x^{(L)}$ of the key-shared-between-two-parties $H_x^{(L)}$ and outputs the function value $K_x^{(L)}$. The function value $K_x^{(L)}$ may be a value that depends only on the key-shared-between-two-parties $H_x^{(L)}$ or a value that depends on the key-shared-between-two-parties $H_x^{(L)}$ and another piece of additional information. Here, $K_x^{(L)} = K_{(x-2 \bmod n)+1}^{(R)}$ has to be satisfied. For instance, the function operation unit 109-$x$ obtains the function value $$K_x^{(L)} = F(sid, H_x^{(L)}) = F(sid, R_{(x-2 \bmod n)+1, x})$$

that depends on the key-shared-between-two-parties $H_x^{(L)}$ and sid and outputs the function value $K_x^{(L)}$. The function value $K_x^{(L)}$ is stored in the storage 103-$x$.

The function operation unit 109-$x$ reads a key-shared-between-two-parties $H_x^{(R)} = R_{x, (x \bmod n)+1}$ from the storage 103-$x$, and obtains a function value $K_x^{(R)}$ of the key-shared-between-two-parties $H_x^{(R)}$ and outputs the function value $K_x^{(R)}$. The function value $K_x^{(R)}$ may be a value that depends only on the key-shared-between-two-parties $H_x^{(R)}$ or a value that depends on the key-shared-between-two-parties $H_x^{(R)}$ and another piece of additional information. Here, $K_x^{(R)} = K_{(x \bmod n)+1}^{(L)}$ has to be satisfied. For instance, the function operation unit 109-$x$ obtains the function value $$K_x^{(R)} = F(sid, H_x^{(R)}) = F(sid, R_{x, (x \bmod n)+1})$$

that depends on the key-shared-between-two-parties $H_x^{(R)}$ and sid and outputs the function value $K_x^{(R)}$. The function value $K_x^{(R)}$ is stored in the storage 103-$x$.

The function value $K_x^{(L)}$ and the function value $K_x^{(R)}$ are input to the XOR unit 110-$x$. The XOR unit 110-$x$ obtains the XOR $$T_x = K_x^{(L)}(+)K_x^{(R)}$$

of the function value $K_x^{(L)}$ and the function value $K_x^{(R)}$ and outputs the XOR $T_x$.

A random number $k_x$ read from the storage 103-$x$ and the XOR $T_x$ are output from the output unit 102-$x$ and transmitted to the key distribution management device 150.

The XORs $T_1, \ldots, T_{n+1}$ (excluding $T_j$) and T' and random numbers $K_1, \ldots, k_n$ (excluding $k_j$ and $k_{j+1}$) are input to the input unit 151 of the key distribution management device 150 (FIG. 3) and stored in the storage 157. The XOR unit 156 obtains the XOR k' of a plurality of values including the random numbers $k_1, \ldots, k_n$, (excluding $k_j$ and $k_{j+1}$) read from the storage 157 and outputs the XOR k'. The XOR k' may be the XOR of the random numbers $k_1, \ldots, k_n$ (excluding $k_j$ and $k_{j+1}$) or the XOR of the random numbers $k_1, \ldots, k_n$, (excluding $k_j$ and $k_{j+n}$) and another additional value. For example, the arithmetic unit 153 generates a random number $k_s$, and the XOR unit 156 obtains the XOR $$k' = k_1(+) \ldots (+)k_{j-1}(+)k_{j+2}(+) \ldots (+)k_n(+)k_s$$

of the random numbers $k_1, \ldots, k_n$, (excluding $k_j$ and $k_{j+1}$) and $k_s$ and outputs the XOR k'.

Moreover, for $y=1, \ldots, n$ (where $y \neq j$ and $y \neq (j-2 \bmod n)+1$), the XOR unit 156 obtains, when $y < j-1$, the XOR $T_y'$ of the XORs $T_1, \ldots, T_{y-1}$ and $T_{j-1}, \ldots, T_n$ and outputs the XOR $T_y'$ and obtains, when $j+1 \leq y$, the XOR $T_y'$ of the XORs $T_{j-1}, \ldots, T_{y-1}$ and outputs the XOR $T_y'$.

When $y < j-1$: $T_y' = T_1(+) \ldots (+)T_{y-1}(+)T_{j-1}(+) \ldots (+)T_n$

When $j+1 \leq y$: $T_y' = T_{j-1}(+) \ldots (+)T_{y-1}$

The output unit 152 transmits the XOR k' to the terminal device 100-$((j-2 \bmod n)+1)$ and transmits the XORs T', k', and $T_y'$ to the terminal device 100-$y$ (where $y \neq j$ and $y \neq (j-2) \bmod n+1$).

Figure 18:
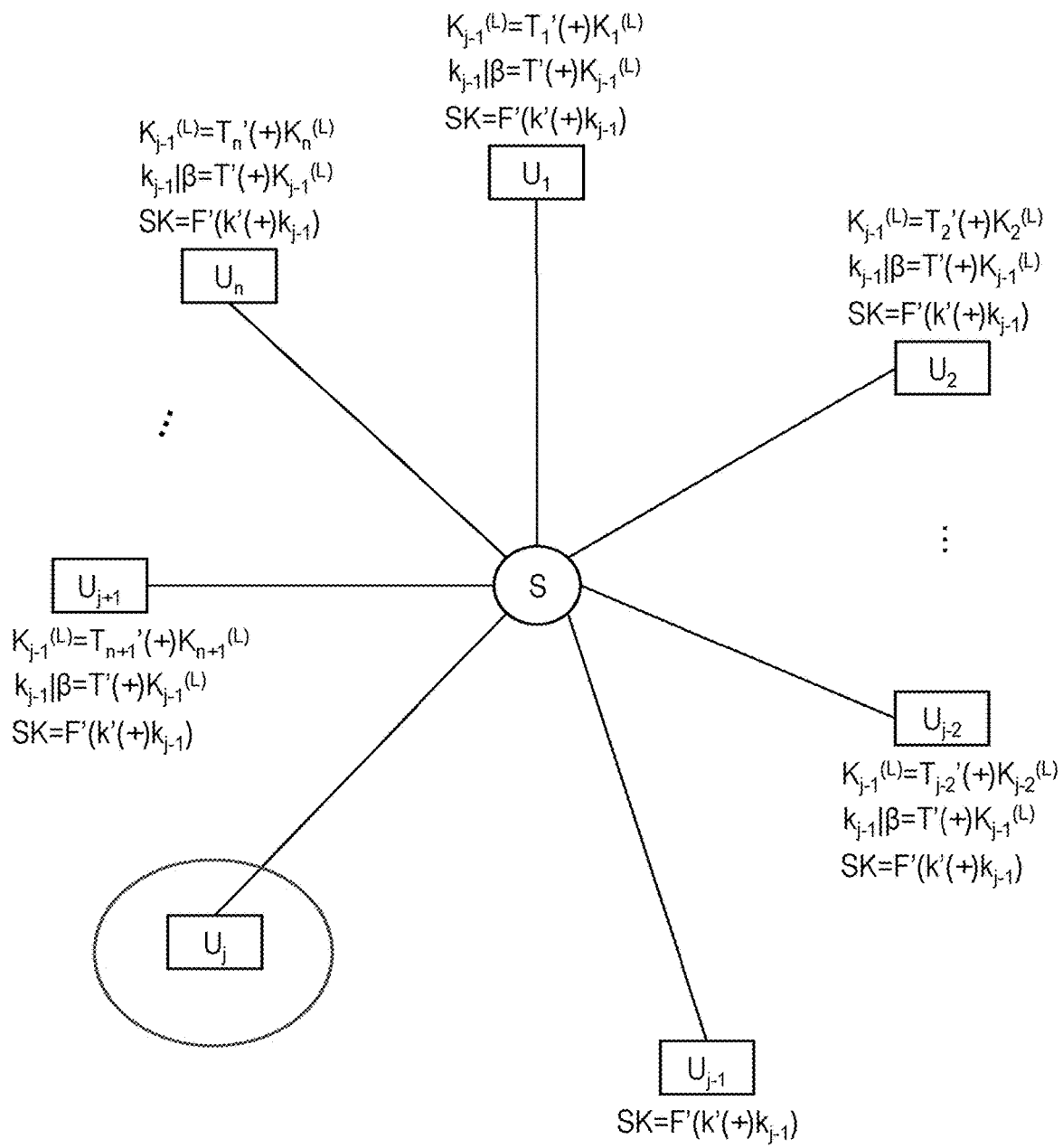
FIG. 18 is a diagram for explaining the key exchange method (shared key generation) of the embodiment, which is performed after the separation of a terminal device.

<<Shared key generation (FIG. 18)>>

The terminal device 100-$(j-1)$ (terminal device $U_{j-1}$) and the terminal device 100-$y$ (terminal device $U_y$) (where $y \neq j$ and $y \neq (j-2 \bmod n)+1$) perform different processing in shared key generation. In the terminal device 100-$j$ (terminal device $U_j$) that has left the system, shared key generation is not performed.

Terminal device 100-$y$ (terminal device $U_y$):

The XORs T', k', and $T_y'$ are input to the input unit 101-$y$ of the terminal device 100-$y$. The function value reconstruction unit 111-$y$ obtains the function value $K_{(j-2 \bmod n)+1}^{(L)}$ by XORing the XOR $T_y'$ with a function value $K_y^{(L)}$ read from the storage 103-$y$ and outputs the function value $K_{j-2 \bmod n)+1}^{(L)}$.

The random number reconstruction unit 113-$y$ obtains the function value $B(k_{(j-2 \bmod n)+1})$ of the random number $k_{(j-2 \bmod n)+1}$ by XORing the XOR T' with the function value $K_{(j-2 \bmod n)+1}^{(L)}$ and outputs the function value $B(k_{(j-2 \bmod n)+1})$. The reason why the function value $B(k_{(j-2 \bmod n)+1})$ is obtained is as follows.

$$T(+)K_{(j-2 \bmod n)+1}^{(L)}$$

$$= B(k_{j-2 \bmod n)+1})(+)K_{(j-2 \bmod n)+1}^{(L)}(+)i\, K_{(j-2 \bmod n)+1}$$

$$= B(k_{(j-2 \bmod n)+1})$$

The shared key generation unit 112-$y$ extracts the random number $k_{(j-2 \bmod n)+1}$ from the function value $B(k_{(j-2 \bmod n)+1})$ (for example, $B(k_{j-2 \bmod n)+1}1) = k_{(j-2 \bmod n)+1}|\beta)$, and obtains a function value of the XOR $k'(+)k_{(j-2 \bmod n)+1}$ of the XOR k' and the random number $k_{(j-2 \bmod n)+1}$ obtained from the function value $B(k_{j-2 \bmod n)+1})$ as a shared key $$SK = F'(k'(+)k_{j-2 \bmod n)+1}$$

and outputs the shared key SK.

Terminal device 100-$(j-1)$ (terminal device $U_{j-1}$):

The XOR k' is input to the input unit 101-$(j-1)$ of the terminal device 100-$(j-1)$. The shared key generation unit 112-$(j-1)$ obtains a function to value of the XOR $k'(+)k_{(j-2 \bmod n)+1}$ of the XOR k' and the random number $k_{(j-2 \bmod n)+1}$ read from the storage 103-$(j-1)$ as the shared key $$SK = F'(+)k_{(j-2 \bmod n)+1}$$

and outputs the shared key SK.

In the storage 103-$i$ (where $i=1, \ldots, n$ and $i \neq j$) of each terminal device 100-$i$ (terminal device $U_i$) the function value $r = F''(SK)$ updated by using the new shared key SK and the keys-shared-between-two-parties $H_i^{(L)} = R_{(i-2 \bmod n)+1, i}$ and $H_i^{(R)} = R_{i, (i \bmod n)+1}$ are stored.

<Features of the Present Embodiment>

In the present embodiment, the key capsule-type key exchange between two parties is adopted, which makes it possible to perform a key exchange between two parties which conforms to post-quantum cryptography of the public key cryptosystem. By performing the above-described processing using this key exchange, after an arbitrary terminal device leaves the system, a quantum-safe multiparty key exchange can be performed among the other terminal devices. Moreover, by reusing the keys-shared-between-two-parties $H_i^{(L)}=R_{(i-2 \bmod n)+1, i}$ and $H_i^{(R)}=R_{i, (i \bmod n)+1}$ obtained by the processing of the first embodiment, it is possible to reduce the amount of computation and the communication volume.

Embodiments

When lattice-based cryptography is used as post-quantum cryptography, a key capsule decryption key sky described in each embodiment is a vector $s_v$ consisting of $\kappa_1(v)$ integers and a key encryption key $pk_v$ is $b_v=A_v s_v+e_v$. Moreover, a key capsule $C_{v, (v \bmod \mu)+1}$ is $\{\gamma_v, \xi_v'\}$, and a key-shared-between-two-parties $R_{v, (v \bmod \mu)+1}$ is ROUND $(2\xi_v^-/q)$. Here, $A_v$ is a $\kappa_1(v) \times \kappa_2(v)$ basis matrix, $\kappa_1(v)$ and $\kappa_2(v)$ are positive integers, $v$ and $\mu$ are positive integers, and $e_v$ is a vector consisting of $\kappa_2(v)$ elements. $\gamma_v=A_v s_v'+e_v'$ and is floor($4\xi_v^-/q$)mod2. $s_v'$ is a vector (for example, a vector randomly selected in accordance with the normal distribution) consisting of $\kappa_1(v)$ integers and $e_v'$ and $e_v''$ are each a vector (for example, a vector randomly selected in accordance with the normal distribution) consisting of $\kappa_2(v)$ elements. $\xi_v=b_{(v \bmod \mu)+1} s_v'+e_v''$ and $\xi_v^-$ is a random function value of $\xi_v$ (a value obtained by applying $\xi_v$ to a random function). q is an integer greater than or equal to 2, floor is a floor function, and ROUND is a round-off function.

Each terminal device may generate, using a publicly known commitment algorithm (for example, Reference Literature 3), a commitment using a random number $k_i$, and a commitment and output the commitment along with a key capsule of a key-shared-between-two-parties. sid may be a function value of the commitment output from each terminal device. Each terminal device may generate an authentication code of each piece of information and output the authentication code, and the authentication code may be verified in another terminal device or a key distribution management device. A shared key SK may be a function value that further depends on sid. A shared key SK may be a function value that further depends on a decrypted value of cipher text obtained based on an attribute-based algorithm (Reference Literature 2). sid may be omitted.

Reference Literature 3 (commitment algorithm): Fabrice Benhamouda, Stephan Krenn, Vadim Lyubashevsky, Krzysztof Pietrzak, "Efficient Zero-Knowledge Proofs for Commitments from Learning With Errors over Rings," In: ESORICS: European Symposium on Research in Computer Security, Sep. 21-25, 2015.

Other Modifications

It is to be noted that the present invention is not limited to the foregoing embodiments. For example, the above-described various kinds of processing may be executed, in addition to being executed in chronological order in accordance with the descriptions, in parallel or individually depending on the processing power of a device that executes the processing or when necessary. In addition, it goes without saying that changes may be made as appropriate without departing from the spirit of the present invention.

The above-described each device is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. An electronic circuit constituting a single device may include multiple CPUs.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present devices, at least some of the processing functions may be implemented by hardware.

INDUSTRIAL APPLICABILITY

The multiparty key exchange technique of the present invention can be used in, for example, applications using cryptography. For instance, the multiparty key exchange technique of the present invention can be used in encryption of data that can be accessed by more than one person, encryption of data that is exchanged in multiparty communication, and shared key exchange (sharing) processing that is used in various practical applications such as multiparty electronic signature and signature verification, electronic voting, and electronic money.

DESCRIPTION OF REFERENCE NUMERALS 1 to 3 key exchange system
100-1 to 100-($n+1$) terminal device

What is claimed is:

1. A key exchange system which exchanges a shared key used for an application using cryptography, the key exchange system comprising:
   terminal devices $U_1, \ldots, U_n$ which perform a key capsule-type key exchange between two parties which conforms to post-quantum cryptography of a public key cryptosystem; and
   a key distribution management device, wherein
   n is an integer greater than or equal to 3, $i=1, \ldots, n$, $v=2, \ldots, n$, and, for a positive integer $\alpha$, $-1 \bmod \alpha = \alpha - 1$,
   a terminal device $U_i$, includes
      an i-th storage that stores a key capsule decryption key $sk_i$ which conforms to the post-quantum cryptography of the public key cryptosystem,
      an i-th output unit that outputs a key encryption key $pk_i$ corresponding to the key capsule decryption key $sk_i$ in order to transmit the key encryption key $pk_i$ to a terminal device $U_{(i-2 \bmod n)+1}$,
      an i-th input unit that accepts a key encryption key $pk_{(i \bmod n)+1}$ which conforms to the post-quantum cryptography and is output from a terminal device $U_{(i \bmod n)+1}$,
      an i-th random number setting unit that sets a random number $k_i$,
      an i-th key-shared-between-two-parties generation unit that generates, using the key encryption key $pk_{(i \bmod n)+1}$, a key-shared-between-two-parties $R_{(i \bmod n)+1}$ and a key capsule $C_{i, (i \bmod n)+1}$ which is cipher text of the key-shared-between-two-parties $R_{i, (i \bmod n)+1}$, and
      the i-th output unit that outputs the key capsule $C_{i(i \bmod n)+1}$ in order to transmit the key capsule $C_{i, (i \bmod n)+1}$ to the terminal device $U_{(i \bmod n)+1}$,
   the i-th input unit accepts a key capsule $C_{(i-2 \bmod n)+1, i}$ which is output from the terminal device $U_{(i-2 \bmod n)+1}$,
   the terminal device $U_1$ includes
      a first decryption unit that generates a key-shared-between-two-parties $R_{n, 1}$ by decrypting a key capsule $C_{n, 1}$ using a key capsule decryption key $sk_1$,
      a first function operation unit that generates a function value $K_1^{(L)}$ of the key-shared-between-two-parties $R_{n, 1}$ and generates a function value $K_1^{(R)}$ of a key-shared-between-two-parties $R_{1, 2}$,
      a first XOR unit that generates an XOR $T_1$ of the function value $K_1^{(L)}$ and the function value $K_1^{(R)}$ and generates an XOR $T'$ of a function value of a random number $k_1$ and the function value $K_1^{(L)}$, and
      a first output unit that outputs the XORs $T_1$ and $T'$ to the key distribution management device,
   a terminal device $U_v$ includes
      a v-th decryption unit that generates a key-shared-between-two-parties $R_{(v-2 \bmod n)+1, v}$ by decrypting a key capsule $C_{(v-2 \bmod n)+1, v}$ using a key capsule decryption key $sk_v$,
      a v-th function operation unit that generates a function value $K_v^{(L)}$ of the key-shared-between-two-parties $R_{(v-2 \bmod n)+1, v}$ and generates a function value $K_v^{(R)}$ of a key-shared-between-two-parties $R_{v, (v \bmod n)+1}$,
      a v-th XOR unit that generates an XOR $T_v$ of the function value $K_v^{(L)}$ and the function value $K_v^{(R)}$, and
      a v-th output unit that outputs a random number $k_v$ and the XOR $T_v$ to the key distribution management device,
   the key distribution management device includes an XOR unit that generates an XOR k' of a plurality of values including random numbers $k_2, \ldots, k_n$ and generates an XOR $T_v'$ of XORs $T_1, \ldots, T_{v-1}$, and outputs the XOR k' to the terminal device $U_1$ and outputs the XORs T', k' and $T_v'$ to the terminal device $U_v$,
   the terminal device $U_1$ includes a first shared key generation unit that generates a function value of an XOR of the XOR k' and the random number $k_1$ as a shared key SK, and
   the terminal device $U_v$ includes
      a v-th function value reconstruction unit that generates the function value $K_1^{(L)}$ by XORing the XOR $T_v'$ with the function value $K_v^{(L)}$,
      a v-th random number reconstruction unit that generates the function value of the random number $k_1$ by XORing the XOR T' with the function value $K_1^{(L)}$, and
      a v-th shared key generation unit that generates a function value of an XOR of the XOR k' and the random number $k_1$, which is obtained from the function value of the random number $k_1$, as the shared key SK.

2. A key exchange system which exchanges a shared key used for an application using cryptography, the key exchange system comprising:
   terminal devices $U_1, \ldots, U_{n+1}$ which perform a key capsule-type key exchange between two parties which conforms to post-quantum cryptography of a public key cryptosystem; and
   a key distribution management device, wherein
   n is an integer greater than or equal to 3, $i=1, \ldots, n$, $v=2, \ldots, n$, $w=2, \ldots, n+1$, $z=2, \ldots, n-1$, $\rho=1, \ldots, n-1$, and, for a positive integer $\alpha$, $-1 \bmod \alpha = \alpha - 1$,
   a terminal device $U_i$ includes an i-th storage that stores a function value r,
   the terminal device $U_1$ includes
      a first storage that stores a key capsule decryption key $sk_1$ which conforms to the post-quantum cryptography of the public key cryptosystem, and
      a first output unit that outputs a key encryption key $pk_1$ corresponding to the key capsule decryption key $sk_1$ in order to transmit the key encryption key $pk_1$ to the terminal device $U_{n+1}$,
   the terminal device $U_{n+1}$ includes
      an (n+1)-th storage that stores a key capsule decryption key $sk_{n+1}$ which conforms to the post-quantum cryptography, and
      an (n+1)-th output unit that outputs a key encryption key $pk_{n+1}$ corresponding to the key capsule decryption key $sk_{n+1}$ in order to transmit the key $pk_{n+1}$ to a terminal device $U_n$,
   the terminal device $U_n$ includes
      an n-th input unit that accepts the key encryption key $pk_{n+1}$ which is output from the terminal device $U_{n+1}$,
      an n-th random number setting unit that sets a random number $k_n$,
      an n-th key-shared-between-two-parties generation unit that generates, using the key encryption key $pk_{n+1}$, a key-shared-between-two-parties $R_{n, n+1}$ and a key capsule $C_{n, n+1}$ which is cipher text of the key-shared-between-two-parties $R_{n, n+1}$, and an n-th output unit that outputs the key capsule $C_{n, n|1}$ in order to transmit the key capsule $C_{n, n+1}$ to the terminal device $U_{n+1}$, the terminal device $U_{n+1}$ includes an (n+1)-th input unit that accepts the key encryption key $pk_1$ which is output from the terminal device $U_1$, an (n+1)-th random number setting unit that sets a random number $k_{n+1}$, an (n+1)-th key-shared-between-two-parties generation unit that generates, using the key encryption key $pk_1$, a key-shared-between-two-parties $R_{n+1, 1}$ and a key capsule $C_{n+1, 1}$, which is cipher text of the key-shared-between-two-parties $R_{n+1, 1}$, the (n+1)-th output unit that outputs the key capsule $C_{n+1, 1}$ in order to transmit the key capsule $C_{n+1, 1}$ to the terminal device $U_1$, and the (n+1)-th input unit that accepts the key capsule $C_{n, n+1}$ which is output from the terminal device $U_n$, a terminal device $U_\rho$ includes a ρ-th random number setting unit that sets a random number $k_\rho$, the terminal device $U_1$ includes a first input unit that accepts the key capsule $C_{n+1, 1}$ which is output from the terminal device $U_{n+1}$, a first decryption unit that generates the key-shared-between-two-parties $R_{n|1, 1}$ by decrypting the key capsule $C_{n+1, 1}$ using the key capsule decryption key $sk_1$, a first function operation unit that generates a function value $K_1^{(L)}$ of the key-shared-between-two-parties $R_{n+1, 1}$ and generates a function value $K_1^{(R)}$ of the function value r, a first XOR unit that generates an XOR $T_1$ of the function value $K_1^{(L)}$ and the function value $K_1^{(R)}$ and generates an XOR T' of a function value of a random number $k_1$ and the function value $K_1^{(L)}$, and the first output unit that outputs the XORs $T_1$ and T' to the key distribution management device, the terminal device $U_n$ includes an n-th function operation unit that generates a function value $K_n^{(L)}$ of the function value r and generates a function value $K_n^{(R)}$ of the key-shared-between-two-parties $R_{n, n+1}$, an n-th XOR unit that generates an XOR $T_n$ of the function value $K_n^{(L)}$ and the function value $K_n^{(R)}$, and the n-th output unit that outputs a random number $k_n$ and the XOR $T_n$ to the key distribution management device, the terminal device $U_{n+1}$ includes an (n+1)-th decryption unit that generates the key-shared-between-two-parties $R_{n, n+1}$ by decrypting the key capsule $C_{n, n+1}$ using a key capsule decryption key $sk_{n+1}$, an (n+1)-th function operation unit that generates a function value $K_{n|1}^{(L)}$ of the key-shared-between-two-parties $R_{n, n+1}$ and generates a function value $K_{n+1}^{(R)}$ of the key-shared-between-two-parties $R_{n+1, 1}$, an (n+1)-th XOR unit that generates an XOR $T_{n+1}$ of the function value $K_{n+1}^{(L)}$ and the function value $K_{n+1}^{(R)}$, and the (n+1)-th output unit that outputs a random number $k_{n+1}$ and the XOR $T_{n+1}$ to the key distribution management device, a terminal device $U_z$ includes a z-th output unit that outputs a random number $k_z$ to the key distribution management device, the key distribution management device includes an XOR unit that generates an XOR k' of a plurality of values including random numbers $k_2, \ldots, k_{n+1}$ and generates an XOR $T_w'$ of XORs $T_1, \ldots, T_{w-1}$, of which XORs $T_2, \ldots, T_{n-1}$ are nulls, and outputs the XOR k' to the terminal device $U_1$ and outputs the XORs T', k' and $T_w'$ to the terminal device $U_w$, the terminal device $U_1$ includes a first shared key generation unit that generates a function value of an XOR of the XOR k' and the random number $k_1$ as a shared key SK, the terminal device $U_n$ includes an n-th function value reconstruction unit that generates the function value $K_1^{(L)}$ by XORing an XOR $T_n'$ with a function value $K_n^{(L)}$, an n-th random number reconstruction unit that generates the function value of the random number $k_1$ by XORing the XOR T' with the function value $K_1^{(L)}$, and an n-th shared key generation unit that generates a function value of an XOR of the XOR k' and the random number $k_1$, which is obtained from the function value of the random number $k_1$, as the shared key SK, the terminal device $U_{n+1}$ includes an (n+1)-th function value reconstruction unit that generates the function value $K_1^{(L)}$ by XORing an XOR $T_{n+1}'$ with a function value $K_{n+1}^{(L)}$, an (n+1)-th random number reconstruction unit that generates the function value of the random number $k_1$ by XORing the XOR T' with the function value $K_1^{(L)}$, and an (n+1)-th shared key generation unit that generates a function value of an XOR of the XOR k' and the random number $k_1$ as the shared key SK, and the terminal device $U_\rho$ includes a ρ-th function value reconstruction unit that generates the function value $K_1^{(L)}$ by XORing an XOR $T_\rho'$ with the function value $K_1^{(R)}$ of the function value r, a ρ-th random number reconstruction unit that generates the function value of the random number $k_1$ by XORing the XOR T' with the function value $K_1^{(L)}$, and a ρ-th shared key generation unit that generates a function value of an XOR of the XOR k' and the random number $k_1$ as the shared key SK.

3. A key exchange system which exchanges a shared key used for an application using cryptography, the key exchange system comprising:

terminal devices $U_1, \ldots, U_n$ which perform a key capsule-type key exchange between two parties which conforms to post-quantum cryptography of a public key cryptosystem; and a key distribution management device, wherein n is an integer greater than or equal to 3, i=1, ..., n, j is an integer greater than or equal to 1 and less than or equal to n, y=1, ..., n, y≠j, y≠(j−2 mod n)+1, x=1, ..., n, x≠j, x≠(j−2 mod n)+1, x≠(j mod n)+1, and, for a positive integer α, −1 mod α=α−1, a terminal device $U_i$ includes an i-th storage that stores keys-shared-between-two-parties $H_i^{(L)}=R_{(i-2 \bmod n)+1, i}$ and $H_i^{(R)}=R_{i, i \bmod n)+1}$, a terminal device $U_{(j \bmod n)+1}$ includes a (j+1)-th storage that stores a key capsule decryption key $sk_{(j \bmod n)+1}$ which conforms to the post-quantum cryptography of the public key cryptosystem, and a (j+1)-th output unit that outputs a key encryption key $pk_{(j \bmod n)+1}$ corresponding to the key capsule decryption key $sk_{(j \bmod n)+1}$ in order to transmit the key capsule decryption key $sk_{(j \bmod n)+1}$ to a terminal device $U_{(j-2 \bmod n)+1}$, the terminal device $U_{(j-2 \bmod n)+1}$ includes a (j−1)-th input unit that accepts the key encryption key $pk_{(j \bmod n)+1}$ which is output from the terminal device $U_{(j \bmod n)+1}$, a (j−1)-th random number setting unit that sets a random number $k_{(j-2 \bmod n)+1}$, a (j−1)-th key-shared-between-two-parties generation unit that generates, using the key encryption key $pk_{(j \bmod n)+1}$, a key-shared-between-two-parties $R_{(j-2 \bmod n)+1, (j \bmod n)+1}$ and a key capsule $C_{(j-2 \bmod n)+1, (j \bmod n)+1}$ which is cipher text of the key-shared-between-two-parties $R_{(j-2 \bmod n)|1, (j \bmod n)|1}$, and a (j−1)-th output unit that outputs the key capsule $C_{(j-2 \bmod n)+1, (j \bmod n)+1}$ in order to transmit the key capsule $C_{(j-2 \bmod n)+1, (j \bmod n)+1}$ to the terminal device $U_{(j \bmod n)+1}$, a terminal device $U_y$ includes a y-th random number setting unit that sets a random number $k_y$, the terminal device $U_{(j \bmod n)+1}$ includes a (j+1)-th input unit that accepts the key capsule $C_{j-2 \bmod n)+1, (j \bmod n)+1}$ which is output from the terminal device $U_{(j-2 \bmod n)+1}$, the terminal device $U_{(j-2 \bmod n)+1}$ includes a (j−1)-th function operation unit that generates a function value $K_{(j-2 \bmod n)+1}^{(L)}$ of a key-shared-between-two-parties $H_{(j-2 \bmod n)|1}^{(L)}$ and generates a function value $K_{(j-2 \bmod n)+1}^{(R)}$ of the key-shared-between-two-parties $R_{(j-2 \bmod n)+1, (j \bmod n)+1}$, a (j−1)-th XOR unit that generates an XOR $T_{(j-2 \bmod n)+1}$ of the function value $K_{(j-2 \bmod n)+1}^{(L)}$ and the function value $K_{(j-2 \bmod n)+1}^{(R)}$ and generates an XOR T' of a function value of a random number $k_{(j-2 \bmod n)+1}$ and the function value $K_{(j-2 \bmod n)+1}^{(L)}$, and the (j−1)-th output unit that outputs the XOR $T_{(j-2 \bmod n)+1}$ and the XOR T' to the key distribution management device, the terminal device $U_{(j \bmod n)+1}$ includes a (j+1)-th decryption unit that generates the key-shared-between-two-parties $R_{(j-2 \bmod n)+1, (j \bmod n)+1}$ by decrypting the key capsule $C_{(j-2 \bmod n)+1, (j \bmod n)+1}$ using a key capsule decryption key $sk_{(j \bmod n)+1}$, a (j+1)-th function operation unit that generates a function value $K_{(j \bmod n)|1}^{(L)}$ of the key-shared-between-two-parties $R_{(j-2 \bmod n)+1, (j \bmod n)+1}$ and generates a function value $K_{(j \bmod n)+1}^{(R)}$ of a key-shared-between-two-parties $H_{(j \bmod n)+1}^{(R)}$, a (j+1)-th XOR unit that generates an XOR $T_{(j \bmod n)+1}$ of the function value $K_{(j \bmod n)+1}^{(L)}$ and the function value $K_{(j \bmod n)}^{(R)}$, and the (j+1)-th output unit that outputs a random number $k_{(j \bmod n)+1}$ and the XOR $T_{(j \bmod n)+1}$ to the key distribution management device, a terminal device $U_x$ includes an x-th function operation unit that generates a function value $K_x^{(L)}$ of a key-shared-between-two-parties $H_x^{(L)}$ and generates a function value $K_x^{(R)}$ of a key-shared-between-two-parties $H_x^{(R)}$, an x-th XOR unit that generates an XOR $T_x$ of the function value $K_x^{(L)}$ and the function value $K_x^{(R)}$, and an x-th output unit that outputs a random number $k_x$ and the XOR $T_x$ to the key distribution management device, the key distribution management device includes a k' generation unit that generates an XOR k' of a plurality of values including random numbers $k_1, \ldots, k_n$ (excluding $k_j$ and $k_{j+1}$) and outputs the XOR k', and an XOR unit that generates, when $y \leq j-1$, an XOR $T_{y'}$ of XORs $T_1, \ldots, T_{y-1}$ and $T_{j-1}, \ldots, T_n$ and outputs the XOR $T_{y'}$ and generates, when $j+1 \leq i$, an XOR $T_{y'}$ of XORs $T_{j-1}, \ldots, T_{y-1}$ and outputs the XOR $T_{y'}$, the terminal device $U_y$ includes a y-th function value reconstruction unit that generates the function value $K_{(j-2 \bmod n)+1}^{(L)}$ by XORing the XOR $T_{y'}$ with a function value $K_y^{(L)}$, a y-th random number reconstruction unit that generates the function value of the random number $k_{(j-2 \bmod n)+1}$ by XORing the XOR T' with the function value $K_{(j-2 \bmod n)+1}^{(L)}$, and a y-th shared key generation unit that generates a function value of an XOR of the XOR k' and the random number $k_{(j-2 \bmod n)+1}$, which is obtained from the function value of the random number $k_{(j-2 \bmod n)+1}$, as a shared key SK, and a terminal device $U_{j-1}$ includes a (j−1)-th shared key generation unit that generates a function value of an XOR of the XOR k' and the random number $k_{(j-2 \bmod n)+1}$ as the shared key SK.

4. The key exchange system according to any one of claims 1 to 3, wherein the post-quantum cryptography is lattice-based cryptography, code-based cryptography, or multivariate encryption scheme.

5. The key exchange system according to any one of claims 1 to 3, wherein $\kappa_1(\nu)$ and $\kappa_2(\nu)$ are positive integers, $A_\nu$ is a $\kappa_1(\nu) \times \kappa_2(\nu)$ basis matrix, $\nu$ and $\mu$ are positive integers, and $e_\nu$ is a vector consisting of $\kappa_2(\nu)$ elements, a key capsule decryption key $sk_\nu$ is a vector $s_\nu$ consisting of $\kappa_1(\nu)$ integers, a key encryption key $pk_\nu$ is $b_\nu = A_\nu s_\nu + e_\nu$, a key capsule $C_{\nu, (\nu \bmod \mu)+1}$ is $\{\gamma_\nu, \xi_\nu'\}$ and a key-shared-between-two-parties $R_{\nu, (\nu \bmod \mu)+1}$ is ROUND $(2\xi_\nu^-/q)$, and $\gamma_\nu = A_\nu s_\nu' + e_\nu'$, $\xi_\nu'$ is floor $(4\xi_\nu^-/q)$ mod 2, $s_\nu'$ is a vector consisting of $\kappa_1(\nu)$ integers, $e_\nu'$ and $e_\nu''$ are each a vector consisting of $\kappa_2(\nu)$ elements, $\xi_\nu = b_{(\nu \bmod \mu)+1} s_\nu' + e_\nu''$, $\xi_\nu^-$ is a random function value of $\xi_\nu$, q is an integer greater than or equal to 2, floor is a floor function, and ROUND is a round-off function.

6. A terminal device $U_i$ of a key exchange system which exchanges a shared key used for an application using cryptography, the key exchange system comprising terminal devices $U_1, \ldots, U_n$ which perform a key capsule-type key exchange between two parties which conforms to post-quantum cryptography of a public key cryptosystem; and a key distribution management device, wherein n is an integer greater than or equal to 3, i=1, ..., n, $\nu=$ 2, ..., n, and, for a positive integer $\alpha$, −1 mod $\alpha = \alpha−1$, a terminal device $U_i$ includes an i-th storage that stores a key capsule decryption key $sk_i$ which conforms to the post-quantum cryptography of the public key cryptosystem, an i-th output unit that outputs a key encryption key $pk_i$ corresponding to the key capsule decryption key $sk_i$ in order to transmit the key encryption key $pk_i$ to a terminal device $U_{(i-2 \bmod n)+1}$, an i-th input unit that accepts a key encryption key $pk_{(i \bmod n)+1}$ which conforms to the post-quantum cryptography and is output from a terminal device $U_{(i \bmod n)+1}$, an i-th random number setting unit that sets a random number $k_i$, an i-th key-shared-between-two-parties generation unit that generates, using the key encryption key $pk_{(i \bmod n)+1}$, a key-shared-between-two-parties $R_{i,\ (i \bmod n)+1}$ and a key capsule $C_{i,\ (i \bmod n)+1}$ which is cipher text of the key-shared-between-two-parties $R_{i,\ (i \bmod n)+1}$, and the i-th output unit that outputs the key capsule $C_{i,\ (i \bmod n)+1}$ in order to transmit the key capsule $C_{i,\ (i \bmod n)|1}$ to the terminal device $U_{(i \bmod n)|1}$, the i-th input unit accepts a key capsule $C_{(i-2 \bmod n)+1,\ i}$ which is output from the terminal device $U_{(i-2 \bmod n)+1}$, the terminal device $U_1$ includes a first decryption unit that generates a key-shared-between-two-parties $R_{n,\ 1}$ by decrypting a key capsule $C_{n,\ 1}$ using a key capsule decryption key $sk_1$, a first function operation unit that generates a function value $K_1^{(L)}$ of the key-shared-between-two-parties $R_{n,\ 1}$ and generates a function value $K_1^{(R)}$ of a key-shared-between-two-parties $R_{1,\ 2}$, a first XOR unit that generates an XOR $T_1$ of the function value $K_1^{(L)}$ and the function value $K_1^{(R)}$ and generates an XOR T' of a function value of a random number $k_1$ and the function value $K_1^{(L)}$, and a first output unit that outputs the XORs $T_1$ and T' to the key distribution management device, a terminal device $U_v$ includes a v-th decryption unit that generates a key-shared-between-two-parties $R_{(v-2 \bmod n)+1,\ v}$ by decrypting a key capsule $C_{(v-2 \bmod n)+1,\ v}$ using a key capsule decryption key $sk_v$, a v-th function operation unit that generates a function value $K_v^{(L)}$ of the key-shared-between-two-parties $R_{(v-2 \bmod n)+1,\ v}$ and generates a function value $K_v^{(R)}$ of a key-shared-between-two-parties $R_{v,\ (v \bmod n)+1}$, a v-th XOR unit that generates an XOR $T_v$ of the function value $K_v^{(L)}$ and the function value $K_v^{(R)}$, and a v-th output unit that outputs a random number $k_v$ and the XOR $T_v$ to the key distribution management device, the key distribution management device includes an XOR unit that generates an XOR k' of a plurality of values including random numbers $k_2, \ldots, k_n$ and generates an XOR $T_v'$ of XORs $T_1, \ldots, T_{v-1}$, and outputs the XOR k' to the terminal device $U_1$ and outputs the XORs T', k' and $T_v'$ to the terminal device $U_v$, the terminal device $U_1$ includes a first shared key generation unit that generates a function value of an XOR of the XOR k' and the random number $k_1$ as a shared key SK, and the terminal device $U_v$ includes a v-th function value reconstruction unit that generates the function value $K_1^{(L)}$ by XORing the XOR $T_v'$ with the function value $K_v^{(L)}$, a v-th random number reconstruction unit that generates the function value of the random number $k_1$ by XORing the XOR T' with the function value $K_1^{(L)}$, and a v-th shared key generation unit that generates a function value of an XOR of the XOR k' and the random number $k_1$, which is obtained from the function value of the random number $k_1$, as the shared key SK.

7. A terminal device $U_{i''}$ of a key exchange system which exchanges a shared key used for an application using cryptography, the key exchange system comprising terminal devices $U_1, \ldots, U_{n+1}$ which perform a key capsule-type key exchange between two parties which conforms to post-quantum cryptography of a public key cryptosystem; and a key distribution management device, wherein n is an integer greater than or equal to 3, $i''=1, \ldots, n+1$, $i=1, \ldots, n$, $v=2, \ldots, n$, $w=2, \ldots, n+1$, $z=2, \ldots, n-1$, $\rho=1, \ldots, n-1$, and, for a positive integer $\alpha$, $-1 \bmod \alpha = \alpha-1$, a terminal device $U_i$ includes an i-th storage that stores a function value r, the terminal device $U_1$ includes a first storage that stores a key capsule decryption key $sk_1$ which conforms to the post-quantum cryptography of the public key cryptosystem, and a first output unit that outputs a key encryption key $pk_1$ corresponding to the key capsule decryption key $sk_1$ in order to transmit the key encryption key $pk_1$ to the terminal device $U_{n+1}$, the terminal device $U_{n+1}$ includes an (n+1)-th storage that stores a key capsule decryption key $sk_{n+1}$ which conforms to the post-quantum cryptography, and an (n+1)-th output unit that outputs a key encryption key $pk_{n|1}$ corresponding to the key capsule decryption key $sk_{n+1}$ in order to transmit the key encryption key $pk_{n+1}$ to a terminal device $U_n$, the terminal device $U_n$ includes an n-th input unit that accepts the key encryption key $pk_{n+1}$ which is output from the terminal device $U_{n+1}$, an n-th random number setting unit that sets a random number $k_n$, an n-th key-shared-between-two-parties generation unit that generates, using the key encryption key $pk_{n+1}$, a key-shared-between-two-parties $R_{n,\ n+1}$ and a key capsule $C_{n,\ n+1}$ which is cipher text of the key-shared-between-two-parties $R_{n,\ n+1}$, and an n-th output unit that outputs the key capsule $C_{n,\ n+1}$ in order to transmit the key capsule $C_{n,\ n+1}$ to the terminal device $U_{n+1}$, the terminal device $U_{n+1}$ includes an (n+1)-th input unit that accepts the key encryption key $pk_1$ which is output from the terminal device $U_1$, an (n+1)-th random number setting unit that sets a random number $k_{n+1}$, an (n+1)-th key-shared-between-two-parties generation unit that generates, using the key encryption key $pk_1$, a key-shared-between-two-parties $R_{n|1,\ 1}$ and a key capsule $C_{n+1,\ 1}$ which is cipher text of the key-shared-between-two-parties $R_{n+1,\ 1}$, the (n+1)-th output unit that outputs the key capsule $C_{n+1}$ in order to transmit the key capsule $C_{n+1,\ 1}$ to the terminal device $U_1$, and the (n+1)-th input unit that accepts the key capsule $C_{n,\ n+1}$ which is output from the terminal device $U_n$, a terminal device $U_\rho$ includes a $\rho$-th random number setting unit that sets a random number $k_\rho$, the terminal device $U_1$ includes a first input unit that accepts the key capsule $C_{n+1,\ 1}$ which is output from the terminal device $U_{n+1}$, a first decryption unit that generates the key-shared-between-two-parties $R_{n+1,\ 1}$ by decrypting the key capsule $C_{n+1,\ 1}$ using the key capsule decryption key $sk_1$, a first function operation unit that generates a function value $K_1^{(L)}$ of the key-shared-between-two-parties $R_{n+1,\ 1}$ and generates a function value $K_1^{(R)}$ of the function value r, a first XOR unit that generates an XOR $T_1$ of the function value $K_1^{(L)}$ and the function value $K_1^{(R)}$ and generates an XOR T' of a function value of a random number $k_1$ and the function value $K_1^{(L)}$, and the first output unit that outputs the XORs $T_1$ and T' to the key distribution management device, the terminal device $U_n$ includes an n-th function operation unit that generates a function value $K_n^{(L)}$ of the function value r and generates a function value $K_n^{(R)}$ of the key-shared-between-two-parties $R_{n,\ n+1}$, an n-th XOR unit that generates an XOR $T_n$ of the function value $K_n^{(L)}$ and the function value $K_n^{(R)}$, and the n-th output unit that outputs a random number $k_n$ and the XOR $T_n$ to the key distribution management device, the terminal device $U_{n+1}$ includes an (n+1)-th decryption unit that generates the key-shared-between-two-parties $R_{n,\ n+1}$ by decrypting the key capsule $C_{n,\ n+1}$ using a key capsule decryption key $sk_{n+1}$, an (n+1)-th function operation unit that generates a function value $K_{n+1}^{(L)}$ of the key-shared-between-two-parties $R_{n,\ n+1}$ and generates a function value $K_{n+1}^{(R)}$ of the key-shared-between-two-parties $R_{n+1,\ 1}$, an (n+1)-th XOR unit that generates an XOR $T_{n+1}$ of the function value $K_{n|1}^{(L)}$ and the function value $K_{n|1}^{(R)}$, and the (n+1)-th output unit that outputs a random number $k_{n+1}$ and the XOR $T_{n+1}$ to the key distribution management device, a terminal device $U_z$ includes a z-th output unit that outputs a random number $k_z$ to the key distribution management device, the key distribution management device includes an XOR unit that generates an XOR k' of a plurality of values including random numbers $k_2, \ldots, k_{n+1}$ and generates an XOR $T_w'$ of XORs $T_1, \ldots, T_{w-1}$, of which XORs $T_2, \ldots, T_{n-1}$ are nulls, and outputs the XOR k' to the terminal device $U_1$ and outputs the XORs T', k' and $T_w'$ to the terminal device $U_w$, the terminal device $U_1$ includes a first shared key generation unit that generates a function value of an XOR of the XOR k' and the random number $k_1$ as a shared key SK, the terminal device $U_n$ includes an n-th function value reconstruction unit that generates the function value $K_1^{(L)}$ by XORing an XOR $T_n'$ with a function value $K_1^{(L)}$, an n-th random number reconstruction unit that generates the function value of the random number $k_1$ by XORing the XOR T' with the function value $K_1^{(L)}$, and an n-th shared key generation unit that generates a function value of an XOR of the XOR k' and the random number $k_1$, which is obtained from the function value of the random number $k_1$, as the shared key SK, the terminal device $U_{n+1}$ includes an (n+1)-th function value reconstruction unit that generates the function value $K_1^{(L)}$ by XORing an XOR $T_{n+1}'$ with a function value $K_{n+1}^{(L)}$, an (n+1)-th random number reconstruction unit that generates the function value of the random number $k_1$ by XORing the XOR T' with the function value $K_1^{(L)}$, and an (n+1)-th shared key generation unit that generates a function value of an XOR of the XOR k' and the random number $k_1$ as the shared key SK, and the terminal device $U_\rho$ includes a $\rho$-th function value reconstruction unit that generates the function value $K_1^{(L)}$ by XORing an XOR $T_\rho'$ with the function value $K_1^{(R)}$ of the function value r, a $\rho$-th random number reconstruction unit that generates the function value of the random number $k_1$ by XORing the XOR T' with the function value $K_1^{(L)}$, and a $\rho$-th shared key generation unit that generates a function value of an XOR of the XOR k' and the random number $k_1$ as the shared key SK.

8. A terminal device $U_i$ of a key exchange system which exchanges a shared key used for an application using cryptography, the key exchange system comprising terminal devices $U_1, \ldots, U_n$ which perform a key capsule-type key exchange between two parties which conforms to post-quantum cryptography of a public key cryptosystem; and a key distribution management device, wherein n is an integer greater than or equal to 3, $i=1, \ldots, n$, j is an integer greater than or equal to 1 and less than or equal to n, $y=1, \ldots, n$, $y \neq j$, $y \neq (j-2 \mod n)+1$, $x=1, \ldots, n$, $x \neq j$, $x \neq (j-2 \mod n)+1$, $x \neq (j \mod n)+1$, and, for a positive integer $\alpha$, $-1 \mod \alpha = \alpha - 1$, a terminal device $U_i$ includes an i-th storage that stores keys-shared-between-two-parties $H_i^{(L)} = R_{(i-2 \mod n)+1,\ i}$ and $H_i^{(R)} = R_{i,\ (i \mod n)=1}$, a terminal device $U_{(j \mod n)+1}$ includes a (j+1)-th storage that stores a key capsule decryption key $sk_{(j \mod n)+1}$ which conforms to the post-quantum cryptography of the public key cryptosystem, and a (j+1)-th output unit that outputs a key encryption key $pk_{(j \mod n)+1}$ corresponding to the key capsule decryption key $sk_{(j \mod n)+1}$ in order to transmit the key capsule decryption key $sk_{(j \mod n)|1}$ to a terminal device $U_{(j-2 \mod n)|1}$, the terminal device $U_{(j-2 \mod n)+1}$ includes a (j−1)-th input unit that accepts the key encryption key $pk_{(j \mod n)+1}$ which is output from the terminal device $U_{(j \mod n)+1}$, a (j−1)-th random number setting unit that sets a random number $k_{(j-2 \mod n)+1}$, a (j−1)-th key-shared-between-two-parties generation unit that generates, using the key encryption key $pk_{(j \mod n)+1}$, a key-shared-between-two-parties $R_{(j-2 \mod n)+1,\ (i \mod n)+1}$ and a key capsule $C_{(j-2 \mod n)+1,\ (j \mod n)+1}$ which is cipher text of the key-shared-between-two-parties $R_{(j-2 \mod n)+1,\ (j \mod n)+1}$, and a (j−1)-th output unit that outputs the key capsule $C_{(j-2 \mod n)+1,\ (j \mod n)+1}$ in order to transmit the key capsule $C_{(j-2 \mod n)+1,\ (j \mod n)+1}$ to the terminal device $U_{(j \mod n)+1}$, a terminal device $U_y$ includes a y-th random number setting unit that sets a random number $k_y$, the terminal device $U_{(j \bmod n)+1}$ includes a (j+1)-th input unit that accepts the key capsule $C_{(j-2 \bmod n)+1, (j \bmod n)+1}$ which is output from the terminal device $U_{(j-2 \bmod n)+1}$, the terminal device $U_{(j-2 \bmod n)+1}$ includes a (j−1)-th function operation unit that generates a function value $K_{(j-2 \bmod n)+1}^{(L)}$ of a key-shared-between-two-parties $H_{(j-2 \bmod n)+1}^{(L)}$ and generates a function value $K_{(j-2 \bmod n)+1}^{(R)}$ of the key-shared-between-two-parties $R_{(j-2 \bmod n)+1, (j \bmod n)+1}$, a (j−1)-th XOR unit that generates an XOR $T_{(j-2 \bmod n)+1}$ of the function value $K_{(j-2 \bmod n)+1}^{(L)}$ and the function value $K_{(j-2 \bmod n)+1}^{(R)}$ and generates an XOR T' of a function value of a random number $k_{(j-2 \bmod n)+1}$ and the function value $K_{(j-2 \bmod n)+1}^{(L)}$, and the (j−1)-th output unit that outputs the XOR $T_{(j-2 \bmod n)+1}$ and the XOR T' to the key distribution management device, the terminal device $U_{(j \bmod n)|1}$ includes a (j+1)-th decryption unit that generates the key-shared-between-two-parties $R_{(j-2 \bmod n)+1, (j \bmod n)+1}$ by decrypting the key capsule $C_{(j-2 \bmod n)+1, (j \bmod n)+1}$ using a key capsule decryption key $sk_{(j \bmod n)+1}$, a (j+1)-th function operation unit that generates a function value $K_{(j \bmod n)+1}^{(L)}$ of the key-shared-between-two-parties $R_{(j-2 \bmod n)+1, (j \bmod n)+1}$ and generates a function value $K_{(j \bmod n)+1}^{(R)}$ key-shared-between-two-parties $H_{(j \bmod n)+1}^{(R)}$, a (j+1)-th XOR unit that generates an XOR $T_{(j \bmod n)+1}$ of the function value $K_{(j \bmod n)+1}^{(L)}$ and the function value $K_{(j \bmod n)+1}^{(R)}$, and the (j+1)-th output unit that outputs a random number $k_{(j \bmod n)+1}$ and the XOR $T_{(j \bmod n)+1}$ to the key distribution management device, a terminal device $U_x$ includes an x-th function operation unit that generates a function value $K_x^{(L)}$ of a key-shared-between-two-parties $H_x^{(L)}$ and generates a function value $K_x^{(R)}$ of a key-shared-between-two-parties $H_x^{(R)}$, an x-th XOR unit that generates an XOR $T_x$ of the function value $K_x^{(L)}$ and the function value $K_x^{(R)}$, and an x-th output unit that outputs a random number $k_x$ and the XOR $T_x$ to the key distribution management device, the key distribution management device includes a k' generation unit that generates an XOR k' of a plurality of values including random numbers $k_1, \ldots, k_n$ (excluding $k_j$ and $k_{j+1}$) and outputs the XOR k', and an XOR unit that generates, when y<j−1, an XOR $T_y'$ of XORs $T_1, \ldots, T_{y-1}$ and $T_{j-1}, \ldots, T_n$ and outputs the XOR $T_y'$ and generates, when j+1≤i, an XOR $T_y'$ of XORs $T_{j-1}, \ldots, T_{y-1}$ and outputs the XOR $T_y'$, the terminal device $U_y$ includes a y-th function value reconstruction unit that generates the function value $K_{j-2 \bmod n)+1}^{(L)}$ by XORing the XOR $T_y'$ with a function value $K_y^{(L)}$, a y-th random number reconstruction unit that generates the function value of the random number $k_{(j-2 \bmod n)+1}$ by XORing the XOR T' with the function value $K_{j-2 \bmod n)+1}^{(L)}$, and a y-th shared key generation unit that generates a function value of an XOR of the XOR k' and the random number $k_{(j-2 \bmod n)|1}$, which is obtained from the function value of the random number $k_{(j-2 \bmod n)+1}$, as a shared key SK, and a terminal device $U_{j-1}$ includes a (j−1)-th shared key generation unit that generates a function value of an XOR of the XOR k' and the random number $k_{(j-2 \bmod n)+1}$ as the shared key SK.

9. A key exchange method of a key exchange system which exchanges a shared key used for an application using cryptography, the key exchange system comprising terminal devices $U_1, \ldots, U_n$ which perform a key capsule-type key exchange between two parties which conforms to post-quantum cryptography of a public key cryptosystem; and a key distribution management device, wherein n is an integer greater than or equal to 3, i=1, . . . , n, v=2, . . . , n, and, for a positive integer α, −1 mod α=α−1, and the key exchange method includes:

(a) a step in which a terminal device $U_i$ outputs a key encryption key $pk_i$ corresponding to a key capsule decryption key $sk_i$ which conforms to the post-quantum cryptography of the public key cryptosystem in order to transmit the key encryption key $pk_i$ to a terminal device $U_{(i-2 \bmod n)|1}$, accepts a key encryption key $pk_{(i \bmod n)+1}$ which conforms to the post-quantum cryptography and is output from a terminal device $U_{(i \bmod n)+1}$, sets a random number $k_i$, generates, using the key encryption key $pk_{(i \bmod n)+1}$, a key-shared-between-two-parties $R_{i, (i \bmod n)+1}$ and a key capsule $C_{i, (i \bmod n)+1}$ which is cipher text of the key-shared-between-two-parties $R_{i, (i \bmod n)+1}$, outputs the key capsule $C_{i, (i \bmod n)+1}$ in order to transmit the key capsule $C_{1, (i \bmod n)+}1$ to the terminal device $U_{(i \bmod n)+1}$, and accepts a key capsule $C_{(i-2 \bmod n)+1, i}$ which is output from the terminal device $U_{(i-2 \bmod n)+1}$, (b) a step in which the terminal device $U_1$ generates a key-shared-between-two-parties $R_{n, 1}$ by decrypting a key capsule $C_{n, 1}$ using a key capsule decryption key $sk_1$, generates a function value $K_1^{(L)}$ of the key-shared-between-two-parties $R_{n, 1}$ and generates a function value $K_1^{(R)}$ of a key-shared-between-two-parties $R_{1, 2}$, generates an XOR $T_1$ of the function value $K_1^{(L)}$ and the function value $K_1^{(R)}$ and generates an XOR T' of a function value of a random number $k_1$ and the function value $K_1^{(L)}$, and outputs the XORs $T_1$ and T' to the key distribution management device, (c) a step in which a terminal device $U_v$ generates a key-shared-between-two-parties $R_{(v-2 \bmod n)+1, v}$ by decrypting a key capsule $C_{(v-2 \bmod n)|1, v}$ using a key capsule decryption key $sk_v$, generates a function value $K_v^{(L)}$ of the key-shared-between-two-parties $R_{(v-2 \bmod n)+1, v}$ and generates a function value $K_v^{(R)}$ of a key-shared-between-two-parties $R_{v, (v \bmod n)+1}$, generates an XOR $T_v$ of the function value $K_v^{(L)}$ and the function value $K_v^{(R)}$, and outputs a random number $k_v$ and the XOR $T_v$ to the key distribution management device, (d) a step in which the key distribution management device generates an XOR k' of a plurality of values including random numbers $k_2, \ldots, k_n$ and generates an XOR $T_v'$ of XORs $T_1, \ldots, T_{v-1}$, and outputs the XOR k' to the terminal device $U_1$ and outputs the XORs T', k' and $T_v'$ to the terminal device $U_v$, (e) a step in which the terminal device $U_1$ generates a function value of an XOR of the XOR k' and the random number $k_1$ as a shared key SK, and (f) a step in which the terminal device $U_v$
generates the function value $K_1^{(L)}$ by XORing the XOR $T_v'$ with the function value $K_v^{(L)}$,
generates the function value of the random number $k_1$ by XORing the XOR T' with the function value $K_1^{(L)}$, and
generates a function value of an XOR of the XOR k' and the random number $k_1$, which is obtained from the function value of the random number $k_1$, as the shared key SK.

10. A key exchange method of a key exchange system which exchanges a shared key used for an application using cryptography, the key exchange system comprising terminal devices $U_1, \ldots, U_{n+1}$ which perform a key capsule-type key exchange between two parties which conforms to post-quantum cryptography of a public key cryptosystem: and a key distribution management device, wherein n is an integer greater than or equal to 3, i=1, ..., n, v=2, ..., n, w=2, ..., n|1, z=2, ..., n-1, ρ=1, ..., n-1, and, for a positive integer α, $-1 \mod \alpha = \alpha - 1$, and the key exchange method includes:

(a) a step in which a terminal device $U_i$ stores a function value r, (b) a step in which the terminal device $U_1$
stores a key capsule decryption key $sk_1$ which conforms to the post-quantum cryptography of the public key cryptosystem, and
outputs a key encryption key $pk_1$ corresponding to the key capsule decryption key $sk_1$ in order to transmit the key encryption key $pk_1$ to the terminal device $U_{n+1}$, (c) a step in which the terminal device $U_{n+1}$ outputs a key encryption key $pk_{n+1}$ corresponding to a key capsule decryption key $sk_{n|1}$ which conforms to the post-quantum cryptography in order to transmit the key encryption key $p_{n+1}$ to a terminal device $U_n$, (d) a step in which the terminal device $U_n$
accepts the key encryption key $pk_{n+1}$ which is output from the terminal device $U_{n+1}$,
sets a random number $k_n$,
generates, using the key encryption key $pk_{n+1}$, a key-shared-between-two-parties $R_{n, n+1}$ and a key capsule $C_{n, n+1}$ which is cipher text of the key-shared-between-two-parties $R_{n, n+1}$, and
outputs the key capsule $C_{n, n+1}$ in order to transmit the key capsule $C_{n, n+1}$ to the terminal device $U_{n+1}$, (e) a step in which the terminal device $U_{n|1}$
accepts the key encryption key $pk_1$ which is output from the terminal device $U_1$,
sets a random number $k_{n+1}$,
generates, using the key encryption key $pk_1$, a key-shared-between-two-parties $R_{n+1, 1}$ and a key capsule $C_{n+1, 1}$ which is cipher text of the key-shared-between-two-parties $R_{n|1, 1}$,
outputs the key capsule $C_{n+1, 1}$ in order to transmit the key capsule $C_{n+1, 1}$ to the terminal device $U_1$, and
accepts the key capsule $C_{n+1, 1}$ which is output from the terminal device $U_n$, (f) a step in which a terminal device $U_\rho$ sets a random number $k_\rho$, (g) a step in which the terminal device $U_1$
accepts the key capsule $C_{n+1, 1}$ which is output from the terminal device $U_{n+1}$
generates the key-shared-between-two-parties $R_{n+1, 1}$ by decrypting the key capsule $C_{n|1, 1}$ using the key capsule decryption key $sk_1$,
generates a function value $K_1^{(L)}$ of the key-shared-between-two-parties $R_{n+1, 1}$, and generates a function value $K_1^{(R)}$ of the function value r,
generates an XOR $T_1$ of the function value $K_1^{(L)}$ and the function value $K_1^{(R)}$ and generates an XOR T' of a function value of a random number $k_1$ and the function value $K_1^{(L)}$, and
outputs the XORs $T_1$ and T' to the key distribution management device, (h) a step in which the terminal device $U_n$
generates a function value $K_n^{(L)}$ of the function value r and generates a function value $K_n^{(R)}$ of the key-shared-between-two-parties $R_{n, n+1}$,
generates an XOR $T_n$ of the function value $K_n^{(L)}$ and the function value $K_n^{(R)}$, and
outputs a random number $k_n$ and the XOR $T_n$ to the key distribution management device, (i) a step in which the terminal device $U_{n+1}$
generates the key-shared-between-two-parties $R_{n, n+1}$ by decrypting the key capsule $C_{n, n+1}$ using a key capsule decryption key $sk_{n+1}$,
generates a function value $K_{n|1}^{(L)}$ of the key-shared-between-two-parties $R_{n, n+1}$ and generates a function value $K_{n+1}^{(R)}$ of the key-shared-between-two-parties $R_{n+1, 1}$,
generates an XOR $T_{n+1}$ of the function value $K_{n+1}^{(L)}$ and the function value $K_{n+1}^{(R)}$, and
outputs a random number $k_{n+1}$ and the XOR $T_{n+1}$ to the key distribution management device, (j) a step in which a terminal device $U_z$ outputs a random number $k_z$ to the key distribution management device, (k) a step in which the key distribution management device generates an XOR k' of a plurality of values including random numbers $k_2, \ldots, k_{n+1}$ and generates an XOR $T_w'$ of XORs $T_1, \ldots, T_{w-1}$, of which XORs $T_2, \ldots, T_{n-1}$ are nulls, and outputs the XOR k' to the terminal device $U_1$ and outputs the XORs T', k' and $T_w'$ to the terminal device $U_w$, (l) a step in which the terminal device $U_1$ generates a function value of an XOR of the XOR k' and the random number $k_1$ as a shared key SK, (m) a step in which the terminal device $U_n$
generates the function value $K_1^{(L)}$ by XORing an XOR $T_n'$ with a function value $K_n^{(L)}$,
generates the function value of the random number $k_1$ by XORing the XOR T' with the function value $K_1^{(L)}$, and
generates a function value of an XOR of the XOR k' and the random number $k_1$, which is obtained from the function value of the random number $k_1$, as the shared key SK, (n) a step in which the terminal device $U_{n|1}$
generates the function value $K_1^{(L)}$ by XORing an $XOR_{n+1}'$ with a function value $K_{n+1}^{(L)}$,
generates the function value of the random number $k_1$ by XORing the XOR T' with the function value $K_1^{(L)}$, and
generates a function value of an XOR of the XOR k' and the random number $k_1$ as the shared key SK, and (o) a step in which the terminal device $U_\rho$
  generates the function value $K_1^{(L)}$ by XORing an XOR $T_\rho'$ with the function value $K_1^{(R)}$ of the function value r,
  generates the function value of the random number $k_1$ by XORing the XOR T' with the function value $K_1^{(L)}$, and
  generates a function value of an XOR of the XOR k' and the random number $k_1$ as the shared key SK.

11. A key exchange method of a key exchange system which exchanges a shared key used for an application using cryptography, the key exchange system comprising:
  terminal devices $U_1, \ldots, U_n$ which perform a key capsule-type key exchange between two parties which conforms to post-quantum cryptography of a public key cryptosystem:
  and a key distribution management device, wherein
  n is an integer greater than or equal to 3, i=1, ..., n, j is an integer greater than or equal to 1 and less than or equal to n, y=1, ..., n, y≠j, y≠(j−2 mod n)+1, x= 1, ..., n, x≠j, x≠(j−2 mod n)+1, x≠(i mod n)+1, and, for a positive integer α, −1 mod α=α−1,
  a terminal device $U_i$, includes an i-th storage that stores keys-shared-between-two-parties $H_i^{(L)}=R_{(i-2 \bmod n)+1, i}$ and $H_i^{(R)}=R_{i, (i \bmod n)+1}$, and
  the key exchange method includes:
  (a) a step in which a terminal device $U_{(j \bmod n)+1}$
    outputs a key encryption key $pk_{(j \bmod n)|1}$ corresponding to a key capsule decryption key $sk_{(j \bmod n)+1}$ which conforms to the post-quantum cryptography of the public key cryptosystem in order to transmit the key capsule decryption key $sk_{(j \bmod n)+1}$ to a terminal device $U_{(j-2 \bmod n)+1}$,
  (b) a step in which the terminal device $U_{(j-2 \bmod n)+1}$
    accepts the key encryption key $pk_{(j \bmod n)+1}$ which is output from the terminal device $U_{(j \bmod n)+1}$,
    sets a random number $k_{(j-2 \bmod n)+1}$,
    generates, using the key encryption key $pk_{(j \bmod n)+1}$, a key-shared-between-two-parties $R_{(j-2 \bmod n)+1, (j \bmod n)+1}$ and a key capsule $C_{(j-2 \bmod n)+1, (j \bmod n)+1}$ which is cipher text of the key-shared-between-two-parties $R_{(j-2 \bmod n)+1, (j \bmod n)+1}$, and
    outputs the key capsule $C_{(j-2 \bmod n)|1, (j \bmod n)|1}$ in order to transmit the key capsule $C_{(j-2 \bmod n)+1, (j \bmod n)+1}$ to the terminal device $U_{(j \bmod n)+1}$,
  (c) a step in which a terminal device $U_y$ sets a random number $k_y$,
    accepts the key capsule $C_{(j-2 \bmod n)+1, (j \bmod n)+1}$ which is output from the terminal device $U_{(j-2 \bmod n)+1}$,
  (d) a step in which the terminal device $U_{(j-2 \bmod n)+1}$
    generates a function value $K_{(j-2 \bmod n)+1}^{(L)}$ of a key-shared-between-two-parties $H_{(j-2 \bmod n)+1}^{(L)}$ and generates a function value $K_{(j-2 \bmod n)+1}^{(R)}$ of the key-shared-between-two-parties $R_{(j-2 \bmod n)+1, (j \bmod n)+1}$,
    generates an XOR $T_{(j-2 \bmod n)+1}$ of the function value $K_{(j-2 \bmod n)+1}^{(L)}$ and the function value $K_{j-2 \bmod n)+1}^{(R)}$ and generates an XOR T' of a function value of a random number $k_{(j-2 \bmod n)|1}$ and the function value $K_{(j-2 \bmod n)|1}^{(L)}$, and
    outputs the XOR $T_{(j-2 \bmod n)+1}$ and the XOR T' to the key distribution management device,
  (e) a step in which the terminal device $U_{(j \bmod n)|1}$
    generates the key-shared-between-two-parties $R_{(j-2 \bmod n)+1, (j \bmod n)+1}$ by decrypting the key capsule $C_{(j-2 \bmod n)+1, (j \bmod n)+1}$ using a key capsule decryption key $sk_{(j \bmod n)+1}$,
    generates a function value $K_{(j \bmod n)+1}^{(L)}$ of the key-shared-between-two-parties $R_{(j-2 \bmod n)+1, (j \bmod n)+1}$ and generates a function value $K_{(j \bmod n)+1}^{(R)}$ of a key-shared-between-two-parties $H_{(j \bmod n)+1}^{(R)}$,
    generates an XOR $T_{(j \bmod n)+1}$ of the function value $K_{(j \bmod n)+1}^{(L)}$ and the function value $K_{(j \bmod n)+1}^{(R)}$, and
    outputs a random number $k_{(j \bmod n)+1}$ and the XOR $T_{(j \bmod n)+1}^{(L)}$ to the key distribution management device,
  (f) a step in which a terminal device $U_x$
    generates a function value $K_x^{(L)}$ of a key-shared-between-two-parties $H_x^{(L)}$ and generates a function value $K_x^{(R)}$ of a key-shared-between-two-parties $H_x^{(R)}$,
    generates an XOR $T_x$ of the function value $K_x^{(L)}$ and the function value $K_x^{(R)}$, and
    outputs a random number $k_x$ and the XOR T to the key distribution management device,
  (g) a step in which the key distribution management device
    generates an XOR k' of a plurality of values including random numbers $k_1, \ldots, k_n$ (excluding $k_j$ and $k_{j+1}$) and outputs the XOR k', and
    generates, when y<j−1, an XOR $T_y'$ of XORs $T_1, \ldots, T_{y-1}$ and $T_{j-1}, \ldots, T_n$ and outputs the XOR $T_y'$ and generates, when j+1<i, an XOR $T_y'$ of XORs $T_{j-1}, \ldots, T_{y-1}$ and outputs the XOR $T_y'$,
  (h) a step in which the terminal device $U_y$
    generates the function value $K_{(j-2 \bmod n)+1}^{(L)}$ by XORing the XOR $T_y'$ with a function value $K_y^{(L)}$,
    generates the function value of the random number $k_{(j-2 \bmod n)+1}$ by XORing the XOR T' with the function value $K_{(j-2 \bmod n)+1}^{(L)}$, and
    generates a function value of an XOR of the XOR k' and the random number $k_{(j-2 \bmod n)+1}$, which is obtained from the function value of the random number $k_{j-2 \bmod n)+1}$, as a shared key SK, and
  (i) a step in which a terminal device $U_{j-i}$ generates a function value of an XOR of the XOR k' and the random number $k_{(j-2 \bmod n)+1}$ as the shared key SK.

12. A non-transitory computer-readable recording medium that stores a program for making a computer function as the terminal device $U_i$ of a key exchange system which exchanges a shared key used for an application using cryptography, the key exchange system comprising
  terminal devices $U_1, \ldots, U_n$ which perform a key capsule-type key exchange between two parties which conforms to post-quantum cryptography of a public key cryptosystem; and
  a key distribution management device, wherein
  n is an integer greater than or equal to 3, i=1, ..., n, v= 2, ..., n, and, for a positive integer α, −1 mod α=α−1,
  a terminal device $U_i$ includes
    an i-th storage that stores a key capsule decryption key $sk_i$ which conforms to the post-quantum cryptography of the public key cryptosystem,
    an i-th output unit that outputs a key encryption key $pk_i$ corresponding to the key capsule decryption key $sk_i$ in order to transmit the key encryption key $pk_i$ to a terminal device $U_{(i-2 \bmod n)|1}$, an i-th input unit that accepts a key encryption key $pk_{(i \bmod n)+1}$ which conforms to the post-quantum cryptography and is output from a terminal device $U_{(i \bmod n)+1}$, an i-th random number setting unit that sets a random number $k_i$, an i-th key-shared-between-two-parties generation unit that generates, using the key encryption key $pk_{(i \bmod n)+1}$, a key-shared-between-two-parties $R_{i,\,(i \bmod n)+1}$ and a key capsule $C_{i,\,(i \bmod n)+1}$ which is cipher text of the key-shared-between-two-parties $R_{i,\,(i \bmod n)+1}$ and the i-th output unit that outputs the key capsule $C_{(i \bmod n)+1}$ in order to transmit the key capsule $C_{i,\,(i \bmod n)+1}$ to the terminal device $U_{(i \bmod n)+1}$, the i-th input unit accepts a key capsule $C_{(i-2 \bmod n)+1,\,i}$ which is output from the terminal device $U_{(i-2 \bmod n)+1}$, the terminal device $U_1$ includes a first decryption unit that generates a key-shared-between-two-parties $R_{n,\,1}$ by decrypting capsule $C_{n,\,1}$ using a key capsule decryption key $sk_1$, a first function operation unit that generates a function value $K_1^{(L)}$ of the key-shared-between-two-parties $R_{n,\,1}$ and generates a function value $K_1^{(R)}$ of a key-shared-between-two-parties $R_{1,\,2}$, a first XOR unit that generates an XOR $T_1$ of the function value $K_1^{(L)}$ and the function value $K_1^{(R)}$ and generates an XOR T' of a function value of a random number $k_1$ and the function value $K_1^{(L)}$, and a first output unit that outputs the XORs $T_1$ and T' to the key distribution management device, a terminal device $U_v$ includes a v-th decryption unit that generates a key-shared-between-two-parties $R_{(v-2 \bmod n)+1,\,v}$ by decrypting a key capsule $C_{(v-2 \bmod n)+1,\,v}$ using a key capsule decryption key $sk_v$, a v-th function operation unit that generates a function value $K_v^{(L)}$ of the key-shared-between-two-parties $R_{(v-2 \bmod n)+1,\,v}$ and generates a function value $K_v^{(R)}$ of a key-shared-between-two-parties $R_{v,\,(v \bmod n)+1}$, a v-th XOR unit that generates an XOR $T_v$ of the function value $K_v^{(L)}$ and the function value $K_v^{(R)}$, and a v-th output unit that outputs a random number $k_v$ and the XOR $T_v$ to the key distribution management device, the key distribution management device includes an XOR unit that generates an XOR k' of a plurality of values including random numbers $k_2, \ldots, K_n$ generates an XOR $T_v'$ of XORs $T_1, \ldots, T_{v-1}$, and outputs the XOR k' to the terminal device $U_1$ and outputs the XORs T', k' and $T_v'$ to the terminal device $U_v$, the terminal device $U_1$ includes a first shared key generation unit that generates a function value of an XOR of the XOR k' and the random number $k_1$ as a shared key SK, and the terminal device $U_v$ includes a v-th function value reconstruction unit that generates the function value $K_1^{(L)}$ by XORing the XOR $T_v'$ with the function value $K_v^{(L)}$, a v-th random number reconstruction unit that generates the function value of the random number $k_1$ by XORing the XOR T' with the function value $K_1^{(L)}$, and a v-th shared key generation unit that generates a function value of an XOR of the XOR k' and the random number $k_1$, which is obtained from the function value of the random number $k_1$, as the shared key SK.

13. A non-transitory computer-readable recording medium that stores a program for making a computer function as the terminal device $U_{i''}$ of a key exchange system which exchanges a shared key used for an application using cryptography, the key exchange system comprising terminal devices $U_1, \ldots, U_{n+1}$ which perform a key capsule-type key exchange between two parties which conforms to post-quantum cryptography of a public key cryptosystem; and a key distribution management device, wherein n is an integer greater than or equal to 3, i''=1, \ldots, n+1, i=1, \ldots, n, v=2, \ldots, n, w=2, n+1, z=2, \ldots, n-1, $\rho$=1, \ldots, n-1, and, for a positive integer $\alpha$, -1 mod $\alpha = \alpha - 1$, a terminal device $U_i$ includes an i-th storage that stores a function value r, the terminal device $U_1$ includes a first storage that stores a key capsule decryption key $sk_1$ which conforms to the post-quantum cryptography of the public key cryptosystem, and a first output unit that outputs a key encryption key $pk_1$ corresponding to the key capsule decryption key $sk_1$ in order to transmit the key encryption key $pk_1$ to the terminal device $U_{n+1}$, the terminal device $U_{n+1}$ includes an (n+1)-th storage that stores a key capsule decryption key $sk_{n+1}$ which conforms to the post-quantum cryptography, and an (n+1)-th output unit that outputs a key encryption key $pk_{n+1}$ corresponding to the key capsule decryption key $sk_{n+1}$ in order to transmit the key encryption key $pk_{n+1}$ to a terminal device $U_n$, the terminal device $U_n$ includes an n-th input unit that accepts the key encryption key $pk_{n+1}$ which is output from the terminal device $U_{n+1}$, an n-th random number setting unit that sets a random number $k_n$, an n-th key-shared-between-two-parties generation unit that generates, using the key encryption key $pk_{n|1}$, a key-shared-between-two-parties $R_{n,\,n|1}$ and a key capsule $C_{n,\,n|1}$ which is cipher text of the key-shared-between-two-parties $R_{n,\,n+1}$, and an n-th output unit that outputs the key capsule $C_{n,\,n+1}$ in order to transmit the key capsule $C_{n,\,n+1}$ to the terminal device $U_{n+1}$, the terminal device $U_{n+1}$ includes an (n+1)-th input unit that accepts the key encryption key $pk_1$ which is output from the terminal device an (n+1)-th random number setting unit that sets a random number $k_{n+1}$, an (n+1)-th key-shared-between-two-parties generation unit that generates, using the key encryption key $pk_1$, a key-shared-between-two-parties $R_{n+1,\,1}$ and a key capsule $C_{n+1,\,1}$ which is cipher text of the key-shared-between-two-parties $R_{n+1,\,1}$, the (n+1)-th output unit that outputs the key capsule $C_{n|1,\,1}$ in order to transmit the key capsule $C_{n+1,\,1}$ to the terminal device $U_1$, and the (n+1)-th input unit that accepts the key capsule $C_{n,\,n+1}$ which is output from the terminal device $U_n$, a terminal device $U_\rho$ includes a $\rho$-th random number setting unit that sets a random number $k_\rho$, the terminal device $U_1$ includes a first input unit that accepts the key capsule $C_{n+1,\,1}$ which is output from the terminal device $U_{n+1}$, a first decryption unit that generates the key-shared-between-two-parties $R_{n+1,\ 1}$ by decrypting the key capsule $C_{n+1,\ 1}$ using the key capsule decryption key $sk_1$, a first function operation unit that generates a function value $K_1^{(L)}$ of the key-shared-between-two-parties $R_{n+1,\ 1}$ and generates a function value $K_1^{(R)}$ of the function value r, a first XOR unit that generates an XOR $T_1$ of the function value $K_1^{(L)}$ and the function value $K_1^{(R)}$ and generates an XOR T' of a function value of a random number $k_1$ and the function value $K_1^{(L)}$, and the first output unit that outputs the XORs $T_1$ and T' to the key distribution management device, the terminal device $U_n$ includes an n-th function operation unit that generates a function value $K_n^{(L)}$ of the function value r and generates a function value $K_n^{(R)}$ of the key-shared-between-two-parties $R_{n,\ n+1}$, an n-th XOR unit that generates an XOR $T_n$ of the function value $K_n^{(L)}$ and the function value $K_n^{(R)}$, and the n-th output unit that outputs a random number $k_n$ and the XOR $T_n$ to the key distribution management device, the terminal device $U_{n+1}$ includes an (n+1)-th decryption unit that generates the key-shared-between-two-parties $R_{n,\ n+1}$ by decrypting the key capsule $C_{n,\ n+1}$ using a key capsule decryption key $sk_{n+1}$, an (n+1)-th function operation unit that generates a function value $K_{n+1}^{(L)}$ of the key-shared-between-two-parties $R_{n,\ n+1}$ and generates a function value $K_{n+1}^{(R)}$ of the key-shared-between-two-parties $R_{n+1,\ 1}$, an (n+1)-th XOR unit that generates an XOR $T_{n+1}$ of the function value $K_{n+1}^{(L)}$ and the function value $K_{n+1}^{(R)}$, and the (n+1)-th output unit that outputs a random number $k_{n+1}$ and the XOR $T_{n+1}$ to the key distribution management device, a terminal device $U_z$ includes a z-th output unit that outputs a random number $k_z$ to the key distribution management device, the key distribution management device includes an XOR unit that generates an XOR k' of a plurality of values including random numbers $k_2, \ldots, k_{n+1}$ and generates an XOR $T_w'$ of XORs $T_1, \ldots, T_{w-1}$, of which XORs $T_2, \ldots, T_{n-1}$ are nulls, and outputs the XOR k' to the terminal device $U_1$ and outputs the XORs T', k' and $T_w'$ to the terminal device $U_w$, the terminal device $U_1$ includes a first shared key generation unit that generates a function value of an XOR of the XOR k' and the random number $k_1$ as a shared key SK, the terminal device $U_n$ includes an n-th function value reconstruction unit that generates the function value $K_1^{(L)}$ by XORing an XOR $T_n'$ with a function value $K_n^{(L)}$, an n-th random number reconstruction unit that generates the function value of the random number $k_1$ by XORing the XOR T' with the function value $K_1^{(L)}$, and an n-th shared key generation unit that generates a function value of an XOR of the XOR k' and the random number $k_1$, which is obtained from the function value of the random number $k_1$, as the shared key SK, the terminal device $U_{n+1}$ includes an (n+1)-th function value reconstruction unit that generates the function value $K_1^{(L)}$ by XORing an XOR $T_{n-1}'$ with a function value $K_{n+1}^{(L)}$, and an (n+1)-th random number reconstruction unit that generates the function value of the random number $k_1$ by XORing the XOR with the function value $K_1^{(L)}$, and an (n+1)-th shared key generation unit that generates a function value of an XOR of the XOR k' and the random number $k_1$ as the shared key SK, and the terminal device $U_\rho$ includes a $\rho$-th function value reconstruction unit that generates the function value $K_1^{(L)}$ by XORing an XOR $T_\rho'$ with the function value $K_1^{(R)}$ of the function value r, a $\rho$-th random number reconstruction unit that generates the function value of the random number $k_1$ by XORing the XOR T' with the function value $K_1^{(L)}$, and a $\rho$-th shared key generation unit that generates a function value of an XOR of the XOR k' and the random number $k_1$ as the shared key SK.

14. A non-transitory computer-readable recording medium that stores a program for making a computer function as the terminal device $U_i$ of a key exchange system which exchanges a shared key used for an application using cryptography, the key exchange system comprising terminal devices $U_1, \ldots, U_n$ which perform a key capsule-type key exchange between two parties which conforms to post-quantum cryptography of a public key cryptosystem; and a key distribution management device, wherein n is an integer greater than or equal to 3, $i=1, \ldots, n$, j is an integer greater than or equal to 1 and less than or equal to n, $y=1, \ldots, n$, $y \neq j$, $y \neq (j-2 \bmod n)+1$, $x=1, \ldots, n$, $x \neq j$, $x \neq (j-2 \bmod n)+1$, $x \neq (j \bmod n)+1$, and, for a positive integer $\alpha$, $-1 \bmod \alpha = \alpha - 1$, a terminal device $U_i$ includes an i-th storage that stores keys-shared-between-two-parties $H_i^{(L)} = R_{(i-2 \bmod n)+1,\ i}$ and $H_i^{(R)} = R_{i,\ (i \bmod n)+1}$, a terminal device $U_{(j \bmod n)+1}$ includes a (j+1)-th storage that stores a key capsule decryption key $sk_{(j \bmod n)+1}$ which conforms to the post-quantum cryptography of the public key cryptosystem, and a (j+1)-th output unit that outputs a key encryption key $pk_{(j \bmod n)+1}$ corresponding to the key capsule decryption key $sk_{(j \bmod n)+1}$ in order to transmit the key capsule decryption key $sk_{(j \bmod n)+1}$ to a terminal device $U_{(j-2 \bmod n)+1}$, the terminal device $U_{(j-2 \bmod n)+1}$ includes a (j-1)-th input unit that accepts the key encryption key $pk_{(j \bmod n)+1}$ which is output from the terminal device $U_{(j \bmod n)+1}$, a (j-1)-th random number setting unit that sets a random number $k_{(j-2 \bmod n)+1}$, a (j-1)-th key-shared-between-two-parties generation unit that generates, using the key encryption key $pk_{(j \bmod n)+1}$, a key-shared-between-two-parties $R_{(j-2 \bmod n)+1,\ (j \bmod n)+1}$ and a key capsule $C_{(j-2 \bmod n)+1,\ (j \bmod n)+1}$ which is cipher text of the key-shared-between-two-parties $R_{(j-2 \bmod n)+1,\ (j \bmod n)+1}$, and a (j−1)-th output unit that outputs the key capsule $C_{(j-2 \bmod n)+1, (j \bmod n)+1}$ in order to transmit the key capsule $C_{(j-2 \bmod n)+1, (j \bmod n)+1}$ to the terminal device $U_{(j \bmod n)+1}$, a terminal device $U_y$ includes a y-th random number setting unit that sets a random number $k_y$, the terminal device $U_{(j \bmod n)+1}$ includes a (j+1)-th input unit that accepts the key capsule $C_{(j-2 \bmod n)|1, (j \bmod n)|1}$ which is output from the terminal device $U_{(j-2 \bmod n)|}$, the terminal device $U_{(j-2 \bmod n)+1}$ includes a (j−1)-th function operation unit that generates a function value $K_{(j-2 \bmod n)+1}^{(L)}$ of a key-shared-between-two-parties $H_{(j-2 \bmod n)+1}^{(L)}$ and generates a function value $K_{(j-2 \bmod n)+1}^{(R)}$ of the key-shared-between-two-parties $R_{(j-2 \bmod n)+1, (j \bmod n)+1}$, a (j−1)-th XOR unit that generates an XOR $T_{(j-2 \bmod n)+1}$ of the function value $K_{(j-2 \bmod n)+1}^{(L)}$ and the function value $K_{(j-2 \bmod n)+1}^{(R)}$ and generates an XOR T' of a function value of a random number $k_{(j-2 \bmod n)+1}$ and the function value $K_{(j-2 \bmod n)+1}^{(L)}$, and the (j−1)-th output unit that outputs the XOR $T_{(j-2 \bmod n)+1}$ and the XOR T' to the key distribution management device, the terminal device $U_{(j \bmod n)+1}$ includes a (j+1)-th decryption unit that generates the key-shared-between-two-parties $R_{(j-2 \bmod n)+1, (j \bmod n)+1}$ by decrypting the key capsule $C_{(j-2 \bmod n)+1, (j \bmod n)+1}$ using a key capsule decryption key $sk_{(j \bmod n)|1}$, a (j+1)-th function operation unit that generates a function value $K_{(j \bmod n)+1}^{(L)}$ of the key-shared-between-two-parties $R_{(j-2 \bmod n)+1, (j \bmod n)+1}$ and generates a function value $K_{(j \bmod n)+1}^{(R)}$ of a key-shared-between-two-parties $H_{(j \bmod n)+1}^{(R)}$, a (j+1)-th XOR unit that generates an XOR $T_{(j \bmod n)+1}$ of the function value $K_{(j \bmod n)+1}^{(L)}$ and the function value $K_{(j \bmod n)+1}^{(R)}$, and the (j+1)-th output unit that outputs a random number $k_{(j \bmod n)+1}$ and the XOR $T_{(j \bmod n)+1}$ to the key distribution management device, a terminal device $U_x$ includes an x-th function operation unit that generates a function value $K_x^{(L)}$ of a key-shared-between-two-parties $H_x^{(L)}$ and generates a function value $K_x^{(R)}$ of a key-shared-between-two-parties $H_x^{(R)}$, an x-th XOR unit that generates an XOR $T_x$ of the function value $K_x^{(L)}$ and the function value $K_x^{(R)}$, and an x-th output unit that outputs a random number $k_x$ and the XOR $T_x$ to the key distribution management device, the key distribution management device includes a k' generation unit that generates an XOR k' of a plurality of values including random numbers $k_1, \ldots, k_n$ (excluding $k_j$ and $k_{j+}$) and outputs the XOR k', and an XOR unit that generates, when $y<j-1$, an XOR $T_y'$ of XORs $T_1, \ldots, T_{y-1}$ and $T_{j-1}, \ldots, T_n$ and outputs the XOR $T_y'$ and generates, when $j+1 \leq i$, an XOR $T_y'$ of XORs $T_{j-1}, \ldots, T_{y-1}$ and outputs the XOR $T_y'$, the terminal device $U_y$ includes a y-th function value reconstruction unit that generates the function value $K_{(j-2 \bmod n)+1}^{(L)}$ by XORing the XOR $T_y'$ with a function value $K_y^{(L)}$, a y-th random number reconstruction unit that generates the function value of the random number $k_{(j-2 \bmod n)+1}$ by XORing the XOR T' with the function value $K_{j-2 \bmod n)+1}^{(L)}$, and a y-th shared key generation unit that generates a function value of an XOR of the XOR k' and the random number $k_{(j-2 \bmod n)+1}$, which is obtained from the function value of the random number $k_{(j-2 \bmod n)+1}$, as a shared key SK, and a terminal device $U_{j-1}$ includes a (j−1)-th shared key generation unit that generates a function value of an XOR of the XOR k' and the random number $k_{(j-2 \bmod n)+1}$ as the shared key SK.

* * * * *